United States Patent
Lee

(10) Patent No.: US 11,183,075 B2
(45) Date of Patent: Nov. 23, 2021

(54) AUTOMATED ASSESSMENT OF COGNITIVE, FINE-MOTOR, AND MEMORY SKILLS

(71) Applicant: Case Western Reserve University, Cleveland, OH (US)

(72) Inventor: Kiju Lee, Cleveland, OH (US)

(73) Assignee: Case Western Reserve University, Cleveland, OH (US)

(*) Notice: Subject to any disclaimer, the term of this patent is extended or adjusted under 35 U.S.C. 154(b) by 0 days.

(21) Appl. No.: 16/840,728

(22) Filed: Apr. 6, 2020

(65) Prior Publication Data
US 2020/0302810 A1    Sep. 24, 2020

Related U.S. Application Data

(63) Continuation of application No. 15/188,150, filed on Jun. 21, 2016, now abandoned, which is a continuation of application No. 13/442,265, filed on Apr. 9, 2012, now abandoned.

(60) Provisional application No. 61/473,213, filed on Apr. 8, 2011.

(51) Int. Cl.
| | | |
|---|---|---|
| *G09B 19/00* | (2006.01) | |
| *G09B 1/10* | (2006.01) | |
| *G01P 13/00* | (2006.01) | |

(52) U.S. Cl.
CPC ............. *G09B 1/10* (2013.01); *G01P 13/00* (2013.01); *G09B 19/00* (2013.01); *G09B 19/003* (2013.01)

(58) Field of Classification Search
None
See application file for complete search history.

(56) References Cited

U.S. PATENT DOCUMENTS

| | | | |
|---|---|---|---|
| 2,570,625 | A | 10/1951 | Zimmerman et al. |
| 5,190,285 | A | 3/1993 | Levy et al. |
| 5,437,555 | A | 8/1995 | Ziv-El |
| 5,991,693 | A | 11/1999 | Zalewski |
| 6,729,881 | B2 | 5/2004 | Marcus et al. |
| 6,755,657 | B1 | 6/2004 | Wasowicz |
| 6,871,195 | B2 | 3/2005 | Ryan et al. |

(Continued)

OTHER PUBLICATIONS

Floyd et al., "Geometric Games for Accessing Cognitive, Working Memory, and Motor Control Skills", TEI 2012, Feb. 19-22, 2012, 6 pgs., Ontario, Canada.

(Continued)

*Primary Examiner* — James B Hull
(74) *Attorney, Agent, or Firm* — McDonald Hopkins LLC

(57) ABSTRACT

An automated assessment of various capabilities, such as cognitive, fine-motor, and memory skills, includes the use of Tangible Geometric Games (TAG-Games), which are a play-based assessment tools. TAG-Games are based on Sensor-Integrated Geometric Blocks (SIG-Blocks) and an interactive graphical user interface (GUI), which provide a means for real-time and remote monitoring of a user through operative communication between blocks and a remote computer. The data made available by employing TAG-Games includes: 1) block accelerations, 2) time at stages of assembly completion, 3) total completion time for quizzes, and 4) correctness of assembly steps. In addition, a GUI can display the real-time assembly configuration of the blocks.

3 Claims, 33 Drawing Sheets

(56) References Cited

U.S. PATENT DOCUMENTS

| | | |
|---|---|---|
| 7,614,881 B2 | 11/2009 | Bagues |
| 7,956,271 B1 | 6/2011 | Jonas |
| 2003/0059759 A1 | 3/2003 | Calhoun et al. |
| 2005/0067780 A1 | 3/2005 | Sanyal et al. |
| 2008/0237981 A1 | 10/2008 | Gilles |
| 2009/0035733 A1 | 2/2009 | Meitar et al. |
| 2009/0273560 A1 | 11/2009 | Kalanithi |
| 2010/0001923 A1* | 1/2010 | Zilber .................... A63F 13/22 345/1.1 |
| 2012/0258436 A1 | 10/2012 | Lee |
| 2013/0101976 A1 | 4/2013 | Roots et al. |
| 2013/0302763 A1 | 11/2013 | Edwards et al. |

OTHER PUBLICATIONS

Jeong et al., "SmartBall: Toward Interactive Play for Infants", TEI 2012, Feb. 19-22, 2012, 6 pgs., Ontario, Canada.

Jeong et al., "Sensor-Integrated Geometric Blocks: Towards Interactive Play-Based Assessment of Young Children", Wish 2010, Apr. 11, 2010, 4 pgs., Atlanta, Georgia.

Jeong et al., "TaG-Games: Tangible Geometric Games for Assessing Cognitive Problem-Solving Skills and Fine Motor Proficiency", 2010 IEEE International Conference on Multisensor Fusion and Integration for Intelligent Systems, Sep. 5-7, 2010, pp. 32-37, Salt Lake City, Utah.

Suzuki et al., "Interaction-Level Support for Collaborative Learning: AlgoBlock—An Open Programming Language", CSCL '95 Proceedings, Oct. 1995, pp. 349-355.

Sharlin et al., "Cognitive Cubes: A Tangible User Interface for Cognitive Assessment", CHI 2002, Apr. 20-25, 2002, pp. 347-354, vol. 4, issue No. 1, Minneapolis, Minnesota.

Anderson et al., "Building Virtual Structures with Physical Blocks", UIST '99, 1999, pp. 71-72, CHI Letters vol. 1, Asheville, NC.

Sanderson, "Parts Entropy Methods for Robotic Assembly System Design", 1984 IEEE, pp. 600-608.

Lee et al., "Robotic Self-replication in Structured Environments: Physical Demonstrations and Complexity Measures", The International Journal of Robotics Research, Jul. 1, 2008, pp. 387-401, vol. 27, No. 3-4, Sage Publications.

Buechley et al., "Boda Blocks: A Collaborative Tool for Exploring Tangible Three-Dimensional Cellular Automata", CSCL '07 Proceedings of the 8th International Conference on Computer Supported Collaborative Learning, 2007, 3 pgs.

Watanabe et al., "The Soul of ActiveBlock: Implementing a Flexible, Multimodal, Three-Dimensional Spatial Tangible Interface", ACM Computers in Entertainment, Oct. 2004, 13 pgs., vol. 2, No. 4, article 6b, ACM Inc., Broadway, New York.

Terrenghi et al., "A Cube to Learn: a Tangible User Interface for the Design of a Learning Appliance", Pers Ubiquit Comput, 2006, pp. 153-158.

Camarata et al., "Navigating Information Space with Tangible Media", International Conference on Intelligent User Interfaces, 2002, pp. 13-16, ACM Press, San Francisco, California.

Gorbet et al., "Triangles: Tangible Interface for Manipulation and Exploration of Digital Information Topography", Proceedings of CHI '98, 1998, pp. 18-23.

Schiettecatte et al., "AudioCubes: a Distributed CubeTangible Interface based on Interaction Range for Sound Design", Proceedings of the 2nd International Conference on Tangible and Embedded Interaction (TEI '08), Feb. 18-20, 2008, pp. 3-10, Bonn, Germany.

Newton-Dunn et al., "Block Jam: A Tangible Interface for Interactive Music", Proceedings of NIME '03, 2003, pp. 170-171, Montreal, Canada.

Alers et al., "Multi-Agent Platform for Development of Educational Games for Children with Autism", Games Innovations Conference, 2009, 7 pgs., ICE-GIC 2009, Intl. IEEE Consumer Electronics Society.

* cited by examiner

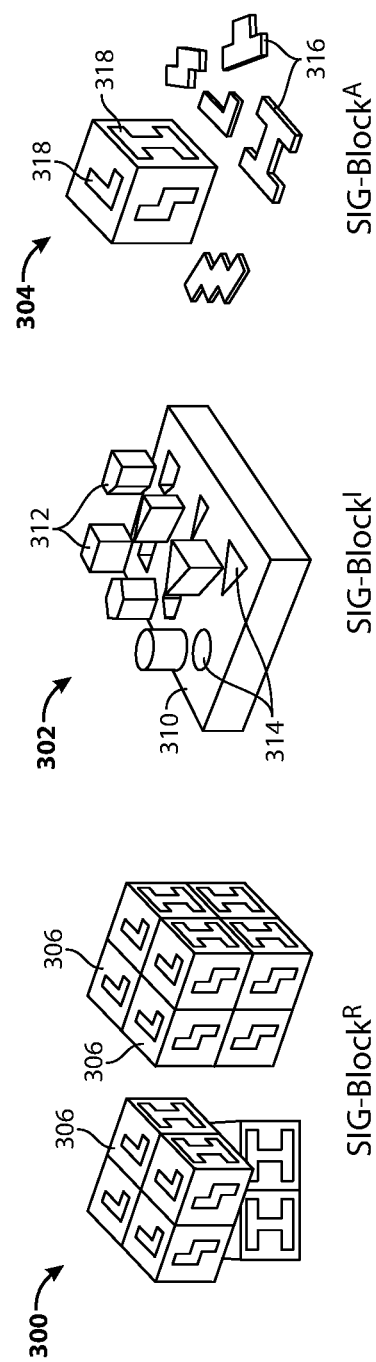

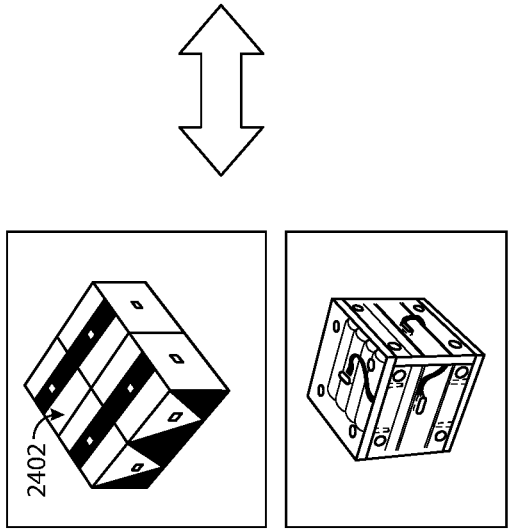
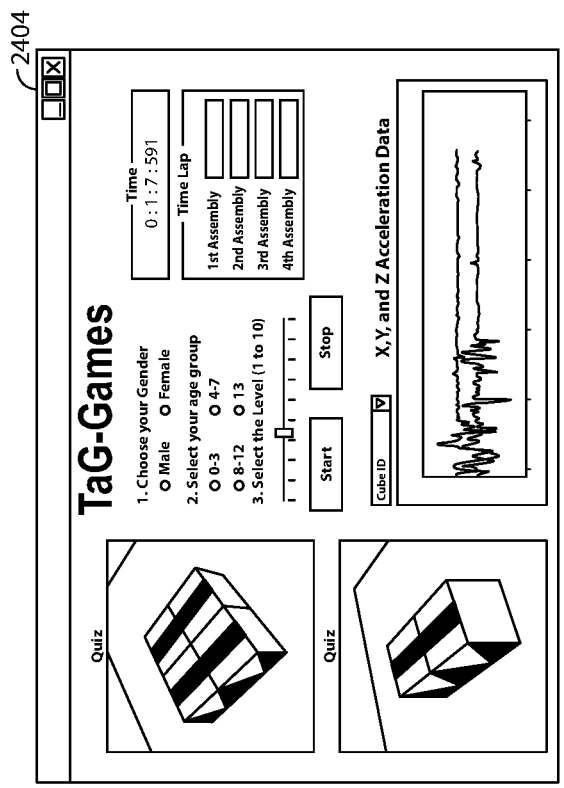
FIG. 24

```
┌─────────────────────────────────────────────────────────────────┐
│ Providing at least one block having a control unit in circuit   │
│ communication with a transmitter and at least one movement sensor (the) 3510
│ control unit capable of transmitting via the transmitter movement data │
│ corresponding to the movement of the block, and the control unit, the │
│ transmitter and the at least one movement sensor being positioned in an │
│ enclosure of the block)                                         │
└─────────────────────────────────────────────────────────────────┘
                                  ↓
┌─────────────────────────────────────────────────────────────────┐
│ Presenting to the user via a programmable display an image showing a │
│ target orientation of the at least one block and visual feedback based on │
│ user progress (the control unit performing at least one of:     │
│         automatically transmitting movement data about the block to │  3520
│ a remote computer while the user manipulates the block toward the target │
│ orientation;                                                    │
│         automatically collecting movement data about the block  │
│ while the user manipulates the block toward the target orientation and │
│ then later transmitting movement data to a remote computer; and │
│         automatically transmitting movement data about the block to │
│ an intermediate device while the user manipulates the block toward the │
│ target orientation and then later transmitting movement data to a remote │
│ computer from the intermediate device, wherein the intermediate device is │
│ a local computer, a mobile phone, or a mobile device)           │
└─────────────────────────────────────────────────────────────────┘
                                  ↓
┌─────────────────────────────────────────────────────────────────┐
│ Generating an assessment of the user based at least in part on movement │ 3530
│ data transmitted to the remote computer by the control unit     │
└─────────────────────────────────────────────────────────────────┘
                                  ↓
┌─────────────────────────────────────────────────────────────────┐
│ Storing in a computer memory the movement data for later use    │ 3540
└─────────────────────────────────────────────────────────────────┘
                                  ↓
┌─────────────────────────────────────────────────────────────────┐
│ Displaying or transmitting the assessment of the user           │ 3550
└─────────────────────────────────────────────────────────────────┘
```

FIG. 35

| Design | Element | Design | Element | Design | Element |
|---|---|---|---|---|---|
| 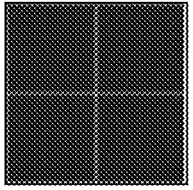 | 7-1 | 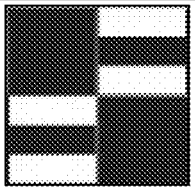 | 7-7 | 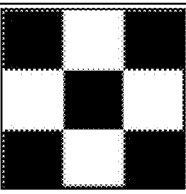 | 7-14 |
| 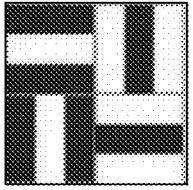 | 7-2 | 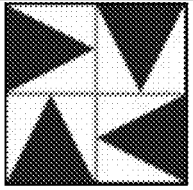 | 7-8 | 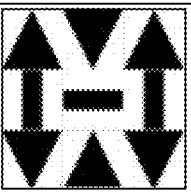 | 7-15 |
| 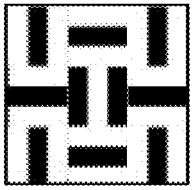 | 7-3 | 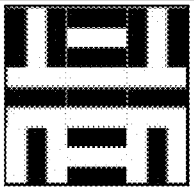 | 7-9 | 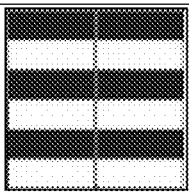 | 7-16 |
| 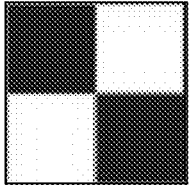 | 7-4 | 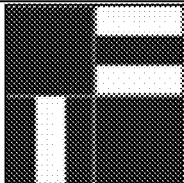 | 7-10 | 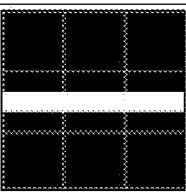 | 7-17 |
| 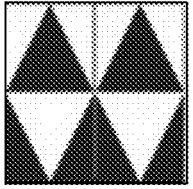 | 7-5 | 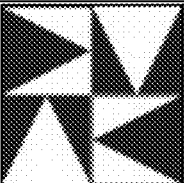 | 7-11 | 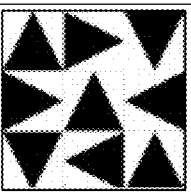 | 7-18 |
| 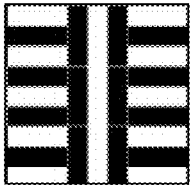 | 7-6 | 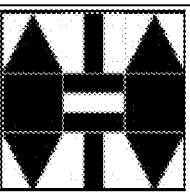 | 7-12 | 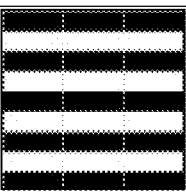 | 7-19 |
|  |  | 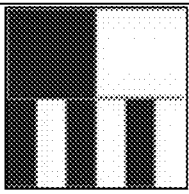 | 7-13 | 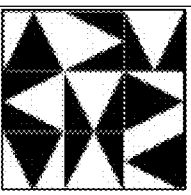 | 7-20 |
FIGURE 48

| Design | Element | Design | Element |
|---|---|---|---|
| | 8-1 | | 8-7 |
| | 8-2 | | 8-8 |
| | 8-3 | | 8-9 |
| | 8-4 | | 8-10 |
| | 8-5 | | |
| | 8-6 | | |

FIGURE 49

| Sequence pattern | Reference |
|---|---|
| Yellow-Blue-White-Green | 9-1 |
| Violet-Green-Yellow-White-Blue-Violet | 9-2 |
| Red-Blue-Yellow-Green-Blue-Violet-Yellow-White | 9-3 |
| Green-Blue-White-Violet-Yellow-Blue-White-Green-Yellow-White | 9-4 |
| ▷ ❚❚ ☐ ═ | 9-5 |
| ■ ═ ▷ ☐ ❚❚ ■ | 9-6 |
| ▼ ❚❚ ▷ ═ ❚❚ ■ ▷ ☐ | 9-7 |
| ═ ❚❚ ☐ ■ ▷ ❚❚ ☐ ═ ▷ ☐ | 9-8 |

FIGURE 50

AUTOMATED ASSESSMENT OF COGNITIVE, FINE-MOTOR, AND MEMORY SKILLS

CROSS-REFERENCE TO RELATED APPLICATIONS

This application is a continuation of U.S. patent application Ser. No. 15/188,150, filed on Jun. 21, 2016, entitled "Automated Assessment of Cognitive, Fine-Motor, and Memory Skills," which is a continuation of U.S. patent application Ser. No. 13/442,265, filed on Apr. 9, 2012, entitled "Automated Assessment of Cognitive, Fine-Motor, and Memory Skills," which claims priority to U.S. provisional patent application Ser. No. 61/473,213, filed Apr. 8, 2011, entitled "SIG-Blocks & TAG-Games." The contents of all above-identified patent applications are fully incorporated herein by reference.

BACKGROUND

Multiple biological and environmental factors related to child development are highly coupled. From birth, children's initial interactions with the environment are designed to foster increased cognitive, social, emotional, and physical capabilities.

Cognitive reasoning and problem solving skills and spatial/fine motor proficiency are closely linked to learning capabilities. Research suggests a reciprocal relationship between fine-motor skills and learning, such that these skills can be improved as one learns, and likewise, the development of fine-motor proficiency can improve one's general learning capabilities. Cognitive reasoning and problem solving are essential learning activities in both formal and informal educational settings. In addition, the concept of working memory, referring to "a brain system that provides temporary storage and manipulation of the information necessary for such complex cognitive tasks as language comprehension, learning and reasoning," is proven to be useful in analyzing the cognitive and learning processes involved in simple arithmetic and understanding mental and cognitive development through childhood.

According to a report by the Center for Disease Control and Prevention (CDC), medical costs due to the developmental delays and related health problems are enormous. In the United States, 17% of children have a developmental or behavioral disability such as autism, mental retardation, and Attention Deficit/Hyperactivity Disorder (ADD/AHD) resulting in an annual cost of $38,000 for those with lower levels of disability and more than $43,000 for those with higher levels of medical disabilities. Developmental health problems often last for life, causing not only tremendous economic burdens to family, but also challenges that threaten the overall quality of the person's life. Due to the uniqueness of each case, these developmental problems are difficult to identify and treat.

Autism is characterized by a cognitive style biased towards local rather than global information processing. The challenges in assessing children with Autism Spectrum Disorder (ASD) are imposed by difficulties in addressing individual differences and special circumstances. Most of the existing tests have a fixed set of problems that are difficult to adjust or modify. A play-based assessment approach may overcome issues associated with an unnatural, constrained environment. However, a play-based approach requires a well-trained professional to monitor the whole process with undivided attention. This is very expensive and labor intensive. It could also make objective and systematic assessment difficult. However, play-based assessments can provide more detailed information about these children, better identify weaknesses, and lead to earlier diagnoses and intervention targeted at strengthening social, emotional and cognitive functioning.

Geometric blocks may be employed in experimental studies on human behaviors and cognitive and fine-motor capabilities. Experiments using simple geometric blocks have demonstrated infants' consistent understanding of how to rotate objects in order to fit them into an aperture beginning at the age of two. In psychological and educational aspects, research suggests that physical motion or play takes an important role in learning and developing spatial abilities. Locomotion stimulates children's spatial imagery. Children can often solve problems when they are given concrete materials before solving them symbolically. Assessment of the cognitive and fine motor skills is important for neuroscientists who often need to monitor or diagnose mentally injured individuals. Block Design and Object Assembly tests are a part of the WISC (Wechsler Intelligence Scale for Children) and WAIS (Wechsler Adult Intelligence Scale).

SIG-Blocks and TAG-Games provide low-cost, effective screening/diagnostic tools for detecting behavioral disorders and developmental delays through non-invasive, play-based assessment.

SUMMARY

In one aspect, a block for use in assessing a user includes: a control unit; a power source; a movement sensor in circuit communication with the control unit for detecting movement of the block and generating and communicating to the control unit movement data from which at least one of the orientation of the block and other movement of the block can be determined; a transmitter in circuit communication with the control unit for transmitting movement data to a remote computer; and a cover enclosing the control unit, the power source, the movement sensor, and the transmitter, the cover having at least six sides upon which the block can rest, each side having a face, and while the block is resting on a side, another side is facing upwards with its face exposed, and other sides are exposed or facing another block; and wherein the block is further characterized by any one or by any two or more of the following: at least one of the sides is capable of selectively presenting one of at least two different face images responsive to the control unit, each of the at least two different face images having a different symmetry selected from no symmetry, one-fold symmetry, two-fold symmetry, and four-fold symmetry, permitting assessments of different difficulties using the same block; each of the sides further comprises a proximity sensor in circuit communication with the control unit for detecting the positioning of an object proximate that side and generating and communicating to the control unit proximity data, the control unit transmitting via the transmitter proximity data for each block side to the remote computer; at least one of the sides has one or more indentations into which a piece may be inserted and each of the at least one sides further comprises a first sensor in circuit communication with the control unit for detecting the insertion of the piece into the indentation and generating and communicating to the control unit insertion data, the control unit transmitting via the transmitter insertion data for each of the at least one sides to the remote computer; each of the sides has at least one magnet positioned to physically couple to a second block when one face of the block is proximate to one face of the second block and their edges are aligned; and the block is one of a plurality of blocks in a block assembly, wherein movement of one or more of the plurality of blocks of the block assembly is limited by rotating or sliding mechanisms of the block assembly.

In another embodiment, a method of using a geometric block to assess a user, includes: providing at least one block having a control unit in circuit communication with a transmitter and at least one movement sensor, the control unit capable of transmitting via the transmitter movement data corresponding to the movement of the block, and the control unit, the transmitter and the at least one movement sensor being positioned in an enclosure of the block; presenting to the user via a programmable display an image showing a target orientation of the at least one block and visual feedback based on user progress; the control unit performing at least one of: automatically transmitting movement data about the block to a remote computer while the user manipulates the block toward the target orientation; automatically collecting movement data about the block while the user manipulates the block toward the target orientation and then later transmitting movement data to a remote computer; and automatically transmitting movement data about the block to an intermediate device while the user manipulates the block toward the target orientation and then later transmitting movement data to a remote computer from the intermediate device, wherein the intermediate device is a local computer, a mobile phone, or a mobile device; generating an assessment of the user based at least in part on movement data transmitted to the remote computer by the control unit; storing in a computer memory the movement data for later use; and displaying or transmitting the assessment of the user.

In yet another embodiment, a computer system capable of assessing a user using a geometric block includes: at least one block having a control unit in circuit communication with a transmitter and at least one movement sensor, the control unit capable of transmitting via the transmitter movement data corresponding to the movement of the block, the control unit, the transmitter and the at least one sensor being positioned in an enclosure of the block, and the control unit performing at least one of: automatically transmitting movement data about the block to a remote computer while the user manipulates the block toward the target orientation; and automatically collecting movement data about the block while the user manipulates the block toward the target orientation and then later transmitting movement data to a remote computer; a computer system having at least a first display for displaying an image showing a target orientation of the at least one block; a receiver for receiving movement data transmitted by the control unit of the at least one block via the transmitter; and a processor configured to: generate an assessment of the user based at least in part on movement data transmitted to the remote computer by the control unit; store in a memory of the computer system the movement data for later use; and display or transmit the assessment of the user.

BRIEF DESCRIPTION OF THE DRAWINGS

These and other features, aspects, and advantages of the present invention will become better understood with regard to the accompanying drawings, following description, and appended claims.

FIG. 3A is a drawing of an exemplary SIG-Block type.

FIG. 3B is a drawings of another exemplary SIG Block type.

FIG. 3C is a drawing of another exemplary SIG Block type.

FIG. 24 includes a picture showing exemplary SIG-Blocks; and a screenshot of an exemplary assessor GUI during an exemplary TAG-Game.

FIG. 35 is a flowchart of an exemplary assessment method using an exemplary SIG-Block and an exemplary TAG-Game.

FIG. 48 illustrates the elements used in the 20 assembly quizzes and corresponding play complexity for exemplary TAG-Game referenced of Table 7.

FIG. 49 illustrates the elements used in the 10 Shape-matching quizzes and corresponding play complexity for TAG-Game of Table 8.

FIG. 50 illustrates the sequential elements used in the 8 quizzes and corresponding play complexity for TAG-Game of Table 9.

DETAILED DESCRIPTION

Figure 1:
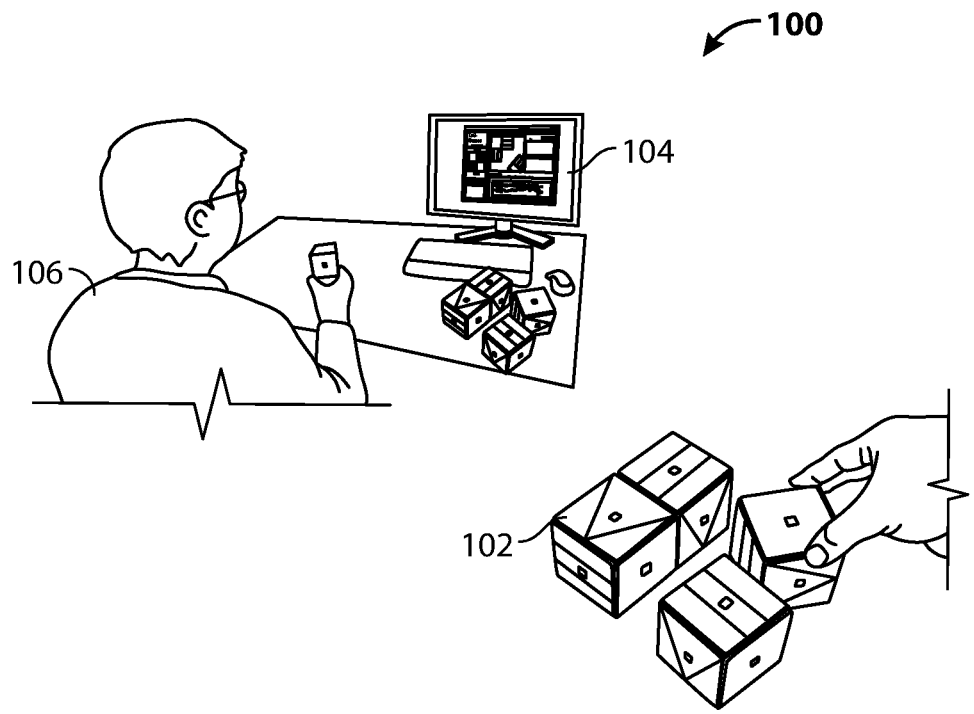
FIG. 1 is a picture showing an exemplary embodiment of a user test environment showing exemplary SIG-Blocks and an exemplary TAG-Game.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Measurement," as used herein includes, but is not limited to, an extent, magnitude, size, capacity, amount, dimension, characteristic or quantity ascertained by measuring. Example measurements are provided, but such examples are not intended to limit the scope of measurements the systems and methods described herein can employ.

"Operative communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

Tangible Geometric Games (TAG-Games) is a play-based assessment tool that may be used for measuring various capabilities, for example, cognitive problem-solving, fine motor, and working memory skills. TAG-Games are based on sensor-integrated geometric blocks (SIG-Blocks) and an interactive graphical user interface (GUI) providing a means for real-time and remote monitoring of a user through operative communication between blocks and a host or remote computer. The data made available by employing TAG-Games may includes, among others: 1) block accelerations, 2) time at stages of assembly completion, 3) total completion time for quizzes, and 4) correctness of assembly steps. In addition, a GUI can display the real-time assembly configuration of the blocks.

SIG-Blocks are intended for use in assessments that are similar to a game style of play. In one embodiment, a user may be instructed to manipulate a set of blocks to achieve a goal assembly configuration provided by an interactive GUI. The interactive GUI may also provide real-time animation of the assembly configurations of the blocks. This function allows an assessor to observe the manipulation patterns and performance of a user during play without requiring an external video camera recording the entire process. To provide a computational method for analyzing the complexity associated with manipulating the geometric blocks, a quantitative measure of play complexity based on configurational entropy reduction and/or geometric properties can be utilized.

Figure 2:
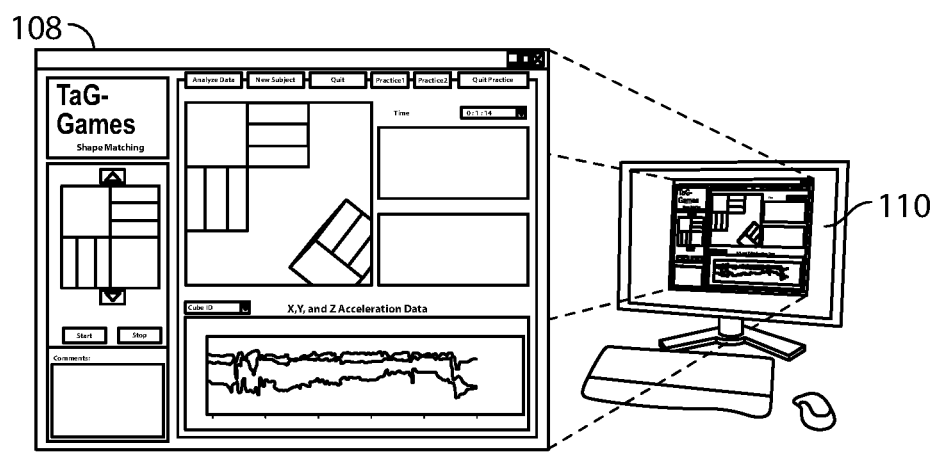
FIG. 2 is a picture showing an exemplary assessor interface and an exemplary remote computer.

As shown in FIG. 1, a TAG-Games system 100 utilizes SIG-Blocks 102 and, for example, an interactive GUI 104. The TAG-Games system 100 may also provide real-time and remote monitoring of a user 106 through, for example, wireless operative communication between SIG-Blocks 102 and an assessor interface 108, which may be, for example, a remote computer 110, as shown in FIG. 2.

Figure 4C:
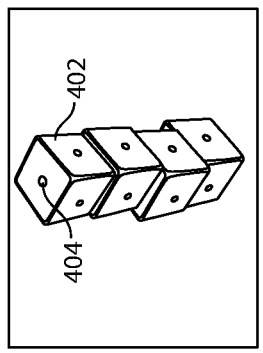
FIG. 4C includes another picture of an exemplary SIG Block type with illuminated LEDs.
Figure 4B:
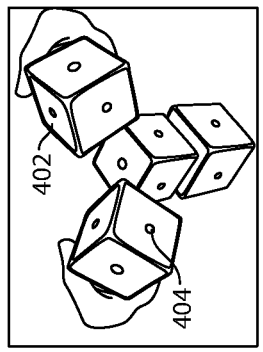
FIG. 4B includes another picture of an exemplary SIG Block type with illuminated LEDs.
Figure 4A:
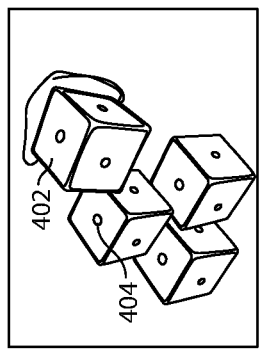
FIG. 4A includes a pictures of an exemplary SIG-Block type with illuminated LEDs.

Referring to FIG. 3, three exemplary types of SIG-Blocks are shown: SIG-Block$^R$ 300 for reconfiguration (FIG. 3A), SIG-Block$^I$ 302 for insertion (FIG. 3B), and SIG-Block$^A$ 304 for assembly (FIG. 3C). The exemplary SIG-Block$^R$ 300 for reconfiguration is a block assembly including a plurality of blocks 306, where movement of one or more blocks 306 is limited by rotating or sliding mechanisms of the block assembly. The plurality of blocks 306 in the SIG-Block$^R$ 300 may be any one or combination of other SIG-Blocks. The exemplary SIG-Block$^I$ 302 for insertion includes an exemplary base 310 and exemplary shape blocks 312, where the base 310 has shaped openings 314 for receiving corresponding shape blocks 312. Either the base 310 or the shape blocks 312 may have sensors for detecting insertion of any particular shape block 312. The exemplary SIG-Block$^A$ 304 for assembly includes exemplary removable pieces 316, where the block has shaped indentations 318 for receiving corresponding pieces 316. Either the pieces 316 or the indentations 318 may have sensors for detecting insertion of any particular piece 316 into an indentation 318. Any of these exemplary SIG-Blocks may also include various features, including, for example, communication capabilities and sensors for identifying movement and position, as described in more detail below. Various features of any of the exemplary SIG-Blocks may be combined or modified to suit any particular application. For example, an exemplary SIG-Block$^A$ may not have removable pieces for insertion into the sides of the block, but may be configured for use as a stand-alone block or for use in conjunction with other blocks. SIG-Blocks can be selected for designed play with a certain level of complexity. SIG-Blocks can also be selected for sequential play involving more than one type of SIG-Block, where, for example, the entire play will require completion of both insertion and reconfiguration. FIGS. 4A, 4B, and 4C show another set of exemplary SIG-Blocks: five cube-shaped, lamp (e.g., LED) installed blocks 402. These blocks 402 may have color-changing LEDs 404 to provide visual feedback to the user, such as manipulation status/speed and/or correctness of assembly.

Various types of TAG-Game assessments, designed as geometric games, can include, for example: TAG-Game$^A$ for assembly; TAG-Game$^S$ for shape matching; and TAG-Game$^M$ for sequence memory. For example, TAG-Game$^A$ may be a puzzle game in which the user/player is asked to recreate a displayed image using the SIG-Blocks. TAG-Game$^S$ may be a problem-solving game in which the user tries to figure out the visual relationships within an image in order to complete the pattern. The user's answer may be displayed by placing a SIG-Block with the correct image in the correct orientation face up. TAG-Game$^M$ may be a memory game that involves remembering a sequence of images and then replaying them back using a SIG-Block. A sequence of images is displayed by flashing each image at a time and the user replays the image sequence by rotating the block and placing it with the correct face up sequentially. All of the images can be displayed at once for a certain amount of time. In this example, the user's answer is displayed similarly to TAG-Game$^A$ by placing the SIG-Blocks with correct images and orientations in exact locations.

To assess an individual's intellectual and cognitive capability, testing tasks should be neither too difficult nor too easy to effectively capture individual differences. Unfortunately, standardized tests may lose sensitivity at their margins. Computational modeling and complexity analyses play a role in physical design and dynamic reconfiguration of SIG-Blocks for customized cognitive assessment. When a subject presents a particular condition, SIG-Blocks may have a first configuration that is used for a first baseline task. Then, the difficulty of the TAG-Game tasks and/or the displays on the SIG-Blocks can be changed to make the assessment tasks harder or easier and thus more appropriate for a testing, rehabilitation, or analysis session. In this way, testing sensitivity may be maintained, even at traditional margins, by allowing dynamic reconfiguration.

Cognitive development involves a number of external and internal factors that influence the speed of the developmental process and the level of cognitive capacities. Due to the complex nature of intellectual and cognitive mechanisms, the actual effect of impaired senses is difficult to measure. Individual performance and behavioral patterns during play with SIG-Blocks/TAG-Games can be measured through pattern recognition and motion detection of the SIG-Blocks. The blocks may be configured with a timer to measure the time for significant events (e.g., completion of assembly for the first block). To assess certain aspects of coupled cognitive capacity and influences of impaired senses, SIG-Blocks may be easily transformed to change the level of play complexity, such as, for example, by simply increasing the number of blocks. SIG-Blocks may also be constructed to capture the effects of different types of sensory feedback. As shown in Table 1, different blocks may be reprogrammed for specific experiments to provide or remove additional sensory feedback during play, also referred to as the level of support during play.

TABLE 1

SIG-Blocks can be transformative to support various experiments.

| Block Types | NC/NS | C/NS | NC/S | C/S |
|---|---|---|---|---|
| SIG-Block$^I$ | Sight | Enhanced Sight | Sight | Enhanced Sight |
| SIG-Block$^A$ | Touch | Sight | Hearing | Hearing |
| SIG-Block$^R$ | | Touch | Touch | Touch |

NC: Non-Color coded;
NS: No Sound;
C: Color Coded/enhanced;
S: Sound enabled

Regarding the exemplary TAG-Games mentioned above, each is intended to test a different sub-set of psychological, developmental, and motor skills, as shown in Table 2, as well as be interactive and fun for the user. A user proficiency at a certain game is reflected in the time taken to complete it and the accuracy of the answer. Additional behavioral data, such as spatial manipulation skills, overall speed of motions, dominant frequency of hand motions, repetitive or hyperactive activities, and estimated manipulation trajectories can be also obtained by analyzing the sensor data. Exemplary games include Assembly, Shape Matching, and Sequence Memory, and are described in more detail below.

TABLE 2

Three types of TAG-Games with related cognitive skills and behavioral data available.

| TAG-Game Types | Associated Cognitive Skills |
|---|---|
| TAG-Game$^A$ Assembly | Fine-motor proficiency; Visual-motor integration; Low-level working memory |

TABLE 2-continued

Three types of TAG-Games with related cognitive skills and behavioral data available.

| TAG-Game Types | Associated Cognitive Skills |
|---|---|
| TAG-Game$^S$ Shape Matching | Fine-motor proficiency; Visual-motor integration; Low-level working memory; Cognitive problem solving; Conceptual reasoning |
| TAG-Game$^M$ Sequence Memory | Fine motor proficiency; Visual-motor integration; High-level working memory; Attention span |

Assembly Game

Figure 5:
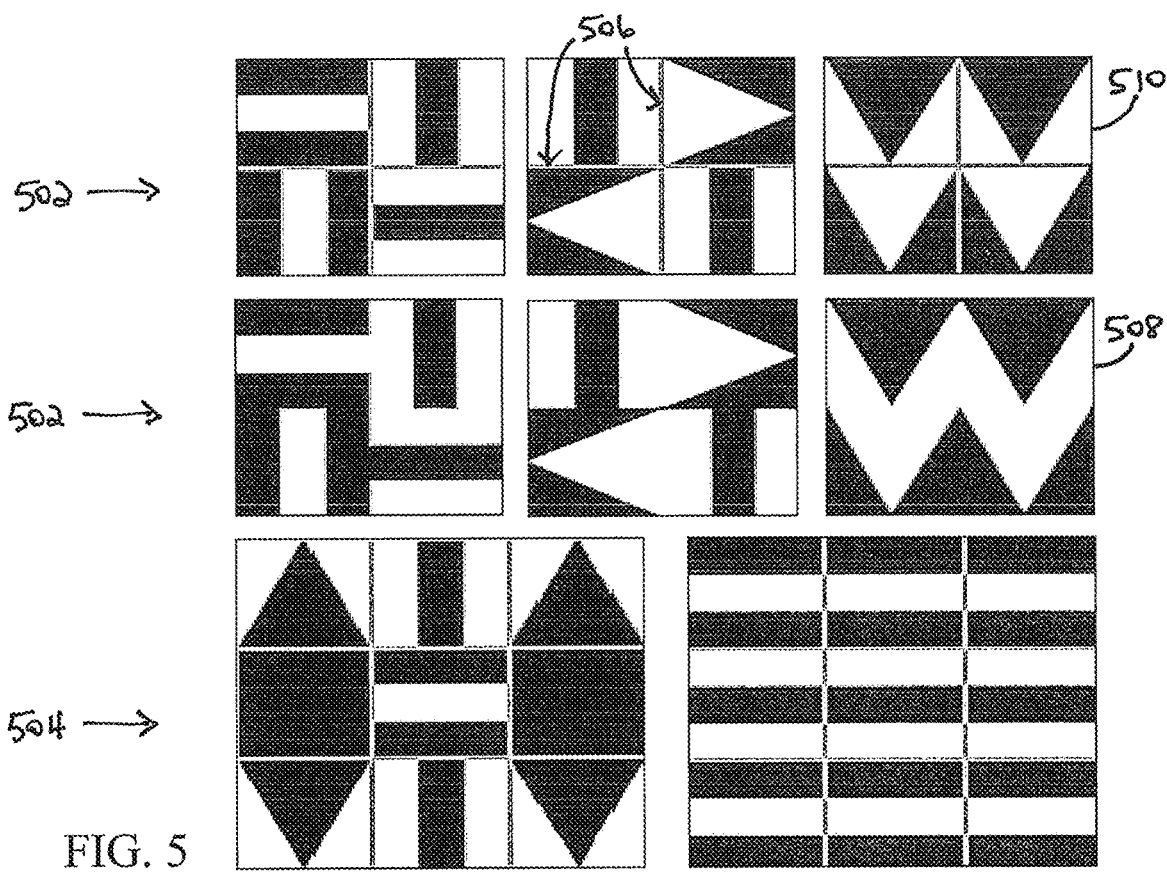
FIG. 5 includes drawings of exemplary 2×2 and 3×3 TAG-Game patterns.

The assembly game is a puzzle game in which the user is trying to recreate a displayed image using the SIG-Blocks. FIG. 5 shows assembly game examples of 2×2 (502) and 3×3 (504) game patterns with and without dividing lines. The user is shown a pattern like those seen in FIG. 5 and then must rotate and rearrange the blocks to find the correct images to recreate the pattern using images on the faces of the blocks. The difficulty and interest of this task comes from the manipulation of the blocks by the user's hands to find the correct images, the size of the pattern, and the distinguishability of the images on the block faces within the goal image. The distinguishability of the patterns can be decreased in order to make them more difficult by removing the lines 506 separating the pattern components. This change results in the big picture being more prominent in the patterns than the individual block face images. FIG. 5 demonstrates this by showing the same three patterns with and without dividing lines 506 between the block faces required to make the goal image. Most noticeably, the far right goal image looks like a 'W' 508 when viewed without dividing lines 506, but when the dividing lines 506 are added, it becomes clear that it is simply comprised of four triangular block faces 510.

Shape Matching Game

Figure 6:
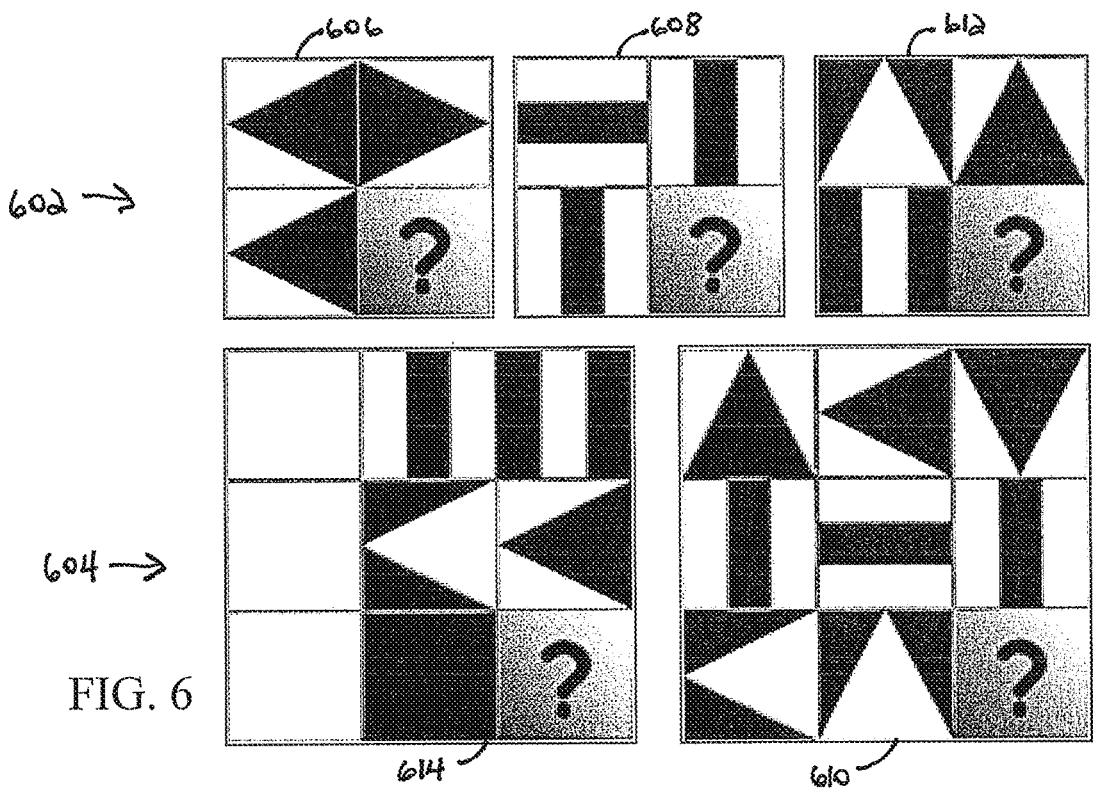
FIG. 6 includes additional drawings of exemplary 2×2 and 3×3 TAG-Game patterns.
Figure 7:
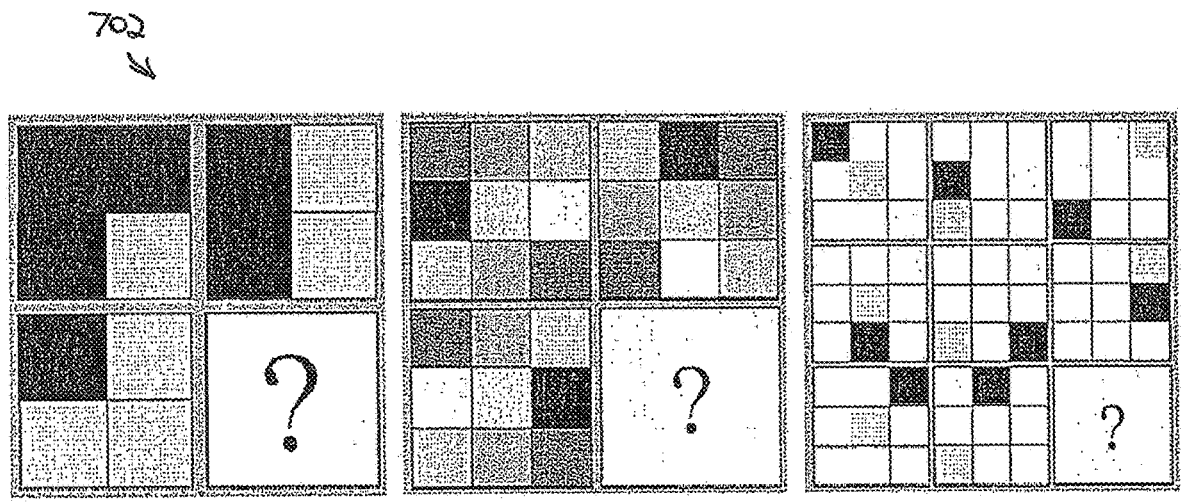
FIG. 7 includes additional drawings of exemplary 2×2 and 3×3 TAG-Game patterns.

The shape matching game is a problem solving game in which the user tries to figure out the visual relationships within an image pattern, in order to complete the pattern with the last (missing) image. FIG. 6 shows shape-matching game examples of 2×2 (602) and 3×3 (604) game patterns. It is played by placing a SIG-Block with the correct image in the correct orientation face up. From these examples, it can be seen that a variety of methods need to be used to figure out what image completes the pattern in the blank location identified with, for example, a question mark. The most basic pattern 606, seen in the top left of FIG. 7, is based on symmetry (or a mirrored image), in this case about the vertical axis. Identifying rotation relationships is important in solving the top middle 608 and bottom right 610 patterns. For the top right pattern 612, the colored compliment of the image must be identified. In the bottom left pattern 614, the difference between images within the rows is used to determine the missing image. Another variation of this game is shown in FIG. 7, where a SIG-Block$^R$ with colored faces 702 may be used.

Sequence Memory Game

The sequence memory game is a game that involves remembering a sequence of images and then replaying them back using a SIG-Block. The sequences can be displayed by showing all the images at once for a certain amount of time or each image can be flashed one at a time in sequence. The user replays the image sequence by rotating a block and placing it with the correct face up sequentially. Different face image pattern sets may be used, for example, a set of six different colors (red, blue, green, yellow, purple, and white)

and the set of geometric patterns used in the other two games. The difficulty associated with remembering a sequence is related to what image set is used, the length/size of the pattern, and the number of repeating elements within the sequence.

Other Games

Figure 8:
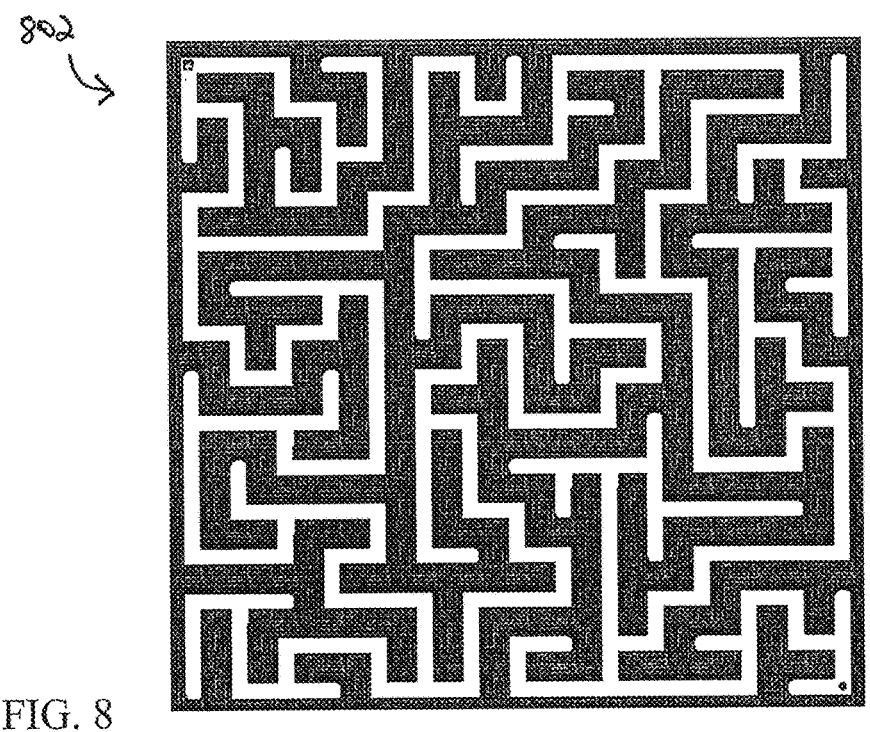
FIG. 8 is a drawing of an exemplary maze game.
Figure 9:
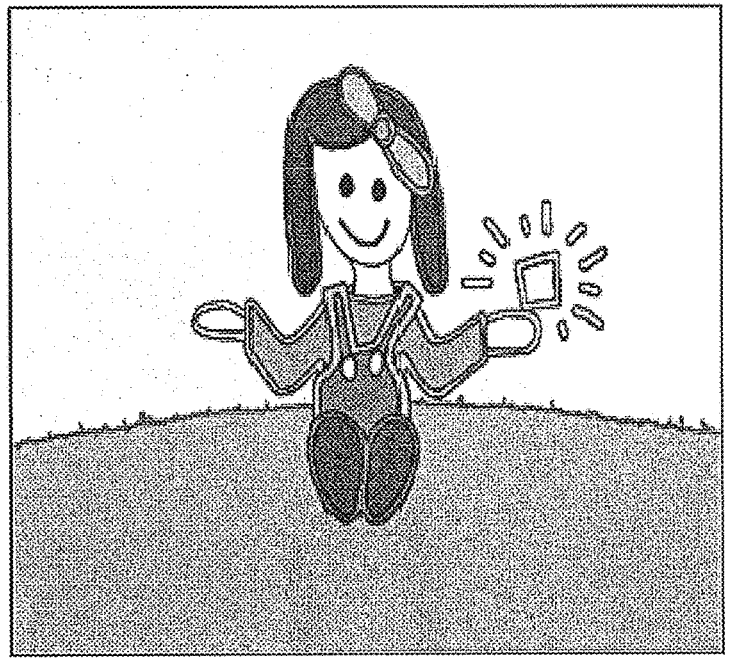
FIG. 9 is a drawing of an exemplary "ShakeShake" game interface.

The three TAG-Games described above are designed primarily for performance assessment. However, SIG-Blocks can function as a technology platform that can be used for a wide range of games for entertainment and educational purposes. For example, another exemplary game is a maze traversal game in which the user is presented with a maze that can be navigated by rotating a SIG-Block in the direction they wish to travel. This game is mostly for entertainment, but it does require working memory and problem solving skills in addition to good fine motor control. The game can be played as a single player or a multiple player game, with players competing to get to the goal location. The mazes may be randomly generated with varying complexity and may include options to incorporate extra points for visiting certain locations in the maze other than the goal location, sound or tactile (e.g., vibration) effects for moving different directions, and a choice of cursor pictures. A sample maze 802 can be seen in FIG. 8. Another exemplary game is "ShakeShake," and is intended to measure the response time to various stimuli. It is played by shaking SIG-Blocks in each hand as fast as possible in response to visual and audio signals. It may also be played by selecting a SIG-Block with a matching shape among many SIG-Blocks and then shaking it. The game interface 902 with a visual stimulus can be seen in FIG. 9.

SIG-Blocks and TAG-Games are useful in multidisciplinary research activities related to early childhood education, child development, special education, rehabilitation for the elderly and people with disabilities, Science, Technology, Engineering, and Mathematics (STEM) education for young children, etc. SIG-Blocks and TAG-Games may also be used for game playing, including online, multi-player online, massively online, and other gaming. The GUI provides a user-friendly real-time feedback and data analysis system that can be utilized locally or remotely. For example, data may be transmitted wirelessly to a local device (e.g., a mobile or smart device, smart phone, tablet computer, and other portable or wi-fi devices) and then transferred to a remote device, via, for example, a network (e.g., Internet, mobile telephone network) or portable device (e.g., USB or flash memory), which can be utilized by an assessor.

TAG-Games may utilize one or more SIG-Blocks and one or more GUIs that may utilize wireless communication for operative communication with other devices, such as, for example, a remote computer or other blocks, as shown, for example, in FIGS. 1 and 2. From the user's standpoint, the SIG-Blocks 102 may be used much like game controls to play TAG-Games. A GUI 104 may provide instructions and feedback to the user 106. The same or another GUI 108 may provide assessment information to an assessor via, for example, the remote computer 110.

Exemplary SIG-Blocks may consist of a set of cube blocks with embedded hardware, software, logic, circuits, controllers, processors, and other electronic components for automated and wireless measurements of performance and behavioral data. A SIG-Block may contain a number of components that enable the block to sense and communicate various data. For example, a SIG-Block may include a power source (e.g., rechargeable batteries), a bi-directional (wireless) communication module for operative communication with other blocks and/or other devices (including, e.g., remote computer), one or more movement/motion sensors, one or more proximity/position sensors, a controller, a processor, and an integrated circuit, among other components. Sensors may also detect assemblies and manipulative motions. Wireless communication may be used for data collection, reprogramming, and sensory feedback mechanisms. Examples of embedded sensors that make these capabilities possible include gyroscopic sensors, tri-axial accelerometers, optical sensors, and electromechanical contact sensors. SIG-Blocks may also be capable of providing sensory feedback to the user via, for example, reprogrammable LED patterns on the surface of the blocks (visual), a piezzo buzzer (auditory), or a vibration motor (tactile). Exemplary blocks may be about 2.75 inches in length along each side and weigh about half a pound.

Figure 10:
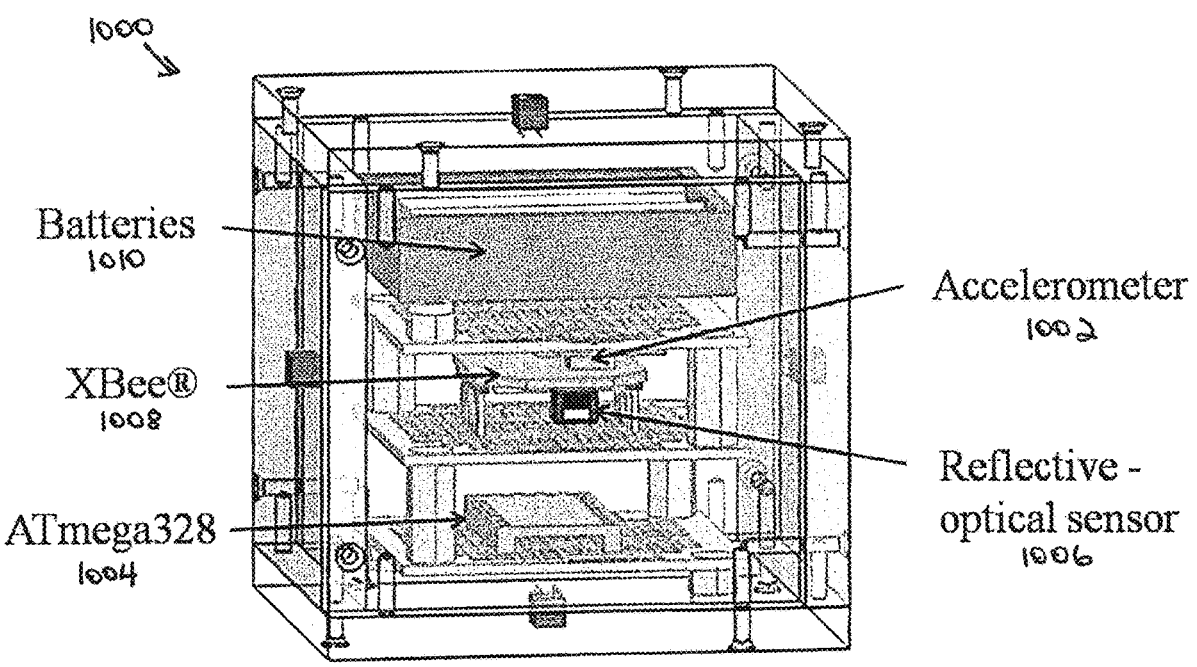
FIG. 10 is a drawing of an exemplary SIG-Block.
Figure 11:
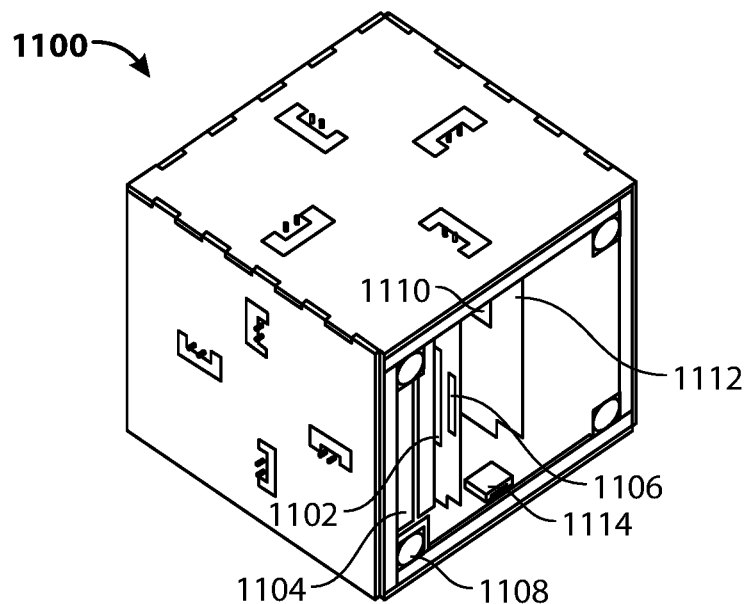
FIG. 11 is a drawing of another exemplary SIG-Block.
Figure 12:
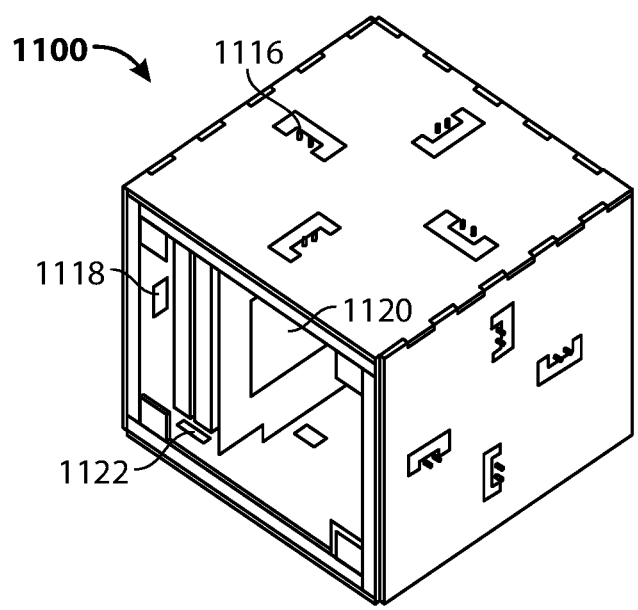
FIG. 12 is a drawing of another exemplary SIG-Block.

Referring to FIG. 10, an exemplary cube-shaped SIG-Block 1000 with a layered design is shown with a tri-axial accelerometer 1002 (e.g., Freescale Semiconductor MMA7260Q) to measure manipulative motions, a micro-controller/microprocessor 1004 (e.g., ATMEL ATMEGA328), six reflective optical sensors 1006 to detect assembly among the blocks (one on each face of the cube), a wireless communication module 1008 (e.g., XBee®), and four AAA batteries 1010. FIGS. 11 and 12 show another exemplary block 1100 where most of electronic components are surface-mounted, which reduces the weight and size of the overall block 1100. This block 1100 may also include a 128 Kbyte ISP flash memory card, a 4 Kbyte EEPROM, 8 Kbytes SRAM, and 86 general-purpose I/O lines (not shown). The I/O lines are used to collect inputs from the sensors and execute sensory feedback functions. For example, as shown in FIG. 11, this block 1100 includes an 8-bit microcontroller/microprocessor 1102 (e.g., ATMEL ATMEGA1280), which may control and execute application programs and handle sensor-collected data. One skilled in the art will appreciate that other designs may be employed.

FIG. 11 also shows exemplary Li-ion batteries 1104, a USB to Serial circuit 1106, ball magnets 1108 (in each corner), a piezo buzzer 1110, a wireless communication module 1112 (e.g., XBee®), and a USB mini-b port 1114. Ball magnets 1108 may be used to assist close assembly and alignment of one SIG-Block 1100 to another 1100. The piezo buzzer 1110 is an exemplary device for auditory feedback. The USB mini-b port 1114 may be utilized for operative communication to and from the block 1100, as well as for charging of the exemplary rechargeable batteries 1104.

FIG. 12 shows exemplary spring-loaded pin connectors 1116 (shown as 4 pairs per side), a gyroscope 1118, a tri-axial accelerometer 1120, and LED driver 1122. The spring-loaded pin connectors 1116 are exemplary proximity sensors, and are described in more detail below and shown in FIGS. 14 and 15. The gyroscope 1118 and tri-axial accelerometer 1120 are exemplary motion sensors, and are also described in more detail below. The LED driver 1122 is used to drive LEDs on the surfaces of the block 1100. The combinations of LEDs may be reconfigurable and reprogrammed to display various images on the surfaces on the sides of the block 1100. The LEDs are described in more detail below and shown illuminated in FIG. 16.

Figure 13:
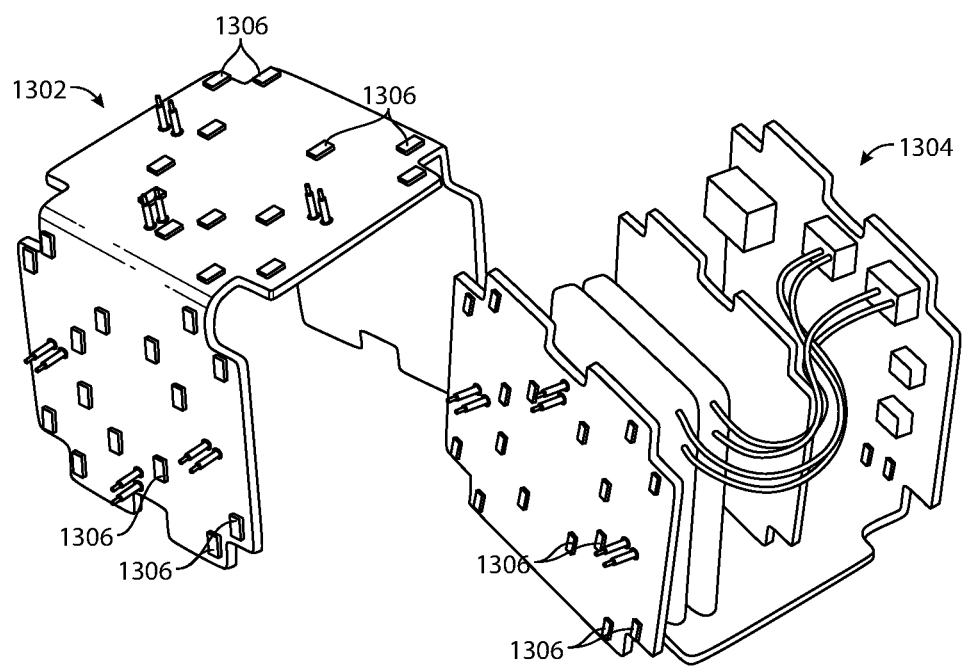
FIG. 13 is a picture of exemplary electrical components of an exemplary SIG-Block.

FIG. 13 is a picture of electrical components of an exemplary SIG-Block. In this embodiment, the SIG-Block comprises two assemblies, where the first assembly 1302 includes electronics for three sides of an exemplary SIG-Block, and the second assembly 1304 includes electronics for the other three sides of the exemplary SIG-Block and an electronics core supporting the general features of the SIG- Block. When assembled together, the exemplary assemblies 1302, 1304 form the electronics of an exemplary SIG-Block cube, such as, for example block 1100. FIG. 13 includes exemplary circuit boards forming the assemblies, each also with exemplary LEDs 1306 mounted on the surfaces of the circuit boards facing the outside of the block.

Figure 14:
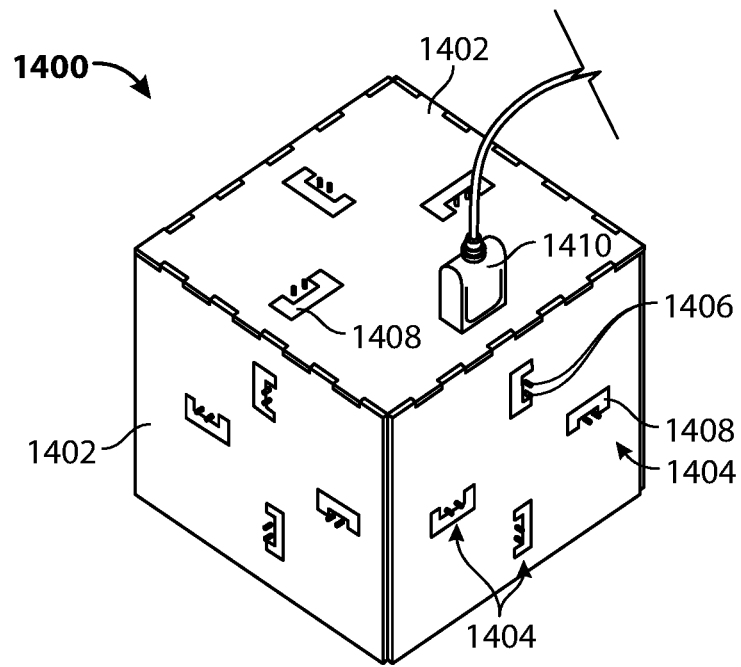
FIG. 14 is a picture of an exemplary SIG-Block with an exemplary USB connector.

FIG. 14 is a picture of an exemplary SIG-Block 1400 with exemplary sides 1402 covering electronic components, such as, for example, the electronic assemblies shown in FIG. 13. As shown in FIG. 14, each side may include one or more spring-loaded proximity sensors 1404. These sensors 1404 may include two spring-loaded pins 1406 for making contact with a corresponding conductive surface 1408 on a mating block 1400. When assembled next to each other, a circuit including a pair of the spring-loaded pins 1406 is completed when contact is made with the conductive surface 1408 from another block 1400. In this manner, it can be determined that one block 1400 is in proximity to another block 1400. Multiple sets of these, or other, exemplary proximity sensors 1404 on each side of the SIG-Block 1400 may also allow for the determination of the relative orientations of the block 1400 faces. Other proximity sensors include, for example, electromagnetic transmitter/receiver pairs and spring-loaded switches (where, for example, mechanical actuation of an actuator on the face of the block 1400 changes the state of an electrical circuit associated with that face of the block 1400) mounted on a block 1400 face. FIG. 14 also shows an exemplary USB connector 1410 connected to the block 1400.

Figure 15:
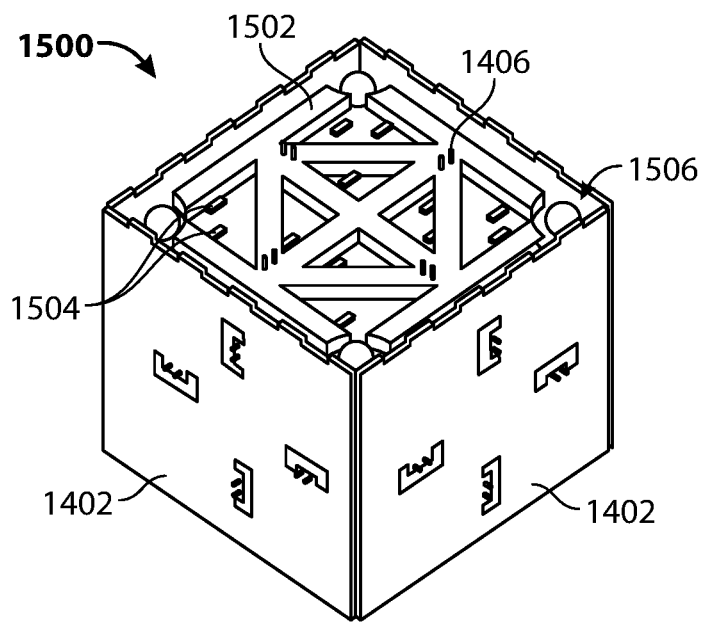
FIG. 15 is a picture of another exemplary SIG-Block with a side removed.

FIG. 15 is a picture of an exemplary SIG-Block 1500 with exemplary sides 1402 covering electronic components, such as, for example, the electronic assemblies 1302, 1304 shown in FIG. 13. However, in FIG. 15, one of the sides is removed to show an exemplary side piece 1502 that may isolate particular areas of the block face to be illuminated by the exemplary LEDs 1504. In this example, each side includes eight individual areas that may be each illuminated by two of the exemplary LEDs 1504 described above. The side piece 1502 also includes holes for the spring-loaded pins 1406 to pass through and openings 1506 in the corners for exemplary ball magnets.

Figure 16A:
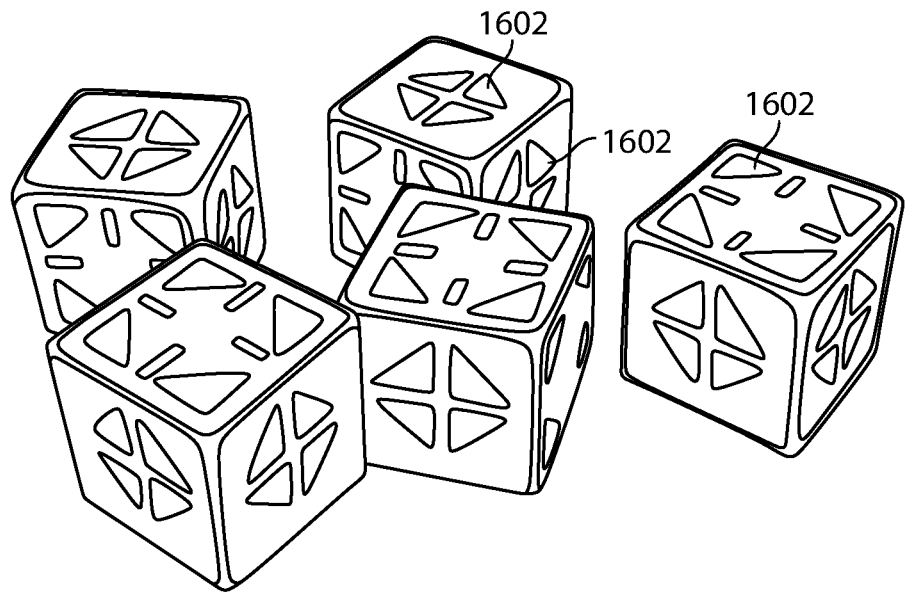
FIG. 16A is a picture of exemplary SIG-Blocks with illuminated LEDs.
Figure 16B:
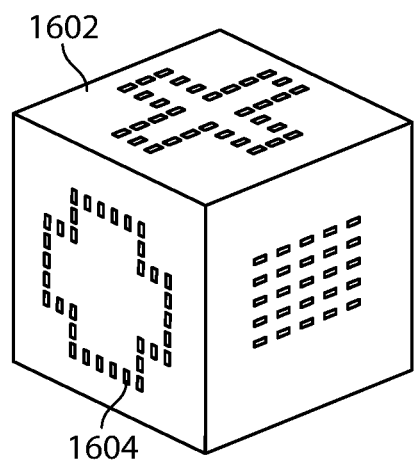
FIG. 16B is a drawing of another exemplary SIG-Block.

FIG. 16A is a picture of five exemplary SIG-Blocks with different colored LEDs illuminating various areas 1602 of the exemplary blocks. As shown, by illuminating different areas 1602 of the block faces, various geometric images may be displayed on each block face of each block. FIG. 16B is a drawing of another exemplary SIG-Block 1602 with features similar to those described above, but with a more complex array of LEDs 1604 to facilitate displaying a variety of colors and shapes on the block 1602 faces.

A motion sensor (e.g., accelerometer, gyroscope, or other) can communicate whether and how much a block is moving and a proximity/position sensor (e.g., optical, electromechanical, or other), which may be placed on each face of the block, can communicate whether a particular block face is covered or located next to another block. In one embodiment, one or more motion sensors of an exemplary SIG-Block are included in an Inertial Measurement Unit (IMU). The communication module can transfer raw or processed sensor data to an assessor device (e.g., remote computer). Each block has a unique identifier (ID) so that the remote computer is able to distinguish the blocks from each other and be able to reconstruct the three-dimensional relative locations of the blocks. In addition, wireless operative communication among SIG-Blocks can facilitate peer-to-peer pattern recognition and assembly recognition among the blocks themselves.

Various sensors can be used to determine a block's position, relationship with other blocks, and relationship with the user. For example, a SIG-Block may have a pattern of magnets internal to the block that correspond to an identical pattern of magnetic switches or Hall effect sensors on another SIG-Block. These sensors can detect when a block has been correctly attached to another block or a peg has been placed in a hole. Other SIG-Blocks may use inductive coils or LEDs and photo-detectors to operatively communicate identification information between blocks. Tactile sensors that sense pressure, temperature sensors, optical proximity sensors, or even resistive sensors that sense hand resistance (perspiration) may be built into the surfaces of the SIG-Blocks to detect gripping of the SIG-Block. In another example, a SIG-Block may use a tilt switch instead of or in addition to other position or motion sensors, such as accelerometers and gyroscopes. SIG-Blocks may also include features that provide different levels of feedback to support activities during an assessment (e.g., active optical, audio, or vibration feedback to the user based on goals or performance). In other embodiments, magnets may assist in proper assembly or alignment of blocks.

Exemplary SIG-Blocks may also incorporate miniature MEMS sensors, including "mote" and "smart dust," that may incorporate many sensors and wireless communication elements into packages that may be approximately one cubic centimeter or less. An exemplary mote that may be utilized in a SIG-Block is the Crossbow Imote2. This mote incorporates a Texas Instruments 2.4 GHz radio transceiver that can provide 250 kb/s data transmission in 16 channels. Communications protocols for complex networks of sensor-equipped motes include, for example, TinyOS and Zigbee.

In one example, measurement data from integrated sensors may include full angular and linear accelerations, assembly detection, pattern recognition, grasping detection, and the incremental and discrete times for significant events. In one example, the data of interest from the SIG-Blocks will include: i) time to completion of placement of all blocks and total completion time, ii) number of blocks correctly placed, iii) number of perseverative errors, and iv) amount of support (or additional sensory feedback) needed to correctly complete the task.

The exemplary embedded sensors and timer in the microprocessor may develop the following information: accuracy of manipulations; time at each manipulation step; total time; and other behavioral characteristics. In terms of accuracy of manipulations, step-by-step correctness/incorrectness may be detected at each manipulation step, and thus the total detection notifications may exceed the minimum number of steps required for completing each quiz because a user may assemble a block incorrectly and then disassemble and reassemble it correctly. Incremental time may be measured at each manipulation completion; and the total completion time may be measured at each item completion, where each item may involve several manipulation steps. Tri-axial accelerations of the blocks may be measured, for example, every 0.06 seconds. Further data analysis may produce additional behavioral information, such as dominant frequency of motion, maximum and average speed/acceleration of motions, and manipulation patterns. Such behavioral data may be useful in observing manipulative pattern changes and strategic behavior in individuals who use TAG-Games over time.

In one embodiment, the exemplary microprocessor embedded in each block can perform on-board, low-level data processing, such as noise filtration for the acceleration data. The raw acceleration data derived from the exemplary accelerometer may be first filtered with a low-pass filter and fed into a 3-point smoothing method. The resulting data may then be sent to a remote computer for analysis through enabled wireless communication. During operative communication, the wireless data package may contain ten data packets. For example, the first packet may include the block ID number, which facilitates distinction between blocks. The next six packets may include raw proximity sensor data corresponding to the assembly status of each block face. In the case of an optical proximity sensor, the values may be 0 if the sensor is covered (i.e., the face is covered by another block) and 1 if it is not. The last 3 packets may correspond to the acceleration data in the x, y, and z directions and may have values ranging between −1.0 g and 1.0 g.

Table 3 summarizes data that may be available from exemplary embedded sensors, pre-processed data via onboard processing, and target assessor data.

TABLE 3

Embedded sensors and corresponding raw sensor data and processed data.

| Sensors | Raw Sensor Data | Pre-processed Data | Assessor Data |
|---|---|---|---|
| Optical sensor (proximity) | 0 if the block face is covered; 1 otherwise | Filtered tri-axial accelerations | Real-time assembly detection |
| Other proximity sensor | Proximity to other blocks | Manipulative motions Dominant frequency of motion | Incremental and total correctness |
| Contact sensor | Mechanical contact | Manipulation speed | Incremental and total completion time |
| Accelerometer | Accelerations along x-, y- and z-axes; orientation of the block relative to the gravity direction | Rotational motion Time at each assembly step Connection/assembly status between blocks | Additional behavioral data |
| Gyroscopic | Angular velocities | Time at lifting blocks | |
| Timer | Synchronized time at each detected event | | |

The pre-processed data received by the remote computer may be further analyzed to provide assessor data, including: a) real-time assembly detection, b) incremental and total correctness, c) incremental and total completion time, and d) additional behavioral data. Additional behavioral data may include dominant frequency of motion, maximum/average acceleration, and repetitive/hyperactive motions.

Assembly detection may be realized by using the sensor data from the exemplary optical sensors and accelerometer. SIG-Blocks may use low-cost optical sensors to detect neighboring blocks. However, any adjacent objects within about 1 cm of the sensor, including, for example, the user's hands, can trigger the sensors. In other embodiments, false assembly detection can be effectively filtered out from all optical sensor data. For example, assembly detection may be confirmed only when the blocks are stationary, which is discussed in detail below in relation to FIG. 29.

Figure 17:
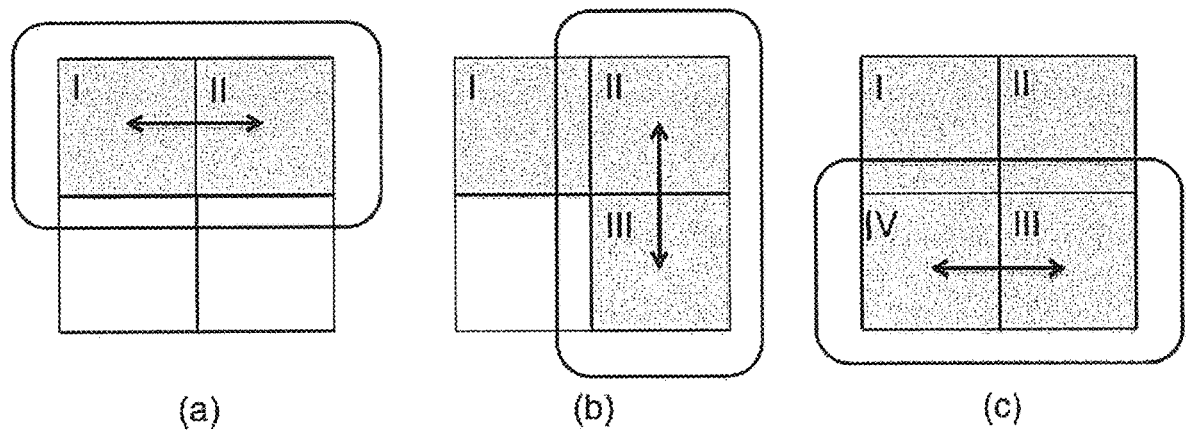
FIG. 17 is a drawing depicting an exemplary assembly detection sequence.

FIG. 17 shows an example of incremental assembly detection using 4 blocks. First, in (a), assembly between blocks I and II is detected, then in (b), assembly between blocks II and III is detected, and then in (c), assembly between blocks III and IV is detected. The third and fourth blocks may be assembled at the same time. Pseudo algorithms for assembly detection between two blocks and real-time visualization are as follows:

---

Algorithm 1: Connection Identification

---

Return the connection ID when two blocks are assembled
1: if side_a of cube_I and side_b of cube_II detect assembly then
2:   save ID = [a, b, I, II]
3:   go to Validate Connection (Algorithm 2)
3:   if the IDs are validated then
4:      return ID
5:      go to Visualization (Algorithm 3)
5:   else
6:      ID = [a, b, I, II]
7:   end if
8: end if

---

Algorithm 2: Connection Validation

---

Validate connection ID

-continued

---

Algorithm 2: Connection Validation

---

1:  Each cube has one of six statuses [up, down, right, left, forward, backward]
2:  Check status of cube_I and cube_II
3:  if assembly between two cubes is physically possible then
4:     ID is valid
5:  else

---

Algorithm 3: Visualization

---

1:  cube_I and cube_II are assembled
2:  if cube_I is not neighboring any other sides but a side of cube_II then
3:     Go to Get connection ID (Algorithm 1)
4:     Build position matrix using validated ID
5:  else
6:     Go to Get connection ID (Algorithm 1)
7:     Compare the ID with modified position matrix
8:     Build position matrix using validated ID
9:  end if
10:  Move coordinate of virtual block in OpenGL model
11:  Rotate using angular information obtained by accelerometer of assembled block Acceleration data can identify when blocks are in motion and what face is pointing upward. Further data analysis can produce additional behavioral information, such as overall speed of motions, manipulation patterns, behavioral characteristics, and spatial manipulations. Such behavioral data may be useful in observing manipulative pattern changes and strategic behavior in individuals who play TAG-Games over time. Data analyses may include statistical and correlational analyses, Fast Fourier Transforms (FFT), and noise filtration for sensor data to covert noisy acceleration data into behavioral motions. All available data may be tagged with time measurements and synchronized using the timer embedded in the microprocessor.

SIG-Blocks may also include a programmable sensory feedback mechanism. SIG-Blocks and TAG-Games may function as an automated, continuous assessment tool for users, such as, for example, children with developmental disorders, that can identify the effect of different sensory inputs on a user's behavior and cognitive problem-solving. The use of augmented sensory feedback can assess individual responses of users to different sensory feedback provided during play and thus may lead to the design of individually customized tests that can improve sensitivity in the assessments and/or improve outcomes of cognitive and behavioral intervention utilizing TAG-Games.

The target assessor data that can be derived from the raw data may include, but is not limited to: 1) overall manipulation activities, 2) incremental and total completion time, 3) the number of correct completions versus total trials, 4) manipulation patterns, 5) repetitive or hyperactive behaviors, and 6) 1)-5) with different levels of sensory feedback to determine the effect of augmented sensory feedback on a user's behavior and performance. Table 4 lists target assessor data and associated raw data collected by exemplary integrated sensors.

adjustable sampling frequency to a remote computer within the communication boundary. While an active transmission is described, in one example, elements may also be read using other methods including, for example, RFID technology. In one example, the data measured by sensors in SIG-Blocks will be converted into digital signals and then transmitted to an external storage or computing device (e.g., a remote computer) to provide real-time feedback and additional data analysis.

Figure 18:
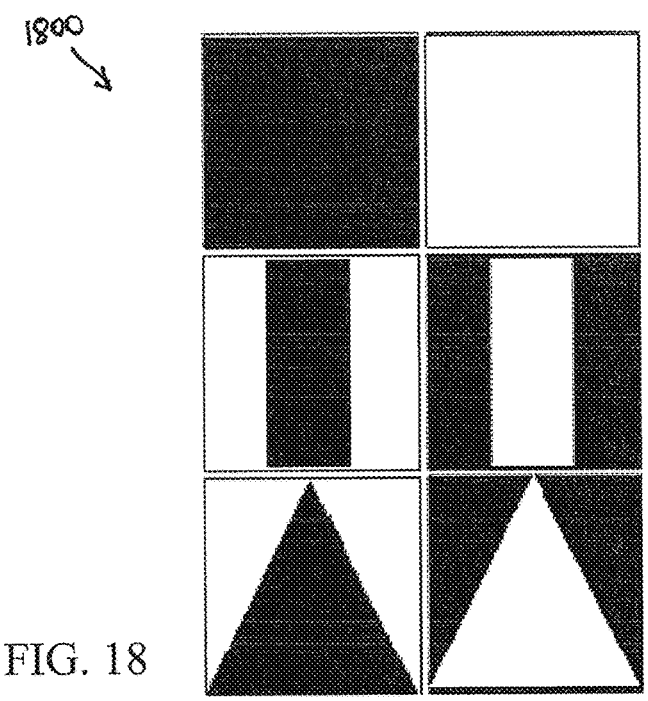
FIG. 18 is a drawing of exemplary SIG-Block face images.
Figure 19:
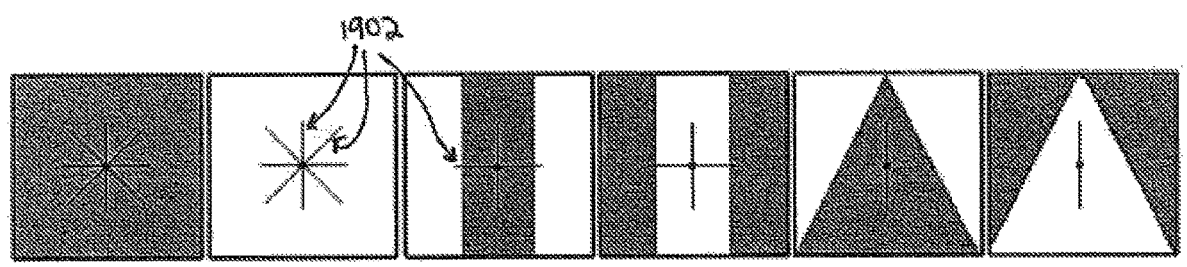
FIG. 19 is another drawing of exemplary SIG-Block face images with exemplary symmetry lines.
Figure 20:
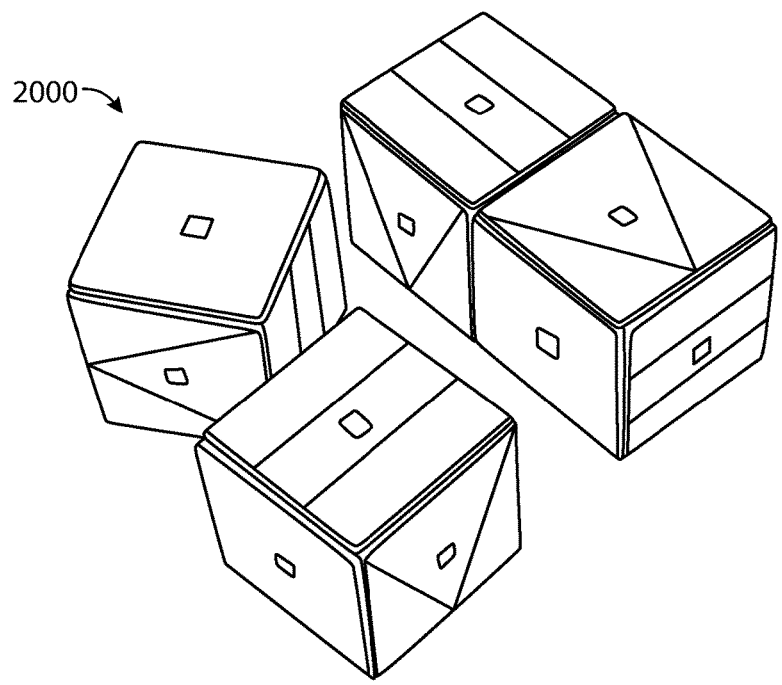
FIG. 20 is a picture of exemplary SIG-Blocks with exemplary face images.

Physically, the blocks may be about 2-inch cubes with different images on each of their six faces. The blocks may be covered with re-attachable outer images with various graphics or colors. As mentioned above, blocks may also include dynamically reprogrammable displays (e.g., LEDs, LCDs, cell-phone like displays, etc.). The images can be changed manually or automatically, depending on what type of game and block is being used. Exemplary face images 1800 are black and white distinctive, geometric images, as shown in FIG. 18. These exemplary images 1800 each have 1-fold, 2-fold, or 4-fold symmetry, as shown in FIG. 19, where the lines 1902 within the images represent symmetrical fold lines. Exemplary SIG-Blocks 2000 with these patterns are shown in FIG. 20. Geometric images may be chosen to create a variety of patterns with different symmetry properties. These exemplary images can be replaced by other patterns or images.

By attaching different images (e.g., colors, shapes, or figures) on each surface, the SIG-Blocks can be used for various types of TAG-Game play with varying play complexity. In other embodiments, when the surfaces are

TABLE 4

Target assessor data measured from SIG-Block/TAG-Game and associated raw data measured from integrated sensors.

| No. | Target Assessor Data | Raw Data | Sensors |
|---|---|---|---|
| 1 | Overall manipulation activities | Accelerations, rotations | Accelerometer, gyroscopic sensor, force sensor |
| 2 | Incremental/total completion time | Time, assembly detection | Timer, optical/IRDA (Infrared Data Association)/contact sensor/RFID (Radio Frequency Identification) |
| 3 | Number of correct/total trials | Assembly detection | optical/IRDA (Infrared Data Association)/contact sensor/RFID (Radio Frequency Identification) |
| 4 | Manipulation/behavioral patterns | Accelerations, assembly detection | Accelerometer, gyroscopic sensor, optical/IRDA (Infrared Data Association)/contact sensor/RFID (Radio Frequency Identification) |
| 5 | Repetitive/hyperactive behaviors | Accelerations, time, assembly detection | Accelerometer, gyroscopic sensor, time, optical/IRDA (Infrared Data Association)/contact sensor/RFID (Radio Frequency Identification) |
| 6 | 1-5 with different sensory feedback | All of the above (1-5) Measured with and without sensory feedback | All of the above (1-5) |

In different embodiments, the raw data may be converted into target assessor data that can be analyzed using, for example, statistical analysis, noise filtration, Fast Fourier Transform (FFT) (for identifying dominant frequency area of hand motions), and composite scoring.

A SIG-Block may also contain a wireless communication module that operatively communicates sensor data with dynamically reprogrammable displays, the outer design image can be changed by reprogramming the display (see also FIG. 35). In this manner, a number of different assessments can be conducted with the same homogeneous blocks.

Figure 21:
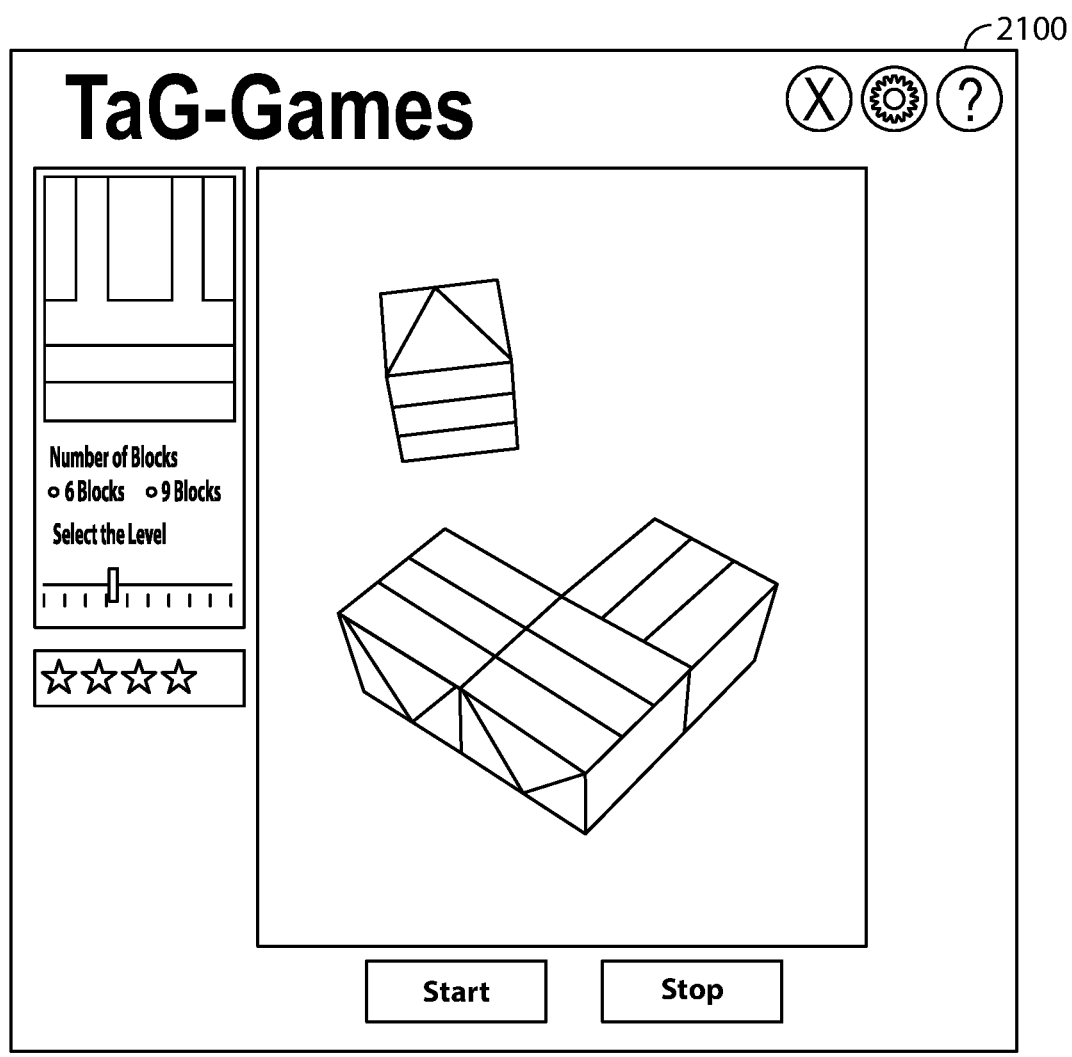
FIG. 21 is a screenshot of an exemplary graphical user interface (GUI) during an exemplary TAG-Game.

The GUI includes logic to receive and interpret data from the blocks and to provide the user with feedback on their performance. Software logic may be written, for example, in Visual C # and may utilize, for example, OpenGL for animations. The GUI may be able to select games, display three-dimensional animation of blocks in real-time, perform assessment analysis, save data for reference, and include a user-friendly display or interface. The GUI may present more than one display format, depending on who is using it. One display format is intended for assessment administrators (such as, e.g., parents) or assessment professionals/assessors that want to look at the collected data for analysis. Another display format is intended for the user, such as a child. The GUI with the assessment format may have a simpler appearance, but may have more information and options. The GUI with the user format may not display all of the possible information, but may have a more friendly/entertaining appearance and simpler features. FIG. 21 shows an exemplary user GUI 2100, which may have a variety of options for layouts and colors. The user GUI 2100 may also be capable of testing performance with different levels of support (e.g., active optical or audio feedback to the user).

The display elements and layout of exemplary GUIs are easily customizable and the data sampling and transmission rate are also adjustable. For users, a GUI may function as a game/assessment interface, as well as an automated test administrator. In one example, a GUI may be remotely controlled by an assessor to administer the assessment. This capability will also enable home testing directly monitored by non-professionals, such as, for example, parents, and remotely administered by assessors, such as clinicians or other professionals. When home testing is employed, in one embodiment, data may be collected on, for example, a parent's handheld electronic device (e.g., a mobile or smart device, smart phone, tablet computer, and other portable or wi-fi devices). In various embodiments, SIG-Blocks and TAG-Games may be configured as standalone devices that do not require external equipment other than a remote computer, and thus can be used in various places, such as, for example, homes, daycare facilities, hospitals, and schools.

Figure 22:
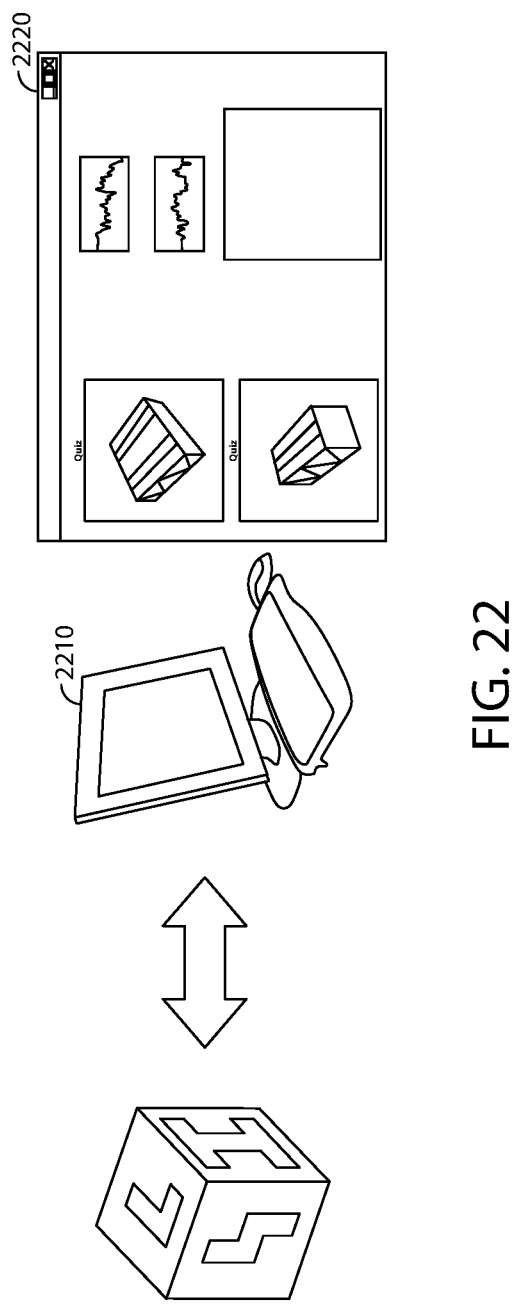
FIG. 22 is a drawing of an exemplary SIG-Block and GUI during an exemplary TAG-Game.
Figure 23:
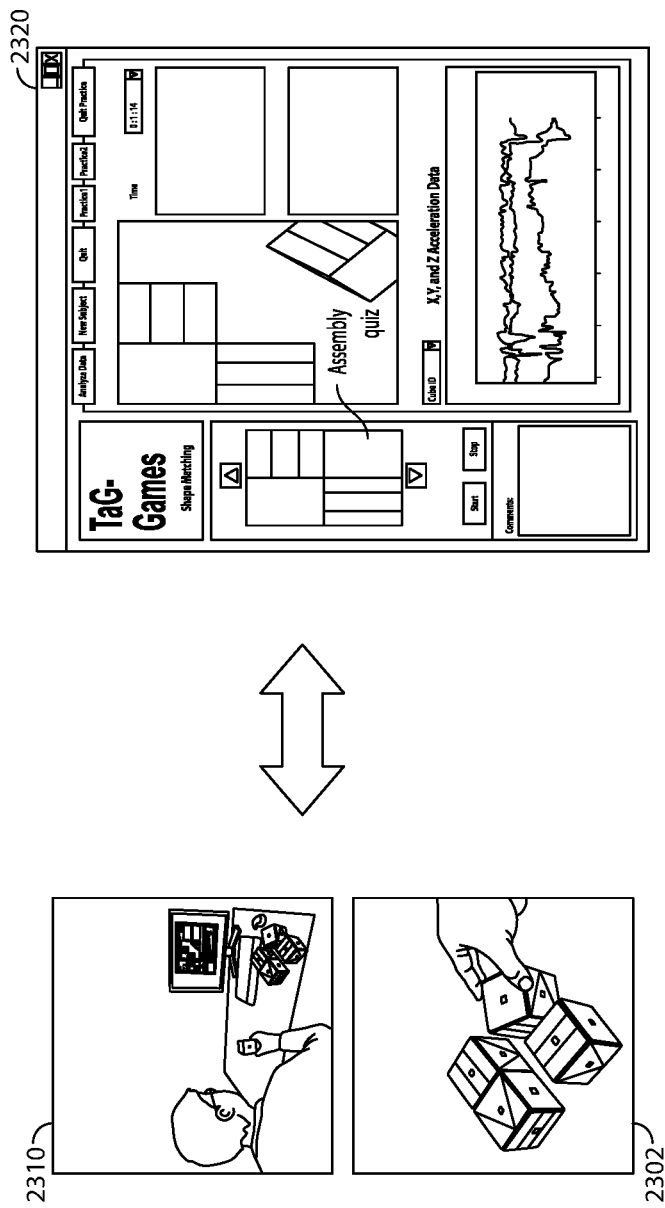
FIG. 23 includes pictures showing an exemplary embodiment of a user test environment showing exemplary SIG-Blocks and a user GUI; and a screenshot of an exemplary assessor GUI during an exemplary TAG-Game.

Various GUIs can facilitate access to the data collected from SIG-Blocks. The motion data measured by, for example, an IMU may be operatively communicated in real-time to a local computer or other device (e.g., a mobile or smart device, smart phone, tablet computer, and other portable or wi-fi devices). In some embodiments, the local device receiving the data is an intermediate device, which may be connectable to a network for operative communication, including wireless. Regardless of the configuration, the data may be transferred to a user and/or assessor GUI. FIGS. 22 and 23 show exemplary user and assessor GUIs. An exemplary user GUI 2210 may contain a goal of the assessment, a graphical dynamic model of the SIG-Blocks corresponding to real-time motion data, and performance progress and milestones. An exemplary assessor GUI 2220 may contain similar information, but may also include behavior simulation, graphs displaying accelerations and motions of the blocks, and achievement data.

In particular, FIG. 23 shows TAG-Games with four SIG-Blocks 2302 and two interactive GUIs: the user's GUI 2310 (left) displays test items, such as, for example, an assembly quiz and instructions to manipulate the blocks to build the same assembly configuration as shown on the computer screen; and the assessor's GUI 2320 (right) displays current assembly configuration, step-by-step correct/incorrect notifications and times, and accelerations in real time.

In another embodiment, FIG. 24 shows exemplary SIG-Blocks 2402 and another exemplary assessor GUI 2404, which provides three-dimensional animation of the blocks, and sensor data (orientation and assembly detection) in real-time. In FIG. 24, the exemplary assessor GUI 2404 is displayed on an exemplary computer screen. The three-dimensional models on the left side of the screen show the real-time rotational movements of SIG-blocks; and the right side shows the accelerometer and gyroscopic sensor data. The display elements and layout can be modified to suit particular assessment and/or assessor needs. In addition, certain parameters, such as sampling frequency and data transmission rate, are adjustable by an assessor through this GUI. The collected data may be stored in an assessor device, such as a remote computer, and may be retrieved at other times for further data analysis.

Referring still to the exemplary GUI shown in FIG. 24, an assessor may specify various assessment and/or user settings, such as, for example, the user's gender and age group. Assessment questionnaires may be customized depending on the assessment or application. An assessor may also choose between different goal configurations (problems), which may be displayed in the upper left side under "Quiz". The quiz level may be determined based on difficulty, or play complexity. In various embodiments, a quiz or assessment difficulty or complexity may be selected manually by the assessor, or selected automatically by logic in the remote computer based on user performance in previous quizzes or assessments. On the bottom of the GUI, tri-axial acceleration data may be plotted. This graph represents how the SIG-Blocks are manipulated during play, which may indicate behavioral patterns and the overall amount of manipulation activity. Assembly completion time may be detected and recorded on the upper right side of the GUI, along with the correct/incorrect notification for each quiz or assessment.

SIG-Blocks and TAG-Games provide a multi-functional device that can be used for a variety of capability and behavioral assessments. Exemplary users include children, people with disabilities, and the elderly. Considering the vulnerable characteristics of potential and intended users, design criteria for the blocks may also include safety (no sharp edges, no separate components that may be swallowed, no toxic materials, etc.), compactness (no hanging wires, no extending parts, no moving components on the housing case, etc.), and weight (no burden for a child or weak user to control). In one example, blocks will be crafted from high quality plastic materials for the frames, with no sharp edges, and the electronics will be completely sealed and waterproof. The physical size and weight may be determined to ensure natural arm-hand motions, which may also be specific to certain users or user groups.

The interactive nature of TAG-Games with SIG-Blocks has the ability to capture a user's interest and peak their curiosity in the assessment, by creating interactions resembling a game. The GUIs associated with TAG-Games can provide users with a means of self-assessment through play and can provide assessors (e.g., analyzing professionals) with a means to monitor a person's behavioral development and cognitive skills autonomously from a remote location when direct observation is not possible or difficult.

In another embodiment, an external measurement device with additional motion sensors, such as, for example, accelerometers can be attached to the user's body to detect activities directly from user motions. This may also facilitate validating and/or calibrating sensors in the blocks. In another embodiment, an external camera may also compare the actual behaviors and computer graphics to enhance kinematic and dynamic modeling of user motions.

As shown in FIGS. 22-24, a SIG-Block can operatively communicate in real time with an assessor device (e.g., a remote computer) through enabled wireless networking to transfer sensor data. For example, a block's tri-axial accelerometer may provide two angular accelerations along the roll and pitch axes. Proximity sensors, such as optical sensors, which may be installed on contact surfaces of the block, may be pairs of an infrared emitting diode and an infrared phototransistor, which detect the reflected signal. By combining the data from accelerometer sensors and optical sensors, assembly configurations of the blocks can be reconstructed and displayed on a GUI. The unique ID of each SIG-Block enables independent and simultaneous communication of the blocks with the remote computer. By assigning different images to surfaces of the blocks, SIG-Blocks with the same sensors and providing the same type of data may be used for various types of assessments, and with varying complexity.

Figure 25:
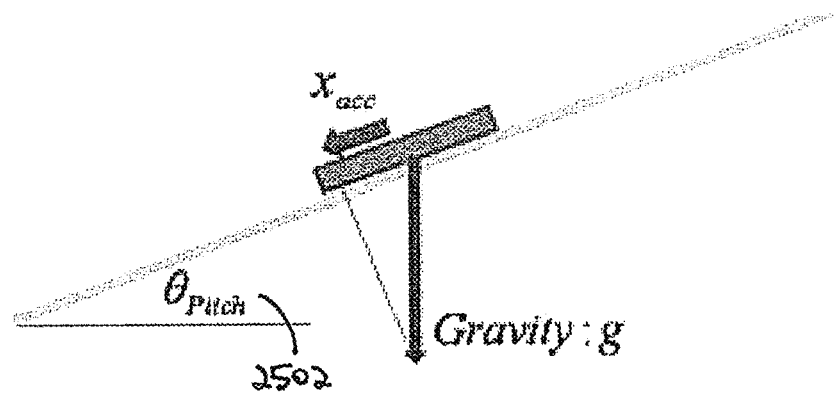
FIG. 25 is a drawing of an exemplary tilt angle.
Figure 26:
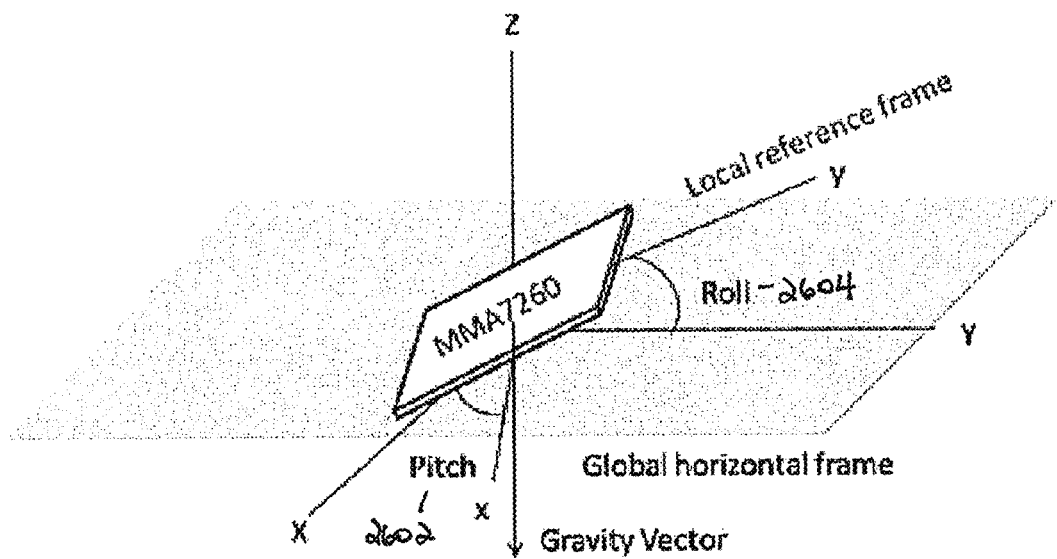
FIG. 26 is a drawing of exemplary pitch and roll angles.

For a tri-axial accelerometer to be used to detect angular displacements of a block, it may be useful to filter out the noise caused by user hand movements. A relatively low-cost capacitive accelerometer used in one embodiment (MMA7260Q) features signal conditioning, a 1-pole low-pass filter, temperature compensation, and g-select, which allows for the selection among 4 sensitivities: 1.5 g, 2 g, 4 g, and 6 g. The highest sensitivity of this exemplary accelerometer is 800 mV/g, which occurs when 1.5 g is selected. There are also three output ports on the exemplary accelerometer, which provide analog acceleration signals along the x-, y-, and z-axes. These analog signals can be transformed into digital signals with the analog-to-digital converter of the microprocessor (e.g., ATMEGA328). When an accelerometer is in a static state, it can detect angular displacements by measuring static accelerations due to gravity, which range between −g and +g. As shown in FIG. 25, an arbitrary tilt (pitch) angle can be obtained using single-axis acceleration data by measuring the static acceleration due to gravity. As shown in FIG. 26, pitch 2602 and roll 2604 angles can be determined relative to the global horizontal frame using the exemplary tri-axial accelerometer. Tilt angles along the x- and y-axis can be calculated based on three acceleration data ($x_{acc}$, $y_{acc}$, $z_{acc}$) signals as follows:

$$\theta_{pitch} = \tan^{-1}\left(\frac{x_{acc}}{\sqrt{(y_{acc})^2 + (z_{acc})^2}}\right); \theta_{roll} = \tan^{-1}\left(\frac{y_{acc}}{\sqrt{(x_{acc})^2 + (z_{acc})^2}}\right);$$

Two built-in functions, for example, in MATLAB, can compute the inverse of the tangent, 'a tan' and 'a tan 2.' For a real x, 'a tan(x)' is in the range $[-\pi/2, \pi/2]$, and 'a tan 2(y, x)' gives the value of θ such that sin θ=y and cos θ=x. The value of θ lies in the interval $[-\pi, \pi]$.

Figure 27:
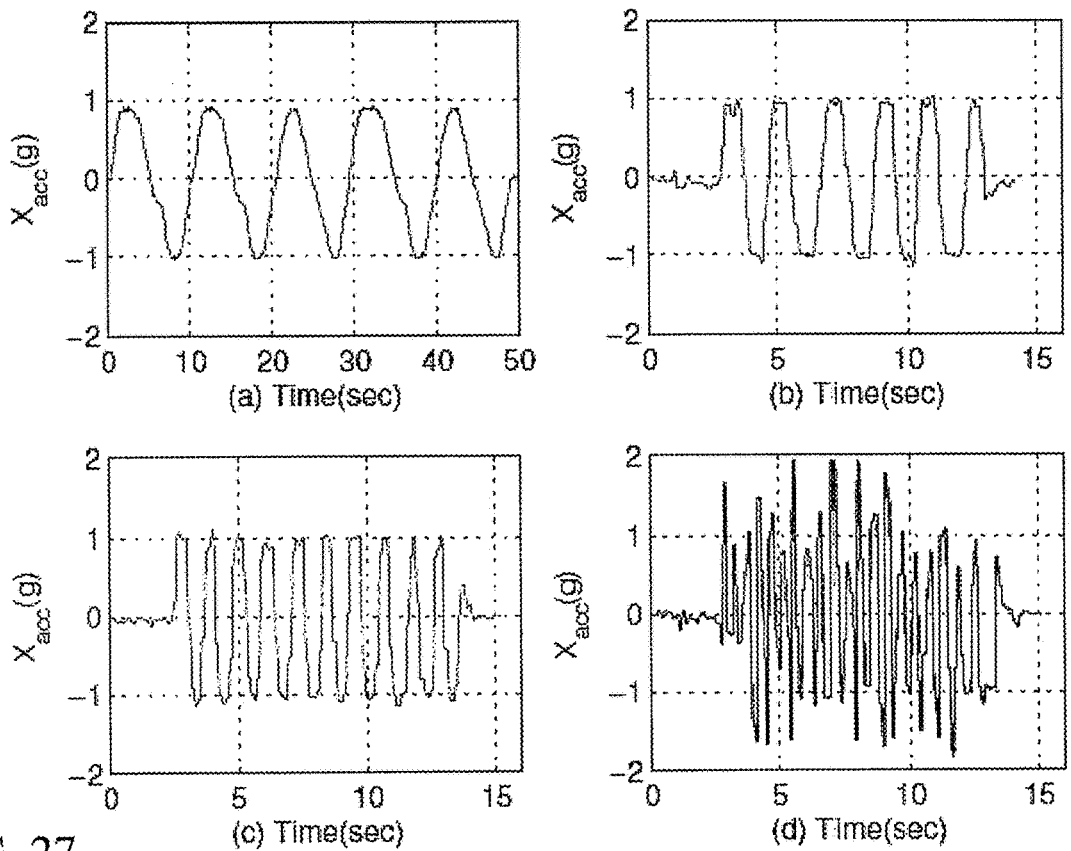
FIG. 27 includes graphs of exemplary accelerations during motion.

The exemplary configurations can also overcome the challenge of detecting tilt angles while the accelerometer is in motion. To analyze the effect of dynamic acceleration, a simple block test was conducted by manually rotating a SIG-Block 90° and −90° about the x-axis repeatedly at different frequencies. FIG. 27 shows the $x_{acc}$ signal captured from an exemplary tri-axial accelerometer versus time, while rotating about the y-axis. FIG. 27(a) graphs rotating the block 5 cycles per approximately 50 seconds (0.1 Hz). FIGS. 27(b), (c), and (d) show the results when the block is rotated at 0.5 Hz (5 cycles per 10 seconds), 1.0 Hz (10 cycles per 10 seconds), and 2.0 Hz (20 cycles per 10 seconds), respectively. According to these experimental results, the overall influence of dynamic acceleration is trivial for slow motions (≤1.0 Hz), while the error increases and becomes significant in higher frequency domains. For fast motions (e.g., FIG. 27(d)), the $x_{acc}$ signal from the exemplary accelerometer exceeds±1 g when the SIG-Block reaches the turning points (±90°), showing the influence of dynamic accelerations.

Figure 28:
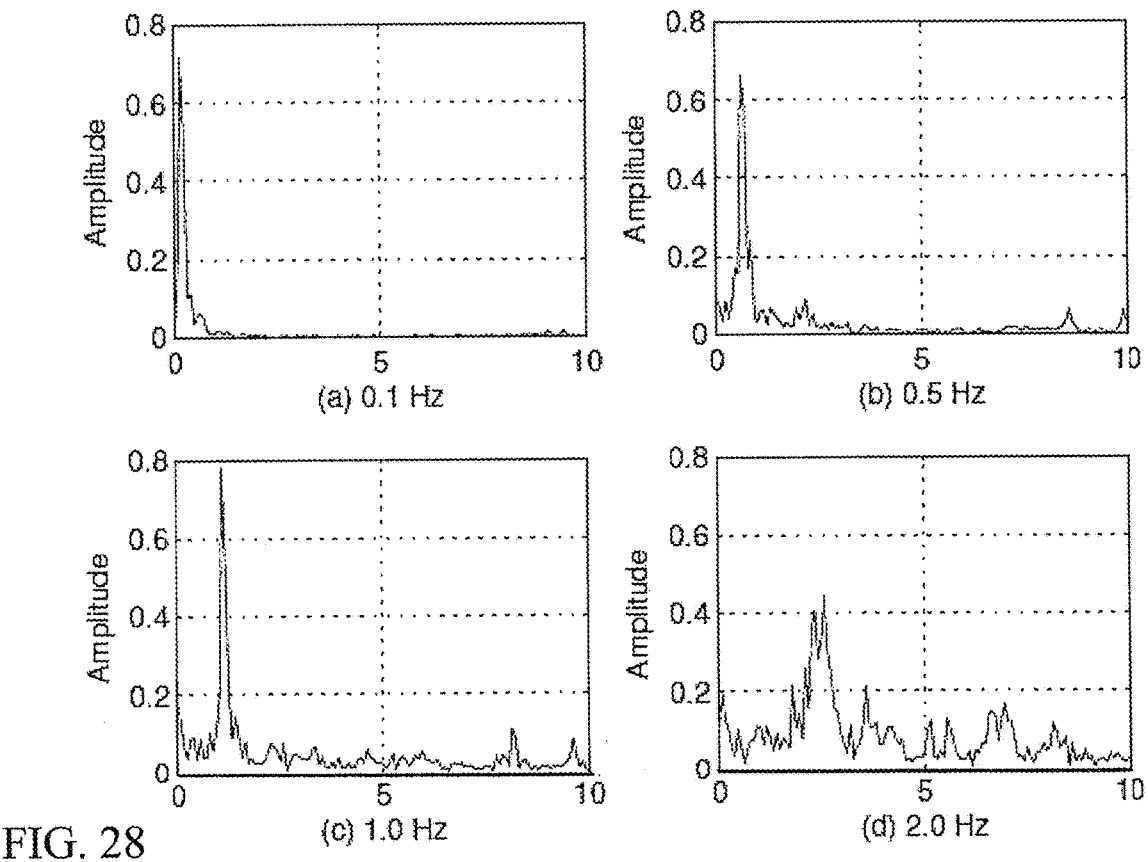
FIG. 28 includes graphs of exemplary amplitudes at different frequencies.

FIG. 28 shows the amplitude of the rotating motions at four different frequencies. Although users may behave uniquely and have different frequency responses, humans have a limited speed and range of motion for manipulating rigid objects. Moreover, exemplary users of TAG-Games include pre-school aged children with developmental disabilities, the elderly, and patients with traumatic brain injuries or mental illnesses. Therefore, the exemplary blocks may be used within the low frequency range, successfully retrieving their rotational information and providing reliable data on how they are manipulated by a user. By applying a digital low pass filter at the cutoff-frequency, which can be empirically determined through calibration, the animation accuracy of the blocks can be further improved. Accelerometer data from SIG-Blocks can also provide information on behaviors, such as, for example, fast and repetitive motions, shaking, and hand vibrations.

To generate a three-dimensional assembly configuration in the GUI, which replicates the physical blocks manipulated by the user, an algorithm may assume that one of the blocks is fixed, for example, to the user's table, and the logic proceeds by orienting the other blocks relative to the fixed block. This approach compensates for the lack of orientation and position information about the blocks and therefore significantly simplifies the logic for generating the assembly configuration. In another embodiment, a fixture on the table may function as a frame of reference to reconstruct position and orientation of the blocks. In some embodiments, reflective optical sensors used in exemplary SIG-Blocks may be triggered not only by attaching other blocks, but other things covering the sensors, including the user's hands. In one embodiment, to filter such unwanted sensor inputs, assembly may be detected only if the two supposedly connected optical sensors are triggered at the same time and when the blocks are in a stable state. A stable state indicates that the blocks are not being handled by the user and is determined by combining data from the exemplary accelerometer and optical sensors.

Figure 29:
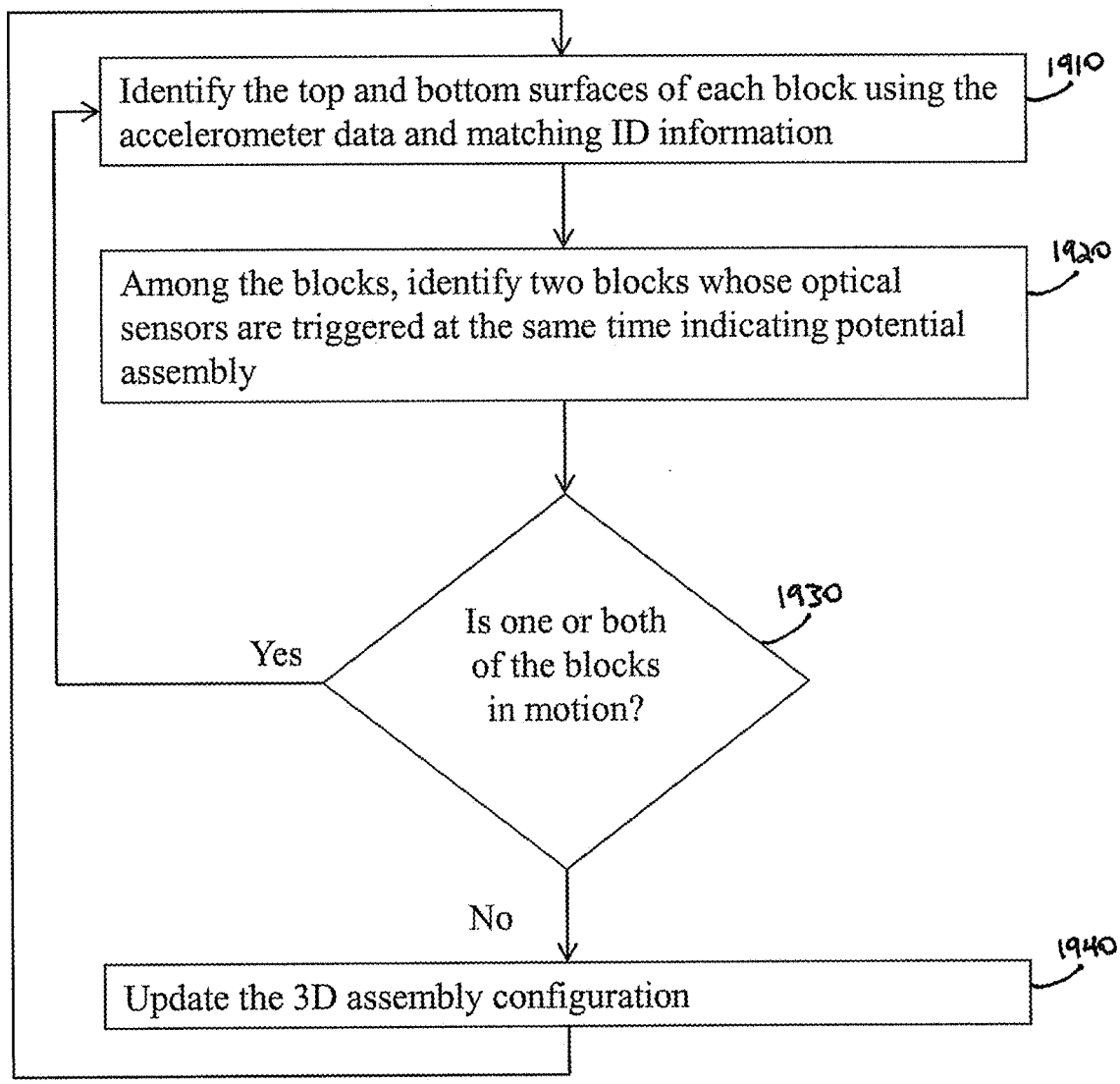
FIG. 29 is a flowchart of an exemplary assembly detection method.

Assembly detection among the SIG-Blocks may be made according to the flowchart shown in FIG. 29. According to this procedure, in step 1910, the top and bottom surfaces of each block are identified using the accelerometer data and matching ID information. In step 1920, among the blocks, determine if there are two blocks whose optical sensors are triggered at the same time indicating potential assembly. In step 1930, if one or both of the blocks identified in 1920 are in motion (being handled), then no assembly has happened and the process returns to 1910. If neither block is in motion, then assembly has happened between the two blocks, and the process should proceed to 1940. In step 1940, the three-dimensional assembly configuration is updated and the process continues.

Figure 30:
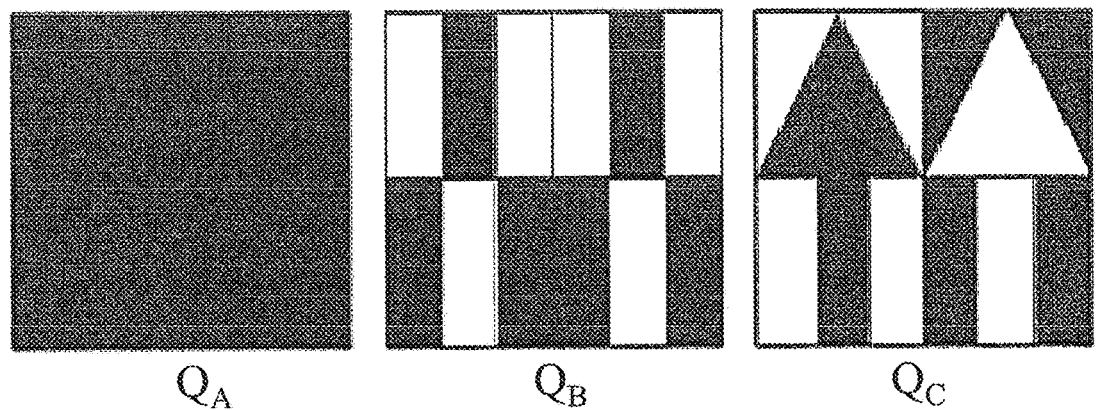
FIG. 30 is a drawing of exemplary SIG-Block face images for exemplary TAG-Game quizzes.

The procedure was tested on examples of quizzes consisting of four blocks with 2-by-2 assembly configurations: $Q_A, Q_B, Q_C$, as shown in FIG. 30. For each quiz, four blocks were assembled correctly 10 times (4 assembly detections for each trial; 40 detections in total), and the number of false incorrect notifications was counted. The blocks were also assembled incorrectly, and the number of false correct notifications was recorded. The results are shown in Table 5 below. The errors during testing $Q_B$ occurred when two blocks were assembled simultaneously. Sensitivity and specificity of this binary classification test are given by the following:

$$\text{Sensitivity} = \frac{|\text{True Correct}|}{|\text{True Correct}| + |\text{False Incorrect}|} = 0.9833;$$

$$\text{Specificity} = \frac{|\text{True Incorrect}|}{|\text{True Incorrect}| + |\text{False Correct}|} = 1;$$

TABLE 5

Performance of the Assembly Detection Algorithm.

|  | Correct | | Incorrect | |
| --- | --- | --- | --- | --- |
|  | False Incorrect | Error (%) | False Correct | Error (%) |
| $Q_A$ | 0/40 | 0 | 0/40 | 0 |
| $Q_B$ | 2/40 | 5 | 0/40 | 0 |
| $Q_C$ | 0/40 | 0 | 0/40 | 0 |

Difficulty is a relative attribute that can vary significantly depending on a person's developmental status, age, or health conditions. For an assessment test to produce reliable and sensitive assays, it must be neither too difficult nor too easy.

Entropy is a useful statistical measure of information-theoretic complexity that quantifies the amount of uncertainty or information associated with a random event(s). For example, if a user performs assembly or reconfiguration using known geometric blocks, a method can be used to determine the information-theoretic complexity associated with the activity.

Figure 31:
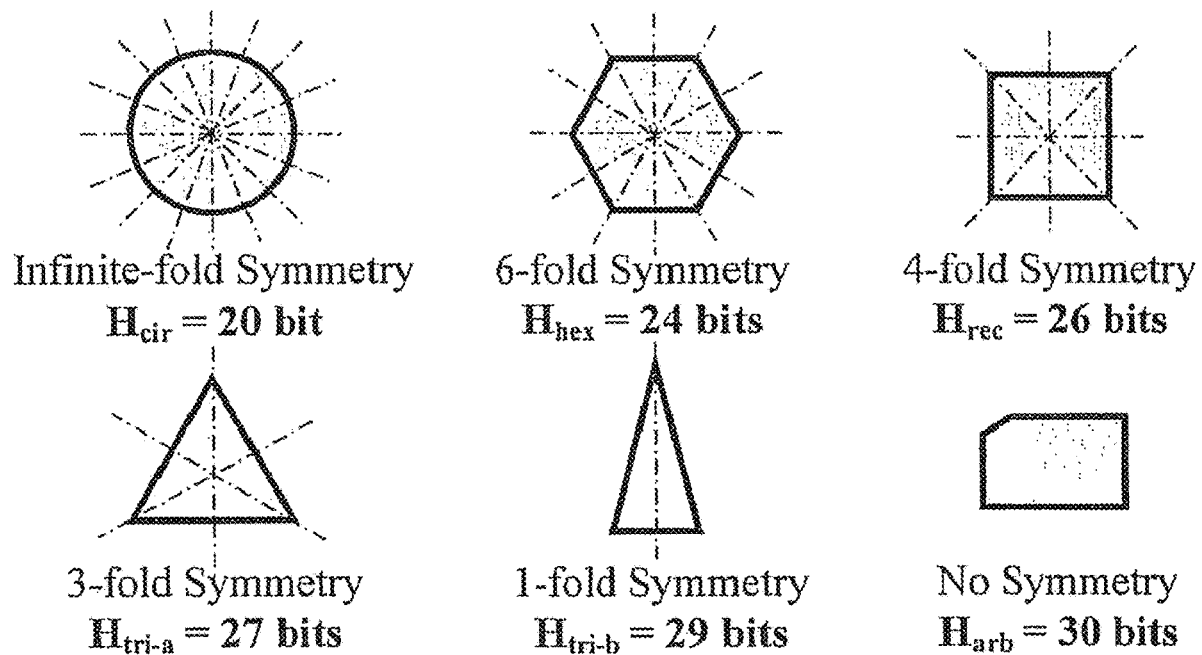
FIG. 31 is a drawing of exemplary two-dimensional geometric shapes with different symmetry features and corresponding entropy values.

The parts entropy (II) can be computed for each geometric object in two-dimensional space where the total parts entropy for a random object with no symmetry may be set as 30 bits. The parts entropy method computes the number of bits required to store position and orientation of a rigid object. For example, if an arbitrary part in two-dimensions can take one of $2^{10}$ distinct orientations and the probability for all possible orientations is uniform, then the parts entropy is 10 by taking the logarithm to base 2. If the pose of the object is parameterized by x and y for its position and $\theta$ for its orientation, and these three variables are statistically independent of each other, then $H = H^O + H^P = 30$, where there exists 210 possible positions for each x and y direction. The value of the parts entropy is highly correlated to the geometric property of the shape. FIG. 31 shows exemplary two-dimensional geometric shapes with different symmetry features and corresponding parts entropy values.

Entropy is a quantitative measure of uncertainty associated with a random variable(s). Given a discrete space consisting of n points, $x_1 \ldots, x_n$, and a discrete probability distribution $p_i = p(x_i)$ associated with those points, such that $$\sum_{i=1}^{n} p_i = 1$$

and $p_i \geq 0$, the corresponding discrete entropy is defined as $$H_X = -\sum_{i=1}^{n} p_i \log_2 p_i \tag{1}$$

where $X \in x_1, x_2, \ldots, x_n$. For a uniform distribution, such that $$p_1 = p_2 = \ldots = p_n = 1/n \tag{1}$$

can be simplified as $$\hat{H}_X = \log_2 n \cdot \hat{H}_X = \log_2 n. \tag{2}$$

If there are k statistically independent random variables, $X^1, \ldots X^k$, and each variable has a uniform probability over a discrete space, such that $X^j \in \{x_1^j, x_2^j, \ldots, x_{n_j}^j\}$ where $n_j$ is the number of possible discrete values that $X^i$ may take, the total entropy is computed by $$H_{total} = \sum_{j=1}^{k} H_{X^j}. \tag{3}$$

For a uniform distribution for each variable. (3) can be simplified as $$\hat{H}_{total} = \sum_{j=1}^{k} \hat{H}_{X^j} = \sum_{j=1}^{k} \log_2 n_j = \log_2 \left( \sum_{j=1}^{k} n_j \right). \tag{3}$$

Complexity associated with a TAG-Game is linked to various factors, including geometric properties of the blocks, the number of blocks used in play, and types and the number of hand operations required for completing the game/assessment. While hand operations during play are highly individual and therefore difficult to analyze or quantify, geometric configurations and the number of given blocks are objective properties. Therefore, the play complexity of TAG-Games may be based on geometric properties as well as the number of the blocks used in the game/assessment that may be captured in a single composite value, for example a discrete entropy value.

The entropy-based approach assumes that sets of geometric blocks are designed for a specific type of geometric play (e.g., insertion, reconfiguration or assembly) and that the final objective or the goal configuration of the assessment is well defined. The play complexity, $C^{play}$ is defined by the amount of entropy reduced by a player manipulating the geometric blocks during play:

$$C^{play} = H^{initial} - H^{final} \tag{4}$$

where $H^{initial}$ is the entropy for a given set of geometric blocks before play (e.g., the blocks are randomly placed on a table) and $H^{final}$ is the entropy computed for the blocks after a user accomplishes the goal (e.g., the blocks form a certain assembly configuration). In other words, $H^{initial}$ implies the amount of uncertainty initially existing in the blocks and $H^{final}$ is the amount of uncertainty remaining after play. Thus, the difference between these two values indicates the amount of uncertainty reduced, or information handled, by a user manipulating the blocks to achieve the goal configuration. The play complexity can be used to design SIG-Blocks with varying levels of difficulty in terms of the amount of information required to complete the task. We note that a higher value of $C^{play}$ implies a more difficult level of play.

If N geometric blocks are provided for assembly tasks, the total entropy is given by:

$$H^{initial} = \sum_{i=1}^{N} \log_2 n_i + \log_2 P_N \quad (5)$$

where $n_i$ the number of distinctive poses of the $i^{th}$ block and $P_N$ indicates the number of allowed permutations among N blocks. If the blocks have the same geometric shapes and they can switch locations with each other, then $P_N$=N! where N!=n·(n−1)(n−2) . . . 2.1. More specifically, if we consider a cube block with the rotational resolution of 90°, then each block can have one of four orientations (0°, 90°, 180°, and 270°) for keeping a specific surface among six surfaces facing upward and therefore has 4×6=24 possible poses. For N cube blocks in line, the total configurational entropy is computed as $$H^{initial} = N \log_2 24 + \log_2 N! \quad (6)$$

$H^{final}$ is the entropy remaining after completing the assembly task. Therefore, the value is based on the number of possible changes in position and orientation without affecting the final assembly configuration.

The play complexities for three quizzes using exemplary SIG-Blocks are calculated in the following manner. FIG. 18 shows six exemplary re-attachable image cards used for each SIG-Block, where each black-and-white geometric pattern represents 4-, 2-, or 1-fold symmetry. FIG. 30 shows exemplary quizzes consisting of four blocks with 2-by-2 assembly configurations: $Q_A$, $Q_B$, $Q_C$. The example game is defined by assembling the blocks to achieve four upward surfaces to form a specific 2-by-2 assembly as shown in FIG. 30. Side images of the blocks are neglected. Using (4) above, we compute $C^{play}$, based on the number of possible assembly configurations. The initial entropy for four blocks assembled in any possible 2-by-2 configuration is given by $H^{initial}$=4 $\log_2$ 24+$\log_2$ 4!=22.92 based on (6). For each quiz, the final entropy and the play complexity are computed as follows:

$Q_A$:$H^{final}$=4 $\log_2$ 4+$\log_2$ 4!=12.59; $C^{play}$=10.33
$Q_B$:$H^{final}$=4 $\log_2$ 2+2 $\log_2$ 2!=6; $C^{play}$=16.92
$Q_C$:$H^{final}$=2 $\log_2$ 2+$\log_2$1=2; $C^{play}$=20.92

Figure 32:
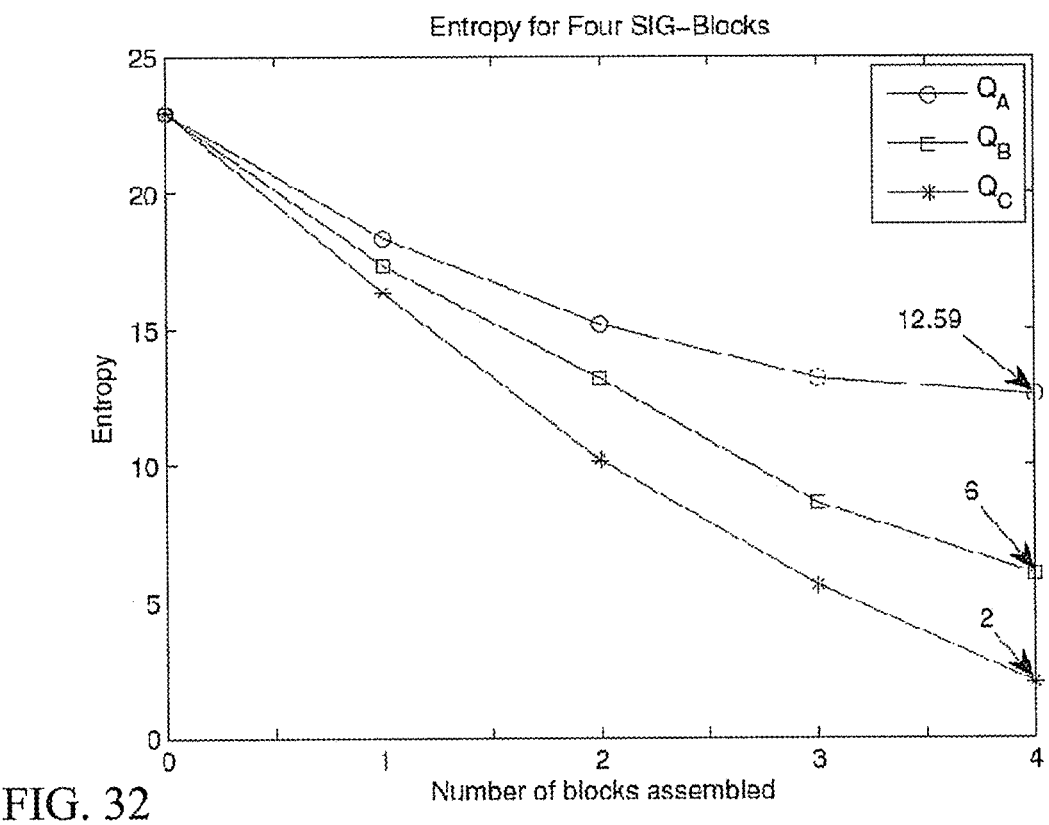
FIG. 32 is a graph showing exemplary changes in entropy during assembly.
Figure 33:
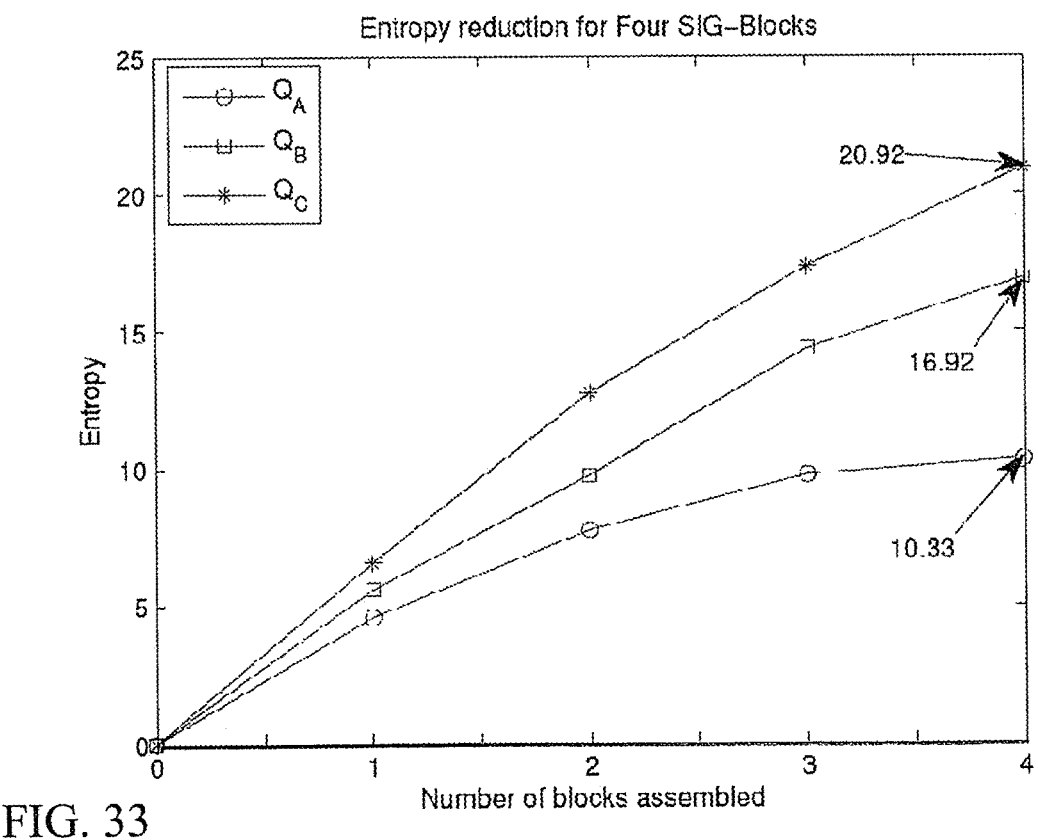
FIG. 33 is a graph showing exemplary entropy reduction during assembly.

Entropy is a measure of uncertainly associated with play and therefore decreases as a player assembles the blocks towards the goal assembly configuration. FIG. 32 shows the change in entropy at each assembly completion step for the three quizzes specified in FIG. 30, where the final values indicate $H^{final}$. FIG. 32's y-axis represents the final entropy after each assembly completion and the final values indicate $H^{final}$ for each game. FIG. 33 shows the final values of $C^{play}$ for the three quizzes specified in FIG. 30. FIG. 33's y-axis represents the amount of entropy reduced by a player manipulating the blocks and the final values indicate $C^{play}$ for each game.

Exemplary SIG-Blocks and TAG-Games were tested on from 33 participants (age: 18-30, 20 males and 13 females) using 20 assembly quizzes that required a user to manipulate the blocks to achieve the target 2-by-2 or 3-by-3 assembly configuration displayed on the user's GUI. Target assessor data measured and displayed on the assessor GUI included: incremental and total completion time for each quiz; correctness at each manipulation step; and real-time assembly configuration of the blocks.

Table 6 shows the correlation between performance measured in time and play complexity ($C^{play}$).

TABLE 6

| Performance in Assembly Tasks | r, Correlation with $C^{play}$ | p value |
|---|---|---|
| Completion time | 0.9345 | <<0.01 |
| Normalized completion * | 0.9300 | <<0.01 |
| Quiz number (1-20) | 0.9992 | <<0.01 |

* Normalized completion time is the total completion time divided by the number of total assembly steps - potentially excluding differences in individual manipulation speed.

Figure 34:
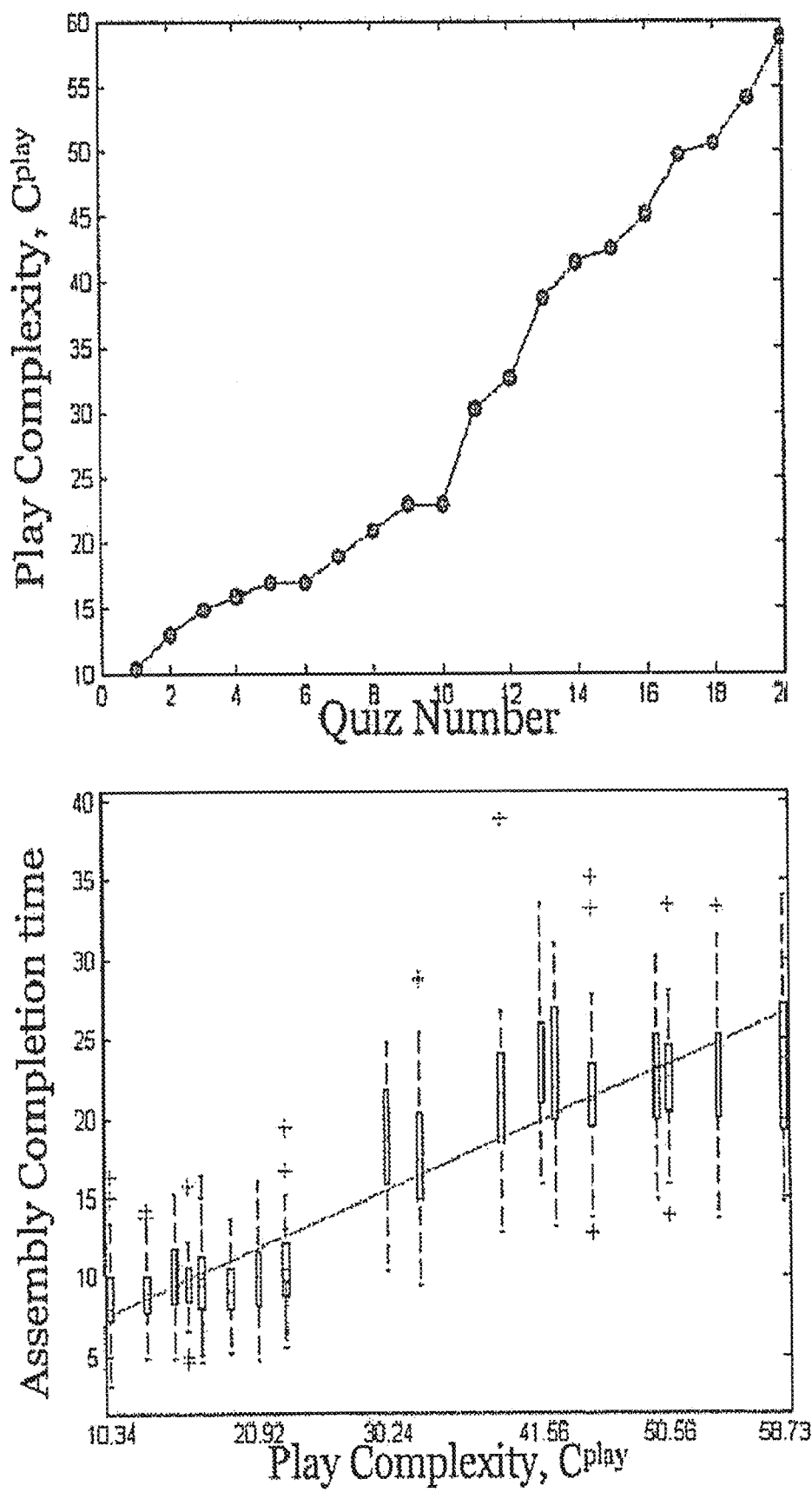
FIG. 34 includes graphs showing exemplary quiz complexity and associated completion time.

FIG. 34's charts show $C^{play}$ vs. quiz numbers (top) and quiz completion time vs. $C^{play}$ (bottom). The 20 assembly quizzes used in the study had corresponding $C^{play}$ values ranging from 10.34 to 58.73. A line on the bottom chart indicates the linear least squares fit for the collected data.

Tables 7-9 show various exemplary quiz designs for TAG-Game$^A$ for assembly; TAG-Game$^S$ for shape matching; and TAG-Game$^M$ for shape/sequence memory.

TABLE 7

With reference to FIG. 48, 20 Assembly quizzes and corresponding play complexity for exemplary TAG-Game$^A$.

| Element | $H^{initial}$ | $H^{final}$ | $C^{play}$ |
|---|---|---|---|
| 7-1 | $\log_2 24^4 + \log_2 4!$ | $\log_2 4^2 + \log_2 4!$ | 10.33 |
| 7-2 | $\log_2 24^4 + \log_2 4!$ | $\log_2 4^2 + \log_2 2!2!$ | 12.92 |
| 7-3 | $\log_2 24^4 + \log_2 4!$ | $\log_2 4^2 2^2 + \log_2 2!2!$ | 14.92 |
| 7-4 | $\log_2 24^4 + \log_2 4!$ | $\log_2 4^2 2^2 + \log_2 2!$ | 15.92 |
| 7-5 | $\log_2 24^4 + \log_2 4!$ | $\log_2 4^2 2^2$ | 16.92 |
| 7-6 | $\log_2 24^4 + \log_2 4!$ | $\log_2 2^2 2^2 + \log_2 2!2!$ | 16.92 |
| 7-7 | $\log_2 24^4 + \log_2 4!$ | $\log_2 2^2 2^2 2^2 2^2$ | 18.92 |
| 7-8 | $\log_2 24^4 + \log_2 4!$ | $\log_2 2!2!$ | 20.92 |
| 7-9 | $\log_2 24^4 + \log_2 4!$ | $\log_2 1$ | 22.92 |
| 7-10 | $\log_2 24^4 + \log_2 4!$ | $\log_2 1$ | 22.92 |
| 7-11 | $\log_2 24^4 + \log_2 9!$ | $\log_2 4^9 + \log_2 5!4!$ | 30.24 |
| 7-12 | $\log_2 24^4 + \log_2 9!$ | $\log_2 4^6 2^3 + \log_2 6!3!$ | 32.66 |
| 7-13 | $\log_2 24^4 + \log_2 9!$ | $\log_2 2^6 2^3 + \log_2 6!3!$ | 38.66 |
| 7-14 | $\log_2 24^4 + \log_2 9!$ | $\log_2 2^9 + \log_2 4!4!$ | 41.56 |
| 7-15 | $\log_2 24^4 + \log_2 9!$ | $\log_2 2^9 + \log_2 4!3!2!$ | 42.56 |
| 7-16 | $\log_2 24^4 + \log_2 9!$ | $\log_2 2^9 + \log_2 2!3!2!2!$ | 45.15 |
| 7-17 | $\log_2 24^4 + \log_2 9!$ | $\log_2 4^2 + \log_2 2!2!2!2!$ | 49.73 |
| 7-18 | $\log_2 24^4 + \log_2 9!$ | $\log_2 2^3 + \log_2 2!2!2!2!$ | 50.56 |
| 7-19 | $\log_2 24^4 + \log_2 9!$ | $\log_2 3!2!2!2!$ | 54.15 |
| 7-20 | $\log_2 24^4 + \log_2 9!$ | $\log_2 2!$ | 58.73 |

TABLE 8

With reference to FIG. 49, 10 Shape-matching quizzes and corresponding play complexity for TAG-Game$^S$.

| Element | Total Number of blocks | Number of unique blocks | Length of imbedded pattern | Number of pattern repeats | Number of Symmetry Axes | Composite Complexity |
|---|---|---|---|---|---|---|
| 8-1 | 4 | 1 | 1 | 4 | 1 | 0.5 |
| 8-2 | 4 | 1 | 2 | 2 | 0 | 8 |
| 8-3 | 4 | 1 | 2 | 2 | 0 | 16 |
| 8-4 | 4 | 1 | 2 | 2 | 2 | 2.67 |
| 8-5 | 4 | 4 | 2 | 2 | 0 | 16 |
| 8-6 | 9 | 2 | 3 | 3 | 2 | 12 |
| 8-7 | 9 | 1 | 2 | 4.5 | 0 | 16 |
| 8-8 | 9 | 3 | 3 | 3 | 0 | 72 |
| 8-9 | 9 | 6 | 3 | 3 | 0 | 54 |
| 8-10 | 9 | 2 | 4 | 2.25 | 0 | 128 |

TABLE 9

With reference to FIG. 50, 8 quizzes and corresponding play complexity for TAG-Game$^M$.

| Sequence pattern | Sequence Complexity |
|---|---|
| 9-1 | 41.78 |
| 9-2 | 63.77 |
| 9-3 | 75.76 |
| 9-4 | 161.35 |
| 9-5 | 83.19 |
| 9-6 | 161.35 |
| 9-7 | 214.53 |
| 9-8 | 303.89 |

TAG-Games are dynamically reconfigurable assessment sessions whose results can be based on information entropy analysis, geometry, and/or information-theoretic analysis. Unlike conventional blocks, SIG-Blocks can provide real time feedback, monitoring capabilities, and reconfiguration.

SIG-Blocks and TAG-Games can provide a self-sufficient system for assessing a user's cognitive capabilities and learning skills via performing a variety of TAG-Game tasks, such as, insertion, assembly, recall, and/or reconfiguration. SIG-Blocks and TAG-Games do not require external monitoring devices, such as cameras, or an expert to continuously monitor and record the data, although certain embodiments may allow for this. Instead, SIG-Blocks and TAG-Games can rely on real-time and/or delayed data assessment and wireless communication between SIG-Blocks and an assessor device, such as a remote computer.

In one example, SIG-Blocks and TAG-Games may be targeted to preschoolers between the ages of four to six years. Preschoolers are more inclined than younger children to exhibit early evidence of strategic and planning behavior. At age four, traditional assessment instruments may begin to result in stable indices of intelligence, language, and self-regulated behaviors. Preschooler related performance data can facilitate making comparisons between well documented standardized measures, (e.g., Wechsler Preschool and Primary Scales of intelligence-III (WPPSI-III) and the Clinical Evaluation of Language Fundamentals—Preschool version-$2^{nd}$ edition (CELF-P-2)) and SIG-Blocks/TAG-Games.

SIG-Blocks and TAG-Games can provide a technology platform that is highly transformative for various purposes and applications. Assessments using these blocks can be presented to users, such as children, as if they are toys associated with a game, all the while measuring cognitive, learning, and problem solving capabilities. The blocks can provide useful performance data and advanced instrumentation for researchers and educators in various areas related to mental health, child development, rehabilitation, psychology, and elderly care by enabling a programmable technical platform. SIG-Blocks and TAG-Games may have a positive impact by catalyzing and advancing the fields of play-based assessment for diagnostic and therapeutic purposes.

In addition, SIG-Blocks and TAG-Games can provide a multimodal interface for learning various subjects, such as, for example, fundamental mathematics, science, and engineering, especially in young children. Real-time feedback, such as, for example, sound alarms and visual indicators, may improve and stimulate the learning process. For example, SIG-Blocks can be configured as a subject-specific educational tool: SIG-Blocks for mathematics education, by representing geometric shapes/sizes with a corresponding real number and simple algebraic operations; or SIG-Blocks for engineering design education, by integrating actuators into the block design. In another example, SIG-Blocks can function as a tangible/physical simulation tool for fundamental circuit design and logic algorithms by designing blocks representing logic gates, such as AND, OR, or NOT gates.

SIG-Blocks and TAG-Games can facilitate measuring a user's learning and developmental status based on objective observations. SIG-Blocks can measure both tangible and intangible properties and phenomena, in a systematic manner. SIG-Blocks also can incorporate the capabilities of multiple, objective, simultaneous, cumulative, and real-time data collection in different experimental settings. This can facilitate: i) data assessment and analysis for new types of performance and behavior data; ii) design methodology for devices/tools for young children; and iii) technology-enhanced education for children with special needs.

Conventional measurement methods for intelligence, achievements, and cognitive and motor skills are summarized in Table 10, along with SIG-Blocks/TAG-Games.

TABLE 10

Measurement methods for intelligence, achievements, cognitive and motor skills, and attention; and application of SIG-Blocks and TAG-Games for assessment.

| Test | Measurement |
|---|---|
| Wechsler Adult Intelligence Scale and Wechsler Intelligence Scale for Children | Verbal Comprehension; Perceptual Reasoning; Working Memory; Processing Speed; Fine-Motor Proficiency |
| Stanford Binet Intelligence Test - Fourth Edition (SBO-IV) | Verbal Comprehension; Quantitative Reasoning; Perceptual Reasoning; Processing Speed |
| Woodcock Johnson Test of Achievement-III | Achievement |
| Bruininks-Oseretsky Test of Motor Proficiency- 2 (BOT-2) | Motor Proficiency |
| Tactual Performance Test (TPT, special memory) | Motor Proficiency; Spatial Memory |
| Continuous Performance Test (CPT) | Attention; Impulsivity |
| Clinical Evaluation of Language Fundamentals - Preschool version-2 (CELF-P-2) | Language |
| SIG-Blocks/TAG-Games Test | Perceptual Reasoning; Quantitative Reasoning; Fine-Motor Proficiency; Spatial and Working Memory; Processing Speed; Attention Span; Achievement; Learning Capability |

There are challenges in measuring intangible personal capabilities. These challenges may be imposed by difficulties in addressing individual differences and special circumstances, particularly for underrepresented groups, such as, for example, children with various developmental delays and gifted children. Generally, existing tests typically have a fixed set of problems/experiments that are difficult to adjust or modify for certain groups with special conditions. Conventional tests may lose their sensitivity at the margins or extremes. Exemplary SIG-Blocks and TAG-Games are capable of reconfiguring to respond to an individual user's capabilities, allowing for sensitivity in the assessment. For example, gifted users may be so far from the mean on a standardized test that their test results are effectively meaningless, except for identifying inclusion in a "gifted" group, with no relative sensitivity. It is infeasible to adjust a sample-based standardized test to account for relatively few gifted users. However, SIG-Blocks and TAG-Games can be dynamically reconfigurable to change the complexity of an assessment mid-session or over the course of multiple sessions. The varying complexity can be tracked based, for example, on the information entropy as described above.

In one embodiment, SIG-Blocks are a tool for play-based assessment that can be easily transformed into various tests for measuring intelligence, achievement, learning capability, motor proficiency, spatial memory, and attention. Depending on a group's or user's heath condition, the difficulty or the type of play can be designed by selecting a proper set of SIG-Blocks/TAG-Games. The benefits and uses of SIG-Blocks/TAG-Games are not limited to assessment, but other embodiments include interventional and therapeutic tools for children, the disabled, and the elderly.

In one embodiment, SIG-Blocks and TAG-Games provide a technology-embedded tool for assessing children's cognitive problem-solving, fine motor, and working memory skills, which form a basis for fundamental STEM reasoning and learning. SIG-Blocks and TAG-Games provide play-based assessments and early STEM education by automating the data collection process and enabling "learn-through-play" activities. SIG-Blocks and TAG-Games can include different types of geometric play (e.g., assembly, shape matching, and shape memory) that provide a non-verbal format, reducing cultural and language bias. In various embodiments, SIG-Blocks and TAG-Games employ a computational measure of play complexity associated with geometric reasoning, problem solving, and manipulation, which facilitates adjusting the difficulty of an assessment for a target population based on age and developmental status.

Table 11 lists associated cognitive skills, raw performance data, and an exemplary scoring method for different types of TAG-Games.

unit in circuit communication with a transmitter and at least one movement sensor, where the control unit is capable of transmitting via the transmitter movement data corresponding to the movement of the block, and the control unit, the transmitter and the at least one movement sensor being positioned in an enclosure of the block. Step 3520 includes presenting to the user via a programmable display an image showing a target orientation of the at least one block and visual feedback based on user progress, where the control unit performs at least one of the following: automatically transmitting movement data about the block to a remote computer while the user manipulates the block toward the target orientation; automatically collecting movement data about the block while the user manipulates the block toward the target orientation and then later transmitting movement data to a remote computer; and automatically transmitting movement data about the block to an intermediate device while the user manipulates the block toward the target orientation and then later transmitting movement data to a remote computer from the intermediate device, wherein the intermediate device is a local computer, a mobile phone, or a mobile device. Step 3530 includes generating an assessment of the user based at least in part on movement data transmitted to the remote computer by the control unit. Step 3540 includes storing in a computer memory the movement data for later use. Step 3550 includes displaying or transmitting the assessment of the user.

The following are three exemplary TAG-Game designs utilizing various SIG-Block configurations (see, for example, the quizzes shown in Tables 7-9), including scoring embodiments:

TABLE 11

Related cognitive skills, raw performance data collected by embedded sensors, and a composite performance index (PI) for each game to provide comparable sets of data to other standard measures. $N_{correct}$ (the number of total correct steps), $N_{total}$ (the number of total steps), $t_{total}$ (the total completion time), and $\alpha$ (a scaling constant for each game type).

| Types | Cognitive Skills | Raw Performance Data | PI |
|---|---|---|---|
| TAG-Game$^A$ | Fine-motor proficiency Visual-motor integration | Incremental completion time<br>Total completion time<br>Correctness at each step | $PI_A = \alpha_A \times \dfrac{N_{correct}}{N_{total} \times t_{total}}$ |
| TAG-Game$^S$ | Cognitive problem solving Conceptual reasoning Visual-motor integration Fine-motor proficiency Working memory | Incremental completion time<br>Total completion time<br>Correctness at each step | $PI_S = \alpha_S \times \dfrac{N_{correct}}{N_{total} \times t_{total}}$ |
| TAG-Game$^M$ | Working memory Visual-motor integration Fine-motor proficiency | Incremental completion time<br>Total completion time<br>Correctness at each step | $PI_M = \alpha_M \times \dfrac{N_{correct}}{N_{total} \times t_{total}}$ |

Additional Data Spatial manipulations; overall speed of motions; domain frequency of hand motions; repetitive/hyperactive motions; and estimated manipulation trajectories.

In different embodiments, the scoring may count the total number of correct answers and time, similar to other standard intelligence scales, such as Wechsler's or Raven's tests. Further data analysis can produce additional behavioral information, such as overall speed of motions, manipulation patterns, behavioral characteristics, and spatial manipulations.

Figure 36:
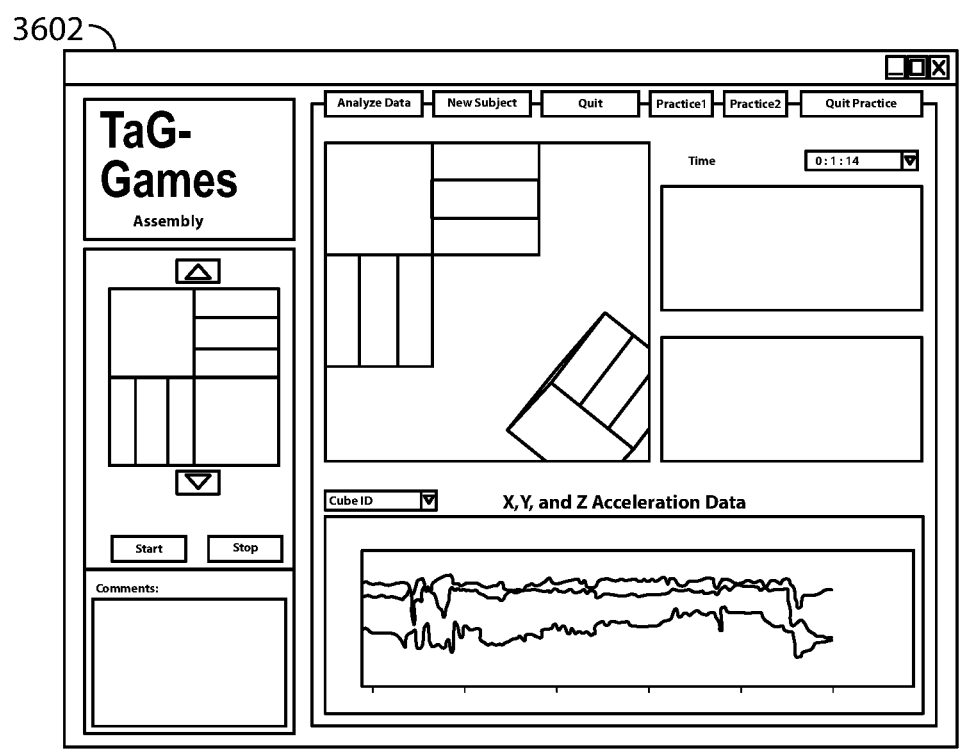
FIG. 36 is a screenshot of an exemplary Assembly Game administrator/assessor GUI.
Figure 37:
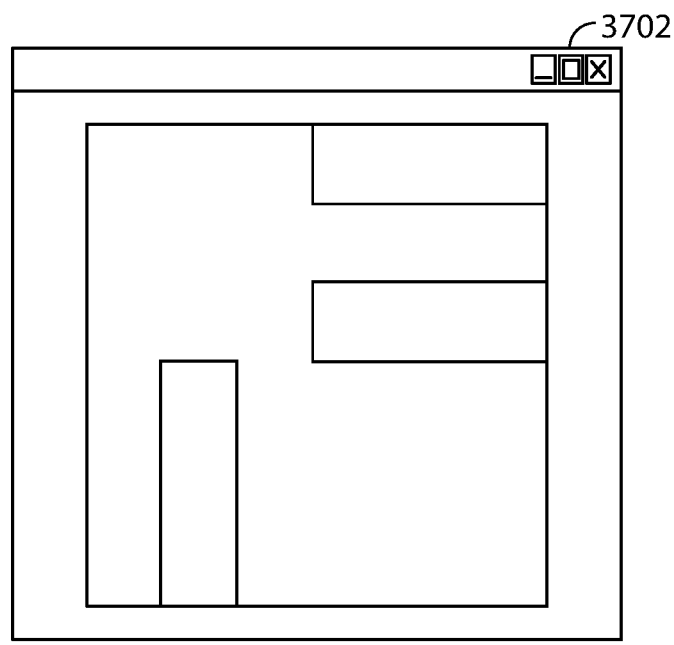
FIG. 37 is a screenshot of an exemplary Assembly Game player/user GUI.

FIG. 35 describes an exemplary method of assessing a user's capabilities using TAG-Games and SIG-Blocks. Step 3510 includes providing at least one block having a control 1) Exemplary TAG-Game$^A$: Assembly Game:

As mentioned above, TAG-Game$^A$ is a puzzle game in which the user is required to recreate a displayed image using the SIG-Blocks. The user is given a pattern and then must rotate and rearrange the blocks in order to find the correct images in order to recreate the pattern. The distinguishability of the patterns can be decreased, in order to make them more difficult, by removing the lines separating the pattern components. FIG. 36 shows an exemplary Assembly Game Administrator Game Screen 3602. FIG. 37 shows an exemplary Assembly Game Player Screen 3702.

Play Complexity:

TAG-Game$^A$ requires a player to assemble 4 or 9 SIG-Blocks to match 2-by-2 or 3-by-3 assembly configuration displayed on a GUI computer screen. Each SIG-Block is covered with 6 different geometric images, each with 1-, 2-, or 4-fold symmetry. The play complexity associated with the assembly game is determined by the change in configurational entropy where $C^{play}=H^{initial}-H^{final}$.

Test Design:

TAG-Game$^A$ consists of 20 items, 10 using 4 SIG-Blocks and another 10 using 9 SIG-Blocks. The items are ordered by increasing difficulty as calculated by $C^{play}$. For all quizzes, the time and the correctness of assembly at each assembly step, and, every 0.06 s, tri-axial accelerations of the blocks are recorded. Among the measurable data, time and correctness of each item (not at each assembly step) may also be manually collected in order to compare accuracy of automatically and manually collected data sets.

This game may take approximately 15 minutes to administrator and requires a set of SIG-Blocks, a computer with two screens (or two computers), and the GUI. The GUI automatically records the time to complete each image in the design and determines whether the designs are completed correctly. At each assembly step, real-time assembly configuration, completion time, and correctness are measured, transferred to a remote computer, and displayed through an assessor interface 3602 as shown in FIG. 36.

Scoring Method:

The assembly game is scored based on individual designs based on whether the design is completed correctly and the time it takes to complete the design. Specifically, 3 points are given for a correct 2-by-2 pattern if the correct completion time is less than or equal to 7 seconds, and 2 points are given if more than 7 seconds is required for the correct completion. Zero points are given for an incorrect completion. For 3-by-3 patterns, 7 points are given if the correct completion time is less than or equal to 16 seconds, 5 points if the correct completion time is 16-30 seconds, and 3 points if the correct completion time is over 30 seconds. Zero points are given for an incorrect completion. This scoring method results in a maximum possible score of 100.

2) Exemplary TAG-Game$^S$: Shape Matching

Figure 38:
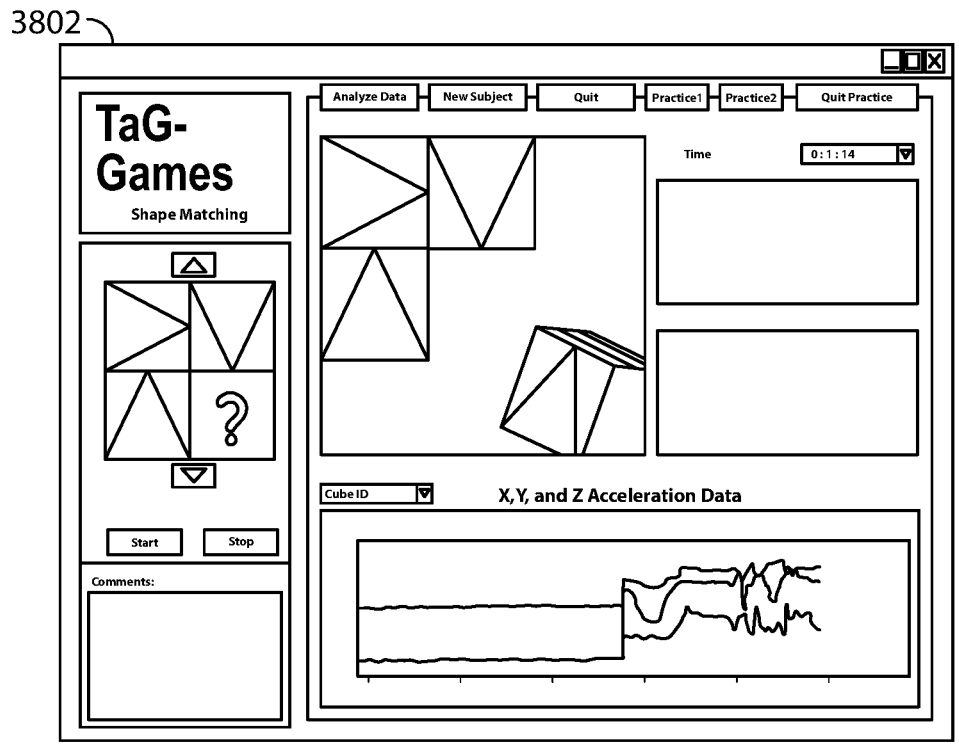
FIG. 38 is a screenshot of an exemplary Shape Matching Game administrator/assessor GUI.
Figure 39:
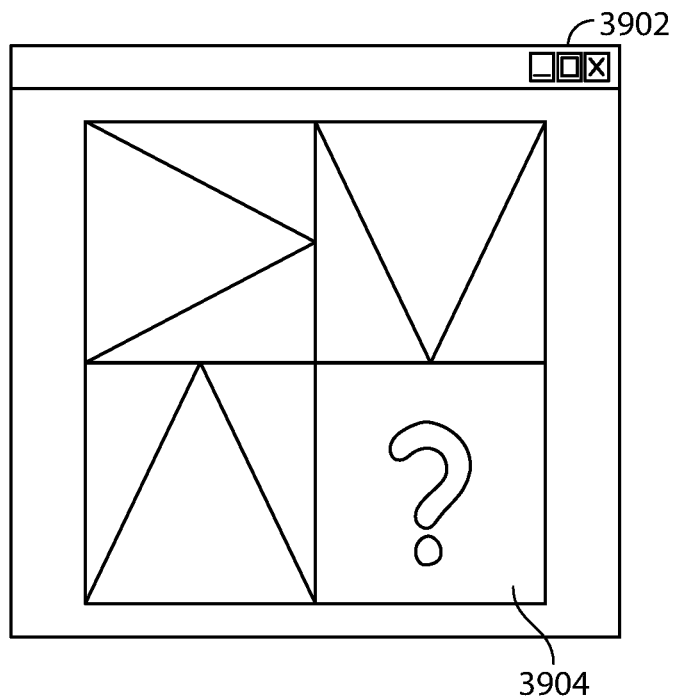
FIG. 39 is a screenshot of an exemplary Shape Matching Game player/user GUI.

The shape-matching game consists of ten groups of patterns with a missing image, where the user is prompted to determine the missing image and rotate the block so that the missing image in face up. The patterns have a calculated play complexity and are ordered in increasing complexity. For all quizzes, the time it takes for the subject to complete the pattern and whether it is completed correctly is recorded. The game is intended to determine if a user can figure out the relationship between a group of images and determine the missing image. This tests fine motor control, visospatial reasoning, and problem solving skills. Like the assembly game, fine motor control is reflected in the coordination with which the blocks are manipulated. Visuospatial reasoning, also seen in the assembly game, is reflected in the user's ability to identify the relationships between block rotations and face images, and the relationships between face images and design images. Problem solving skills include the ability of the user to identify the relationship in the quiz design and determine the missing image. FIG. 38 shows an exemplary Shape Matching Game Administrator Game Screen 3802. FIG. 39 shows an exemplary Shape Matching Game Player Screen 3902.

Play Complexity:

The play complexity of the shape-matching game is based on the complexity to find the relationships between the blocks (problem solving), not the manipulation of the blocks. The complexity is based on the factors that affect the problem of finding the relationships in the design. The factors that increase the complexity are the total number blocks, the number of unique blocks, and the length of the imbedded pattern. The factors that decrease the complexity, or make it easier to solve, are the number of times the pattern repeats and the number of symmetry axes that are in the design. The complexity equation is shown below:

$$\text{Shape Matching Complexity} = \frac{\text{Total Number of Blocks} \times \text{Number of Unique Blocks} \times \text{Length of Embedded Pattern}}{\text{Number of Pattern Repeats} \times (\text{Number of Symmetry Axes} + 1)}$$

Test Design:

This game is estimated to take 10 minutes and requires 1 SIG-Block, a computer with two screens or two computers, and the GUI. There are five 2-by-2 designs and five 3-by-3 designs. The administrator uses one computer to lead the user through the game and the other computer provides the designs to the user. Data for the time to complete and accuracy is collected by the GUI, and is confirmed by the administrator, using the GUI, for algorithm assessment purposes. The administrator may also be responsible for making sure that the blocks are communicating properly and providing verbal instructions to the user on the procedures of the game. The GUI administrator screen 3802 may be similar to that of the assembly game as shown in FIG. 38. The user's screen 3902 also is similar except for a question mark 3904 in the place of the missing image, as shown in FIG. 39.

Scoring Method:

Each individual quiz is worth 1 point and a total of 10 points (10 quizzes) is the maximum possible score. This scoring method is similar to one used in the matrix reasoning subtest in the Wechsler's test.

3) Exemplary TAG-Game$^M$: Sequence Memory

Figure 40:
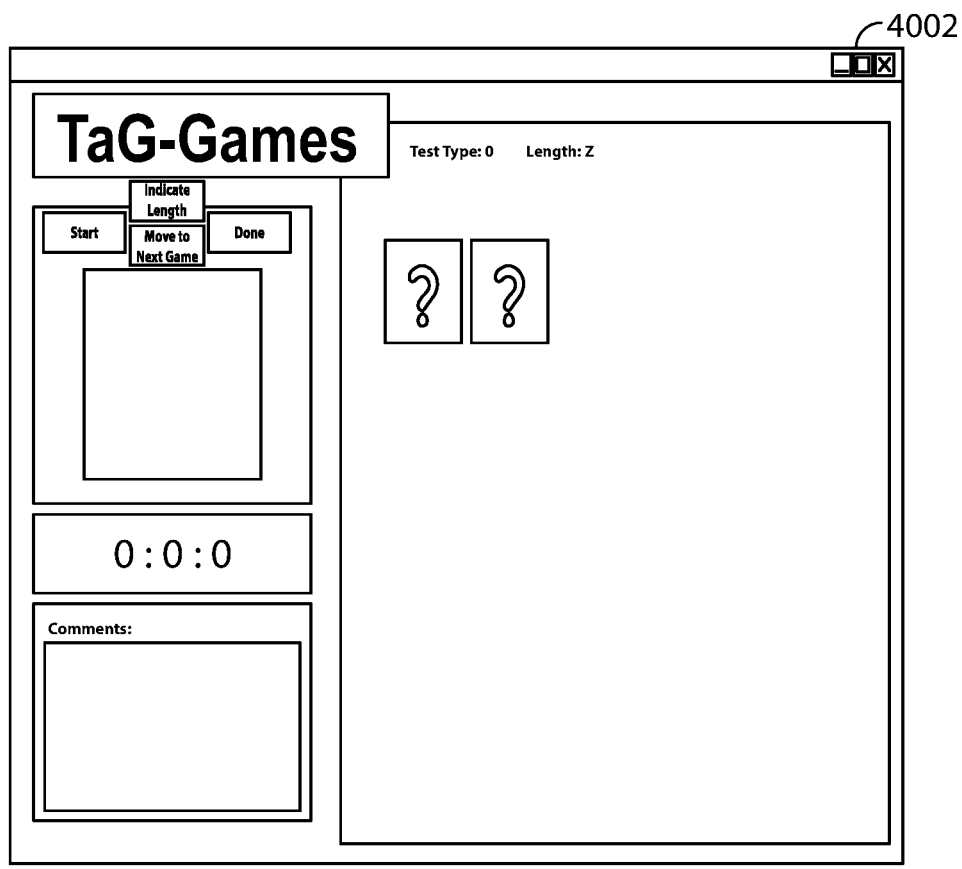
FIG. 40 is a screenshot of an exemplary Sequence Memory Game administrator/assessor GUI.
Figure 41:
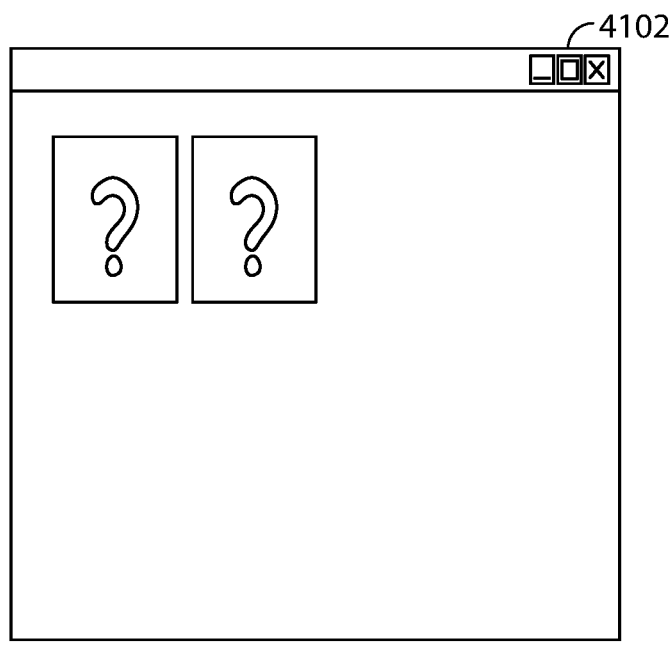
FIG. 41 is a screenshot of an exemplary Sequence Memory Game player/user GUI.

The sequence memory game requires that the user remember and repeat back a sequence of images using the SIG-Block. The images within the sequence are flashed one at a time on the screen. Two different sets of images are used. The first is a set of 6 different colors and the second set is the same set of geometric images shown in FIG. 18. This game tests a user's fine motor control, short-term memory, and attention span. Fine motor control is reflected in the speed at which the user can rotate the block to the correct face image. Short-term memory is reflected in how well the user remembers the sequence of images. Attention span is reflected in the ability to maintain interest when the sequences get longer. FIG. 40 shows an exemplary Sequence Memory Game Administrator Screen 4002. FIG. 41 shows an exemplary Sequence Memory Game Player Screen 4102.

Play Complexity:

Using the concept of discrete entropy, the complexity is defined as the difference between the highest possible entropy of a sequence of N images and the entropy associated with the specified sequence of images. The entropy describes how ordered the sequence is. The initial entropy is the entropy associated with N images going to any of n positions in the sequence and the sequences of 2 to N images going to any of N−i+1 places. For example, with a sequence of 5 images, a pattern of 1 image has 5 different possible locations, a pattern of 2 has 4, a pattern of 3 has 3, a pattern of 4 has 2, and a pattern of 5 has 1. The final entropy is calculated using the same logic except that not all of the images in the sequence are interchangeable and the sequence must be analyzed in order to figure out which are interchangeable. For example, if we have the sequence 12312, it must be taken into account that 1 and 2 are both repeated twice and that 12 is repeated twice. The last condition means that if a sequence can be divided up into identical components then the complexity of the sequence is the complexity of the components multiplied by the number of times it is repeated. For example, if we have the pattern 123123123, the pattern 123 is repeated 3 times, so the complexity would be 3 times the complexity of 123. Sequences that are used are shown below in Table 12. It is important to remember that while a sequence of numbers (e.g., 123) can have increasing numerical order, the associated sequence of images have no such association.

TABLE 12

| Pattern | $H^{initial}$ | $H^{final}$ | $C^{play}$ |
|---|---|---|---|
| 430 | 4.5850 | 0.0000 | 4.5850 |
| 1342 | 12.7549 | 0.0000 | 12.7549 |
| 521435 | 52.4004 | 1.0000 | 51.4004 |
| 03123514 | 141.4353 | 2.0000 | 139.4353 |
| 2345134214 | 304.4988 | 7.5850 | 296.9139 |

Test Design:

The sequence memory game is comprised of 8 sequences of images that the user must remember and repeat back using the SIG-Block. Each set of images (set of 6 different colors or set of geometric images) has 4 sequences of increasing length, starting at 4 images and ending with 10 images. The user's performance is measured by the time taken to complete each image in the pattern and the number of attempts to get the correct image. This game is estimated to take 10 minutes and requires 1 SIG-Block, 1 SIG-Block cover of colored images, a computer with 2 screens, and a GUI. One of the computers flashes the sequence images for the subject at a constant interval of 25 milliseconds for 1.5 seconds each and then provides an indicator when the user has correctly indicated the sequence image. The second computer screen allows the administrator to control the game. The administrator may be responsible for making sure that the SIG-Block is working properly and for moving through the sequences. During the assessment, the administrator can see the number of attempts to get correct answers by the user, which is represented on the GUI and saved in the data.

Scoring Method:

The sequence game consists of 8 sequences of images, where these sequences are divided into two groups with two types of patterns: colored patterns and the geometric patterns used in the previous games. Each group of sequences has 4, 6, 8, 10 images respectively. Users are asked to remember a total of 56 images in both groups and the number of correctly remembered images is counted, with a maximum possible score of 56.

In other embodiments, TAG-Games and SIG-Blocks address the limitations of existing screening instruments of developmental disabilities by establishing a tangible interactive game interface with an embedded sensory feedback mechanism for screening, early identification, and diagnosis of developmental disabilities. Games with varying difficulty can be generated based on a computational measure of play complexity associated with each assessment. In one embodiment, SIG-Blocks and TAG-Games may be configured to perform fully automated play assessment of behavior and performance with augmented sensory feedback to effectively distinguish children with Autism Spectrum Disorders (ASD) from non-ASD children. In different embodiments, SIG-Blocks and TAG-Games can be configured for use in screening, diagnosis, and treatment. In particular, SIG-Blocks and TAG-Games can provide reprogrammable augmented sensory feedback that enhances visual and auditory feedback to a user during play that allows observation of the individual and collective effect of augmented sensory feedback in behavior and performance.

Cognitive development may involve a number of external and internal factors that may influence the speed of the developmental process and the level of cognitive capacities. Due to the complex nature of intellectual and cognitive mechanisms, the actual effects of impaired senses or augmented sensory feedback in an individual's behavior may be difficult to measure. To assess certain aspects of individual and collective cognitive functions and influences of sensory feedback through interactions, in some embodiments, SIG-Blocks may include at least two capabilities: LED-mounted surfaces to enable reprogrammable patterns and colors for each block and a sound activation mechanism, as shown, for example, in FIG. 16B above. A block may be easily reconfigured for specific subtests to provide or remove specific sensory feedback during an assessment. Augmented visual feedback can be programmed by differentiating colors/shapes on each surface. Auditory feedback can be provided in a variety of ways, such as a different alarm sound for successful or unsuccessful assembly. In another example, a block may be configured on different surfaces with displays similar to those found in cellular telephones and other handheld electronics.

One exemplary test using SIG-Blocks and TAG-Games may include two sets of play, a preset test (SET-1), and free play (SET-2). SET-1 may contain, for example, four modules, with a module having six geometric assembly problems: (module 1) no augmented sensory feedback; (module 2) enhanced visual feedback; (module 3) activated auditory feedback; and (module 4) both visual and auditory feedback as summarized in Table 13. A module may include, for example, 6 problems with varying difficulty. SET-2 may be designed to observe a user's interactions with the blocks and the effect of augmented sensory feedback in the duration of interactions and behavioral patterns during free play.

TABLE 13

An example test may involve two sets of play: (SET-1) the preset test with 24 problems and (SET-2) free play.

| Game Types | Module 1: None | Module 2: V | Module 3: S | Module 4: V + S |
|---|---|---|---|---|
| SET-1 Easy Difficult | Sight Touch | Enhanced Sight Touch | Sight Hearing Touch | Enhanced Sight Hearing Touch |
| SET-2: Free Play | | | | |

Total 24 quizzes: 6 quizzes with varying difficulty in each module for 4 modules
None: No additional sensory feedback; V: Augmented visual feedback; S: Sound feedback Assessor data can be converted and scaled into multiple (e.g., two) scores, performance and processing speed, for comparison with other measures, such as WPPSI-III (a full-scale IQ for children). SIG-Blocks and TAG-Games can facilitate examining items including, but not limited to: a) the effect of augmented sensory feedback in behavior and performance in solving geometric problems; b) the effect of augmented sensory feedback in preference, duration of interests and behavioral patterns; c) correlation between the performance and the computational complexity measure; d) the relationship between the effect of augmented sensory feedback and complexity of geometric play; and e) group (e.g., typical AS and ADHD) differences in the results.

A preliminary evaluation was conducted: 1) to examine accuracy of automated data assessment and consistency and reliability of the collected data; 2) to compare the performance data with our computational model of play complexity; 3) to test the preliminary validity of designed TAG-Games for assessment of associated cognitive skills; and 4) to observe additional behavioral characteristics while playing TAG-Games. This study was reviewed and approved by the Case Western Reserve University (CWRU)'s Institutional Review Board.

A total of 92 participants were recruited from CWRU's campus (46 female, 46 male); 48 of the students were from the School of Engineering, and 46 students were from the Art and Sciences School. The breakdown of the 92 participants is provided in Table 14. As shown, most of the students from the engineering departments are male, whereas a large population of females was recruited from non-engineering departments. Since the percentage of women engineering students is less than the percentage of men, gender is unbalanced for this characteristic. Also, non-engineering students are mainly from the psychology department. Women comprise a larger portion of psychology students than men.

TABLE 14

Demographic description by gender and (non-) engineering group.

| | | Frequency | Percentage |
|---|---|---|---|
| Male | Engineering | 32 | 34.8 |
| | Arts and Sciences | 14 | 15.2 |
| Female | Engineering | 16 | 17.2 |
| | Arts and Sciences | 30 | 32.6 |
| | Total | 92 | 100 |

Three types of TAG-Games and two subtests of Wechsler Adult Intelligence Scale—3$^{rd}$ Edition (WASI-III) were tested on each subject. TAG-Game$^4$ consisted of 20 assembly items, 10 4-block quizzes and 10 9-block quizzes; TAG-Game$^s$ involved 10 shape-matching problems; and TAG-Game$^M$ contained 12 sequence memory problems. The entire procedure was video recorded under the subject's consent in order to observe the hand manipulation patterns, as well as to provide reference data set for accuracy evaluation. After finishing all of the sets, a brief survey was conducted to determine the subject's preference among the three TAG-Games, whether they wanted to participate again, and what strategy they used to remember the sequences in the memory game. The entire test took about 40-50 minutes.

The accuracy of the automated assessment was determined by comparing the sensor-collected data with manually collected data, where video recording provided reference data for comparison. To evaluate the proposed computational measure of play complexity, a correlation study was conducted between the performance scores and play complexity values for each game. Also examined was the preliminary validity of TAG-Games for the target measures, such as cognitive problem solving, working memory, and fine motor skills, by comparing the TAG-Game scores with block design and matrix reasoning subtests in WASI-III. Correlations among these tests were determined. Through statistical analysis, gender, age, and major differences in the performance scores were examined.

First, the accuracy of the automated data assessments was evaluated in terms of sensitivity and specificity of the binary classification. To see the internal consistency and reliability, split-half reliability tests and test-retest reliability tests were performed. Also, play complexity models were validated with correlation to performance. The results of the statistical and correlation analyses with respect to gender and department group were presented with general regression analyses to determine the interaction of gender within each of the department groups. MANOVA was then conducted to compare multivariate means of gender and department groups. To examine the design validity of the TAG-Game as a novel alternative assessment game for WAIS-III, a correlation test was performed.

Accuracy of Automated Data Assessments

The assembly detection algorithm was tested for the 92 participants for 10 items with 4 assembly detections each. The total of 3680 detections resulted in 3460 true correct, 204 false incorrect, 15 true incorrect, and 1 false correct notification. Sensitivity and specificity of this binary classification was tested and revealed 0.9446 in sensitivity and 0.9375 in specificity.

$$Sensitivity = \frac{|\text{True Correct}|}{|\text{True Correct}| + |\text{False Incorrect}|} = 0.9446;$$

$$Specificity = \frac{|\text{True Incorrect}|}{|\text{True Incorrect}| + |\text{False Correct}|} = 0.9375.$$

Internal Consistency and Reliability

The primary purpose of this study was to determine the split-half and short-term test-retest reliability of the TAG- Games. Such measures provide information on the internal consistency and self-correlation of a test, as well as its stability over time.

Split-half internal consistency: Internal consistency was examined for TAG-Game$^A$ by splitting 20 quizzes into two groups {1, 4, 5, 8, 9, 12, 13, 16, 17, 20} and {2, 3, 6, 7, 10, 11, 14, 15, 18, 19} where the numbers indicate the quiz numbers. Since the complexity of the TAG-Game$^A$ increases as item number increases, we did not use the odd-even split test. The selected item groups have the closest complexity values in total. The split-half reliability coefficient of TAG-Game$^A$ was determined by dividing the 20 items of TAG-Game$^A$ into two groups using Spearman's correlation coefficient. The value was $r=0.7709$ ($p<0.001$).

Figure 42:
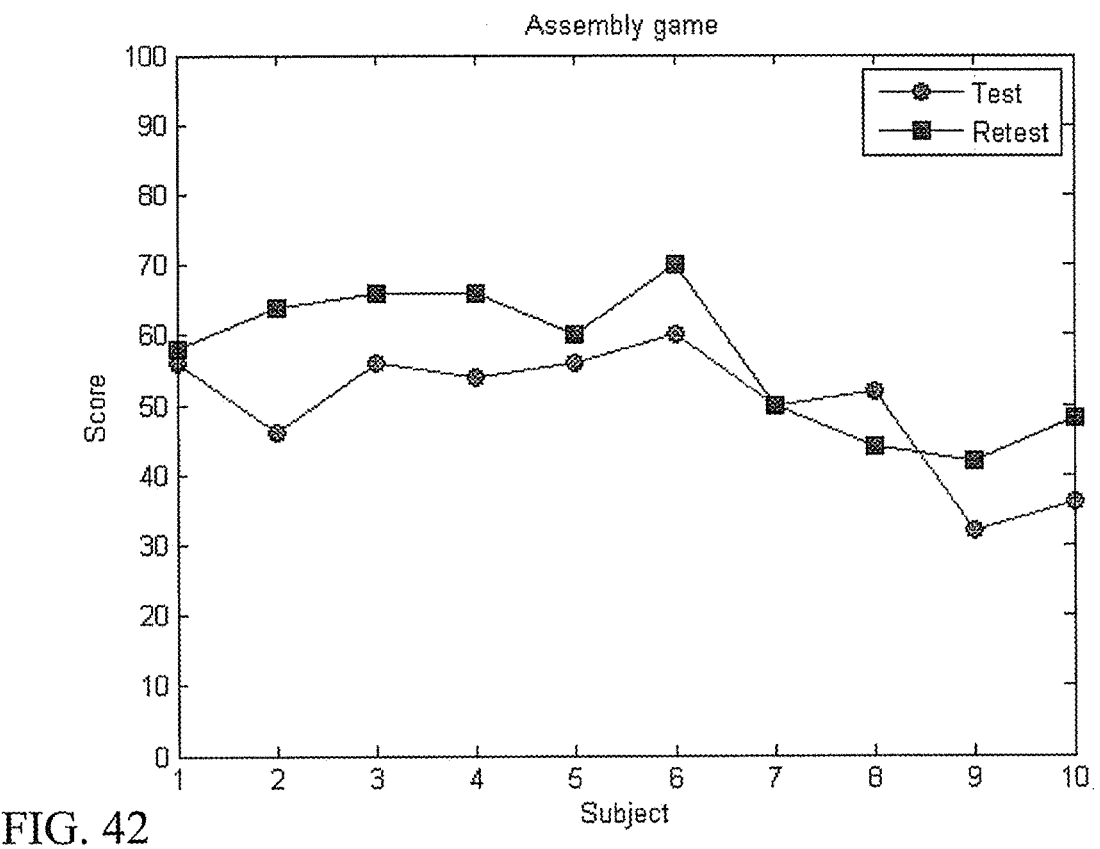
FIG. 42 is a graph of exemplary scoring of an exemplary Assembly Game.
Figure 43:
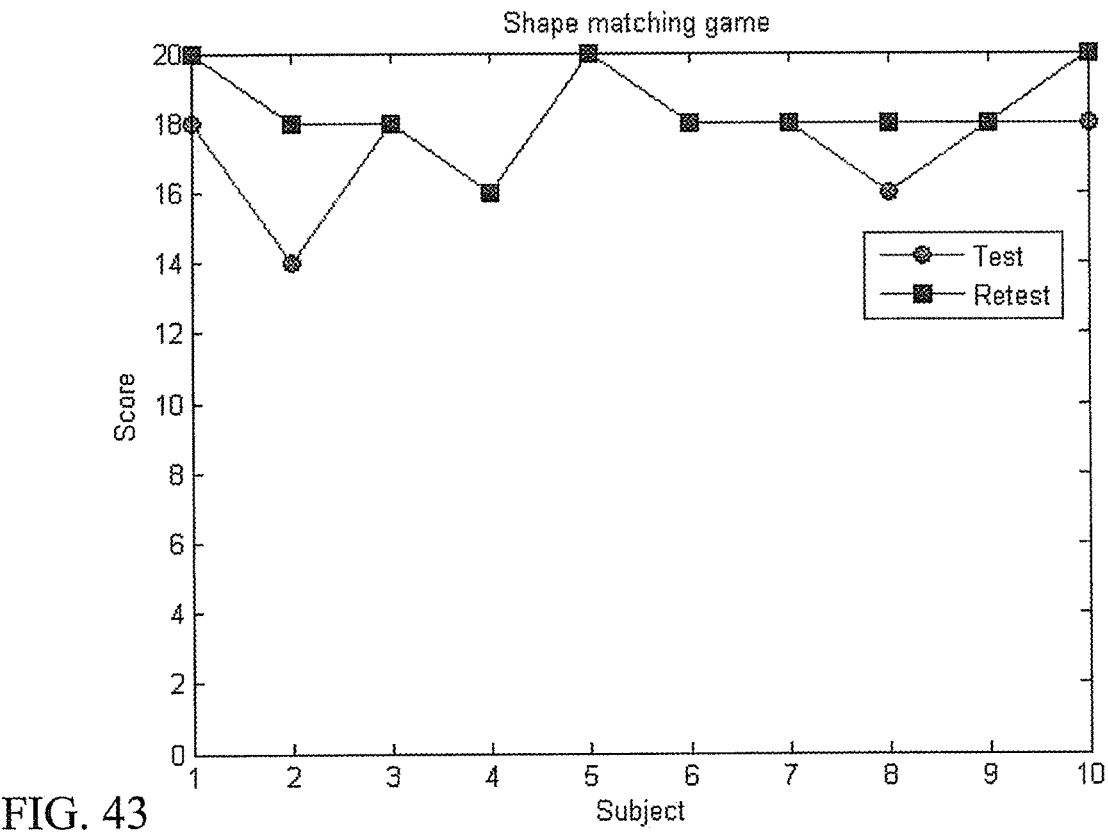
FIG. 43 is a graph of exemplary scoring of an exemplary Shape Matching Game.
Figure 44:
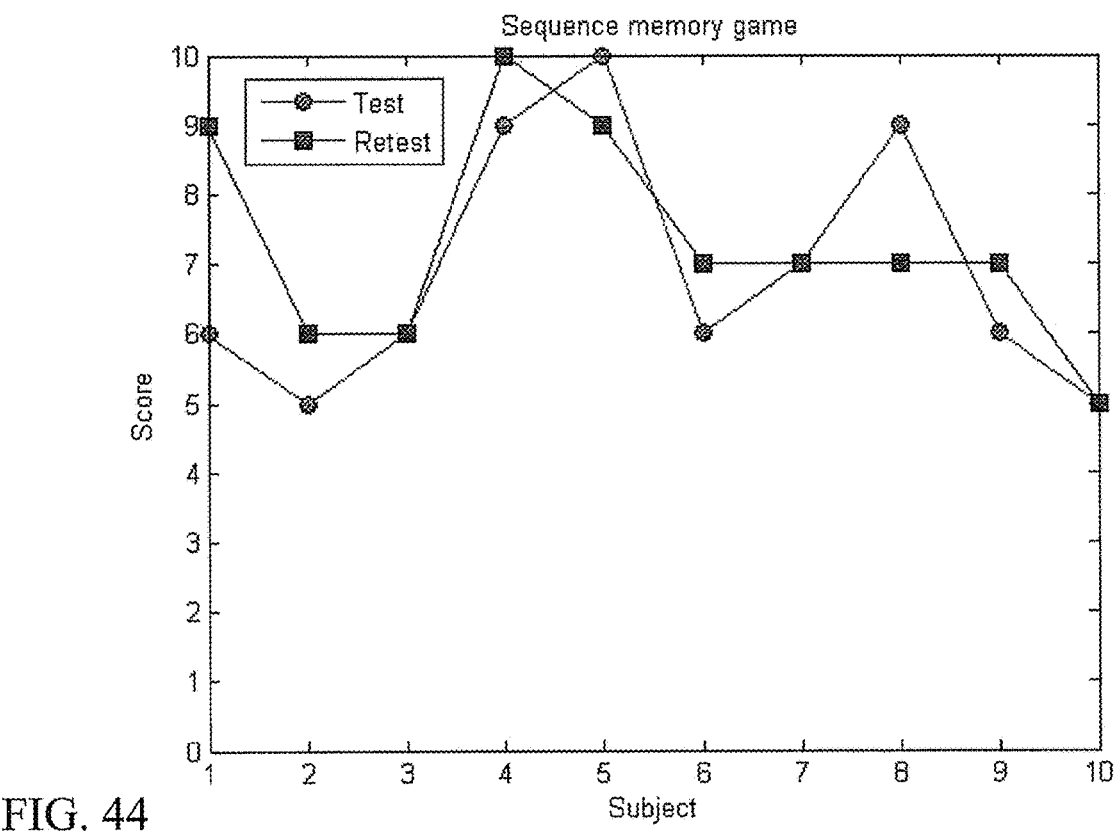
FIG. 44 is a graph of exemplary scoring of an exemplary Sequence Memory Game.

Test-retest reliability: 10 subjects were administrated the TAG-Games on two occasions separated from one another by approximately two weeks. The test-retest reliability was $r=0.720$ ($p<0.05$) for the assembly game, $r=0.624$ ($p<0.05$) for the shape matching game, and $r=0.745$ ($p<0.05$). FIGS. 42-44 show the Test-retest reliability of the TAG-Games.

Validity of Computational Measure of Play Complexity

Figure 45:
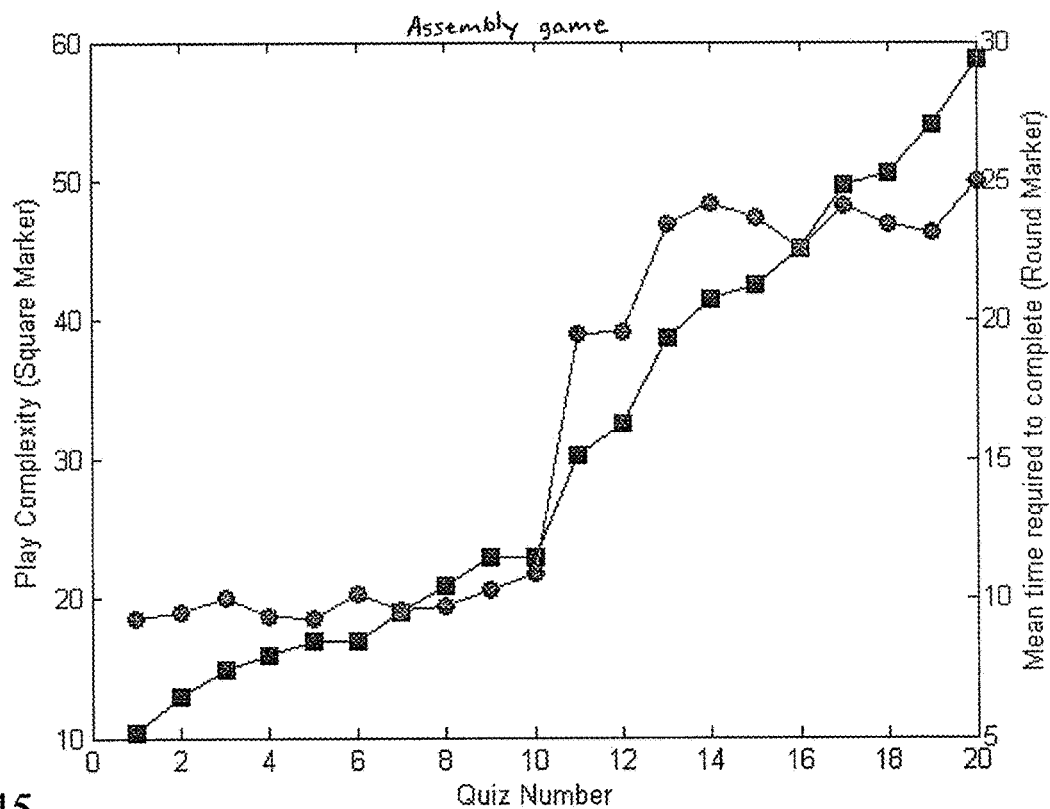
FIG. 45 is a graph of exemplary play complexity and performance for an exemplary Assembly Game.
Figure 46:
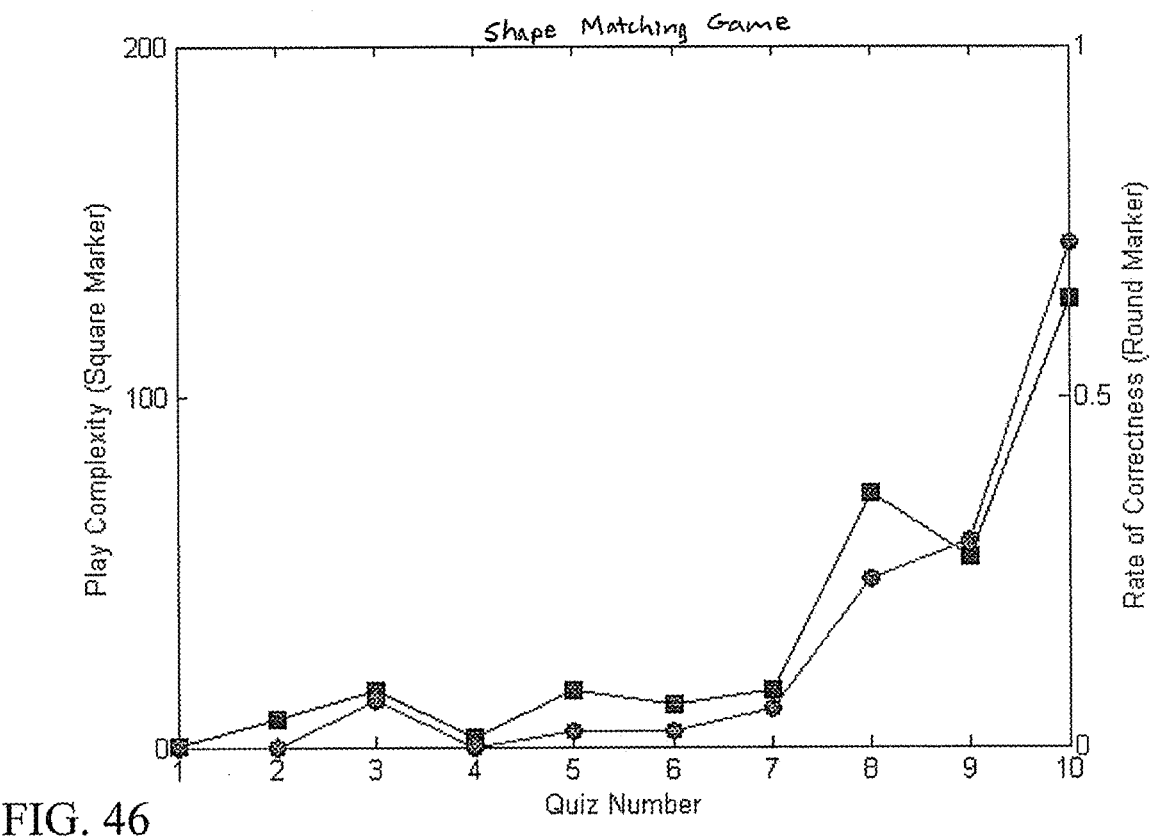
FIG. 46 is a graph of exemplary play complexity and performance for an exemplary Shape Matching Game.
Figure 47:
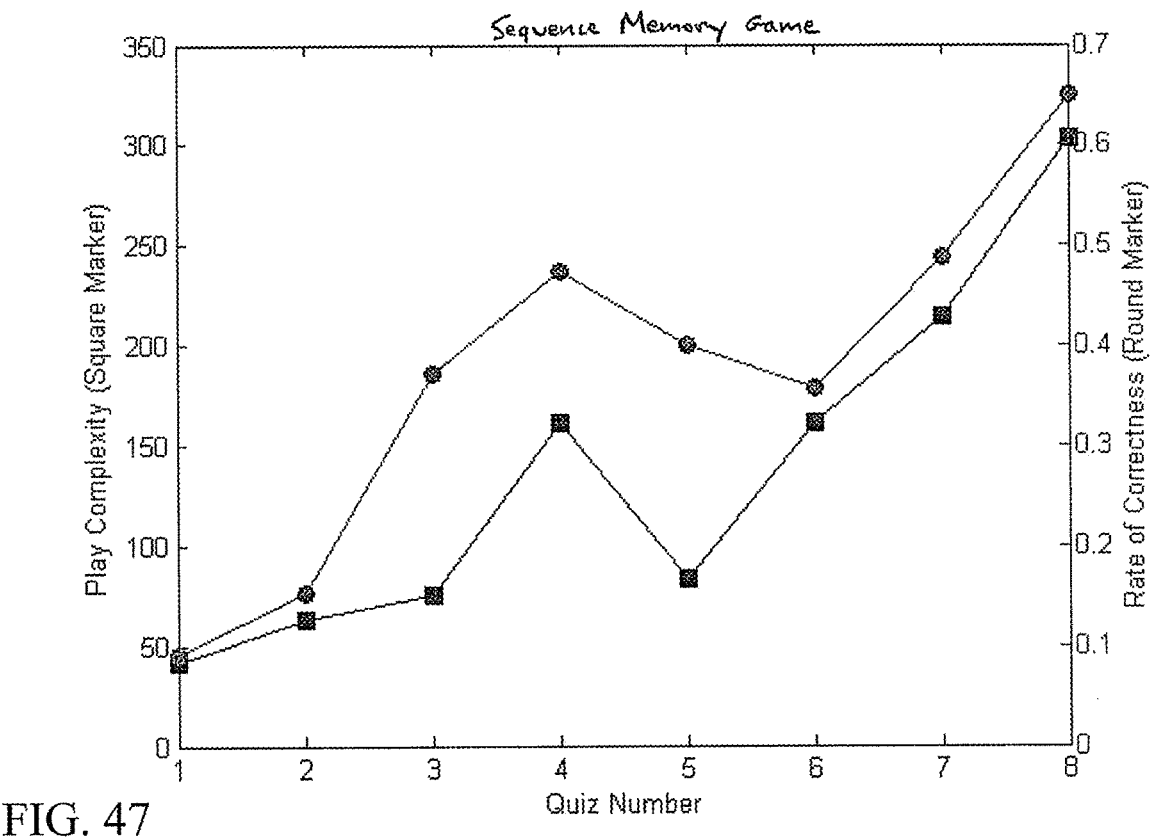
FIG. 47 is a graph of exemplary play complexity and performance for an exemplary Sequence Memory Game.

The mean time required to complete the assembly game versus play complexity was highly correlated, as shown in FIG. 45, and assembly performance and assembly complexity was highly correlated, $r=0.9533$ ($p<0.01$). Correlation between rate of correctness and shape matching play complexity revealed high correlation, $r=0.7491$ ($p<0.05$), as shown in FIG. 46. Regarding the sequence memory game, two sets of games (colored images and SIG-Block images) were conducted and demonstrated high correlation between the rate of correctness versus play complexity, $r=0.8719$ ($p<0.01$), as shown in FIG. 47. FIGS. 45-47 show the Play Complexity and Performance versus Quiz Numbers (Assembly, Shape Matching, and Sequence Memory).

Statistical and Correlation Analyses of the Performance Scores

First, TAG-Games and WAIS-III subtests were summarized with mean, median, and standard deviation by gender and department group. Since only the male and female differences or engineering and the non-engineering differences do not guarantee the group differences without interaction, factorial ANOVA was conducted with descriptive statistics. The mean and median values are very close over the 6 tests with normal distribution. Table 15 shows that the scores of male engineering students are higher than other groups overall, except for the matrix reasoning. However, the factorial ANOVA results show that there was only one significant difference in the assembly game (see Table 16).

TABLE 16

Factorial ANOVA test by gender and department groups.

| Groups | | F | Sig. | R Squared (Adjusted R Squared) |
|---|---|---|---|---|
| TAG-Game$^A$ | Gender | .284 | .496 | .1 |
| | Department | 4.040* | .048 | (.069) |
| | Gender & Department | 5.969* | .017 | |
| TAG-Game$^S$ | Gender | 1.685 | .198 | .022 |
| | Department | .091 | .763 | (−.011) |
| | Gender & Department | .198 | .658 | |
| TAG-Game$^M$ | Gender | .264 | .609 | .087 |
| | Department | 3.410 | .068 | (.054) |
| | Gender & Department | 2.773 | .1 | |
| WAIS-III: Block Design | Gender | .003 | .957 | .041 |
| | Department | 1.377 | .246 | (−.017) |
| | Gender & Department | .001 | .979 | |
| WAIS-III: Matrix Reasoning | Gender | .005 | .946 | .085 |
| | Department | 1.640 | .206 | (.030) |
| | Gender & Department | 1.152 | .288 | |
| Digit Span | Gender | .029 | .865 | .075 |
| | Department | 1.478 | .235 | (−.027) |
| | Gender & Department | .106 | .747 | |

The expectations that the assembly game and shape matching game are reliable assessments were validated with the correlation test shown in Table 17. The assembly game and block design game both counted the time for completion and the number of errors for scoring it. The assembly game and block design subtest scores are significantly correlated with $r=0.556$, and this mirrors that the assembly game can be used for assessing hand manipulation and fine motor skills. Also, the shape matching game and matrix reasoning games are highly correlated with $r=0.566$. Both the shape matching and matrix reasoning games use the same scoring system without time limits and test spatial reasoning. Although the correlation coefficient is not high enough for strong correlation, block design and matrix reasoning correlation was significant as well. Regarding the sequence game and digit span, the correlation was not high with significant level. Even though the sequence game and digit span subtest are designed for assessing short-term memory, the sensory input system is not the same. The sequence game uses visual inputs flashing from the monitor whereas digit span gets auditory inputs. If the different sensory inputs take on a different role in working memory, the low correlation may make sense. In addition, two subtests of WAIS-III shows

TABLE 15

Summary of performance (Mean, SD, Median) of two different group, gender and department.

| | | TAG-Game$^A$ | TAG-Game$^S$ | TAG-Game$^M$ | WAIS-III: Block Design | WAIS-III: Matrix Reasoning | Digit Span |
|---|---|---|---|---|---|---|---|
| | Total Participants | 92 | 92 | 86 | 54 | 54 | 31 |
| | Possible pts. | 100 | 10 | 56 | 66 | 26 | 48 |
| | Mean | 68.74 | 8.59 | 32.88 | 52.19 | 21.02 | 29.90 |
| | (Std. D.) | (8.90) | (1.12) | (5.38) | (10.52) | (2.66) | (4.98) |
| | Median | 70 | 9 | 33 | 55 | 21 | 30 |
| Male | Engineering | 71.60 | 8.75 | 34.87 | 56.63 | 21.88 | 33.50 |
| | (Std. D.) | (9.34) | (0.92) | (5.38) | (5.29) | (2.36) | (7.78) |
| | Arts and Sciences | 63.07 | 8.71 | 30.55 | 51.43 | 21.64 | 28.5 |
| | (Std. D.) | (11.54) | (0.99) | (5.54) | (9.91) | (1.95) | (5.10) |
| Female | Engineering | 67.94 | 8.31 | 32.19 | 56.50 | 23.00 | 33.00 |
| | (Std. D.) | (4.84) | (1.45) | (4.79) | (2.12) | (2.83) | (0.00) |
| | Arts and Sciences | 68.77 | 8.50 | 31.20 | 51.07 | 20.37 | 30.11 |
| | (Std. D.) | (7.67) | (1.20) | (5.19) | (11.96) | (2.92) | (4.80) | relatively high correlation of 0.338 while correlations among the TAG-Games are 0.209 and 0.155.

TABLE 17

Correlations of TAG-Games and WAIS-III subtests.

| | Correlation r | | | | | |
|---|---|---|---|---|---|---|
| | 1 | 2 | 3 | 4 | 5 | 6 |
| 1. TAG-Game$^A$ | | | | | | |
| 2. TAG-Game$^S$ | .177 | | | | | |
| 3. TAG-Game$^M$ | .209 | −.026 | | | | |
| 4. WAIS-III Block design | .556** | .155 | .281 | | | |
| 5. WAIS-III Matrix reasoning | .211 | .566** | .087 | .338* | | |
| 6. Digit span | −.014 | .232 | .329 | .044 | .025 | |

*Correlation is significant at the 0.05 level (2-tailed)
**Correlation is significant at the 0.01 level (2-tailed)

Other embodiments may include one or more of the features below:

1. A method of using a geometric block to assess a user capability, including:
   providing at least one geometric block to a user, wherein the at least one geometric block includes:
   providing a user interface to display information to the user, wherein the information includes a goal of at least one assessment exercise, wherein the goal of the at least one assessment exercise includes a target orientation of the at least one geometric block;
   wherein the user interface comprises a video recording system;
   wherein the at least one assessment exercise comprises an assembly problem, a shape matching problem, or a sequence memory problem;
   wherein the assembly problem comprises:
      a plurality of geometric blocks;
      a target two-dimensional image, wherein the goal is to assemble the plurality of geometric blocks to recreate the target two-dimensional image using the top surfaces of the plurality of geometric blocks;
      wherein the assembly problem comprises four geometric blocks and the target orientation is a two-by-two block configuration;
      wherein the assembly problem comprises nine geometric blocks and the target orientation is a three-by-three block configuration;
      wherein the target two-dimensional image displayed via the user interface comprises lines representing edges of the plurality of geometric blocks;
      a target three-dimensional images, wherein the goal is to assemble the plurality of geometric blocks to recreate the target three-dimensional image using the surface images of the plurality of geometric blocks;
   wherein the shape matching problem comprises:
      one geometric block;
      an incomplete pattern of two-dimensional images, wherein the goal is to orient the geometric block to complete the pattern using the top surface of the geometric block;
      wherein the incomplete pattern of two-dimensional images comprises three images;
      wherein the incomplete pattern of two-dimensional images comprises eight images;
      wherein the incomplete pattern of two-dimensional images displayed via the user interface comprises lines representing edges of the plurality of geometric blocks;
      an incomplete pattern of three-dimensional images, wherein the goal is to orient the geometric block to complete the pattern using the surface images of the geometric block;
      a plurality of SIG-Blocks;
      an incomplete pattern of two or three-dimensional images, wherein the goal is to orient the geometric blocks to recreate and complete the pattern using the surface images of the geometric blocks;
   wherein the sequence memory problem comprises:
      one geometric block;
      a plurality of geometric blocks;
      a sequence of two-dimensional images, wherein the goal is to repeatedly reorient the geometric block such that the top surface of the geometric block recreates the sequence of two-dimensional images;
      wherein the two-dimensional images of the sequence are displayed at the same time for a predetermined time;
      wherein the two-dimensional images of the sequence are displayed individually in sequence;
      wherein the two-dimensional images are geometric patterns;
      wherein the two-dimensional images are colors;
   automatically transmitting the motion data or position data of the geometric block as the user attempts to achieve the goal of the at least one assessment exercise;
   wherein the motion data or position data is transmitted wirelessly;
      wherein the motion data or position data is transmitted using the Zigbee protocol;
   wherein the motion data or position data is transmitted to an assessor device;
   wherein the motion data or position data is transmitted to an intermediate device;
      wherein the intermediate device is a local computer, a mobile phone, or a mobile device;
      wherein the motion data or position data is transmitted to an assessor device from the intermediate device;
         wherein the motion data or position data is transmitted to the assessor device via a network;
         wherein the assessor device is located in a remote location;
   automatically transmitting the final orientation of the at least one geometric block based on the motion data or position data;
   wherein the user is presented with a series of assessment exercises;
      wherein a subsequent assessment exercise is determined based on a performance score of at least one previous assessment exercise;
      wherein the subsequent assessment exercise has a higher complexity than a previous assessment exercise;
      wherein the subsequent assessment exercise has a lower complexity than a previous assessment exercise;
      wherein the complexity of the subsequent assessment exercise is determined automatically;

wherein the use of the at least one geometric block is associated with a game;
   wherein the use of the at least one geometric block is associated with a multi-player game;
      wherein the use of the at least one geometric block is associated with online gaming;
wherein the at least one geometric block, user interface, or other device includes an audio device for producing auditory feedback during the at least one assessment exercise;
wherein the at least one geometric block, user interface, or other device includes a feedback display for producing visual feedback during the at least one assessment exercise;
   wherein the feedback display comprises at least one LED;
wherein the at least one assessment exercise is associated with mathematics, engineering, circuit design, or logic algorithms;
wherein the at least one assessment exercise is designed to assess intelligence, achievement, learning capability, motor proficiency, spatial memory, or attention;
wherein the at least one assessment exercise is designed to diagnose symptoms associated with Autism Spectrum Disorders (ASD) or Attention-Deficit Hyperactivity Disorders (ADHD), 2. A method of assessing a user capability, including:
providing at least one geometric block to a user, wherein the at least one geometric block includes:
providing a user interface to display information to a user, wherein the information includes a goal of at least one assessment exercise, wherein the goal of the at least one assessment exercise includes a target orientation of the geometric block;
   wherein the at least one assessment exercise is an assembly problem, a shape matching problem, or a sequence memory problem;
providing an assessor interface to display information to a assessor, wherein the information includes a current state of the at least one assessment exercise;
   wherein the assessor interface receives motion data or position data;
      wherein the motion data or position data is received wirelessly;
         wherein the motion data or position data is received using the Zigbee protocol;
      wherein the motion data or position data is received automatically;
      wherein the motion data or position data is received as the user attempts to achieve the goal of the assessment exercise;
      wherein the motion data or position data is received after the user attempts to achieve the goal of the assessment exercise;
         wherein the motion data or position data is received from an intermediate device;
      wherein the motion data or position data is received via a network;
determining a complexity associated with achieving the target orientation;
   wherein the complexity indicates an amount of uncertainty reduced by successfully completing the assessment exercise;
   wherein the complexity is based on an information-theoretic approach;
   wherein the complexity is based at least in part on the symmetry of the different geometric patterns on the sides of the at least one geometric block;
receiving the motion data or position data of the geometric block;
automatically analyzing the movement of the geometric block based on the motion data or position data;
   wherein analyzing the movement of the geometric block comprises determining step by step correctness/incorrectness;
   wherein analyzing the movement of the geometric block comprises determining incremental completion time;
   wherein analyzing the movement of the geometric block comprises determining total completion time;
   wherein analyzing the movement of the geometric block comprises detecting repetitive and hyperactive behaviors;
   wherein analyzing the movement of the geometric block comprises analyzing how the blocks are manipulated;
   wherein analyzing the movement of the geometric block comprises analyzing how long it takes the user to complete certain tasks;
   wherein analyzing the movement of the geometric block comprises analyzing manipulation patterns;
   wherein analyzing the movement of the geometric block comprises analyzing how data changes over time through repeated assessments;
   wherein analyzing the movement of the geometric block comprises analyzing how data changes based on varying levels of support;
      wherein support comprises auditory feedback or visual feedback during the at least one assessment exercise;
   wherein analyzing the movement of the geometric block comprises filtering the motion data or position data;
   wherein analyzing the movement of the geometric block comprises use of Fast Fourier Transforms (FFT) for identifying a dominant frequency area of motions;
automatically determining the current state of the assessment exercise based on the motion data or position data;
automatically determining assessment exercise milestones of the assessment exercise based on the motion data or position data;
automatically determining intermediate orientations of the at least one geometric block based on the motion data or position data;
automatically determining the final orientation of the at least one geometric block based on the motion data or position data;
automatically determining a performance score of the user capability based at least in part on correctness, time, and quiz complexity of the at least one assessment exercise;
automatically presenting the user with a series of assessment exercises;
   wherein a subsequent assessment exercise is determined based on the assessment score of at least one previous assessment exercise;
      wherein the subsequent assessment exercise has a higher complexity than a previous assessment exercise;

wherein the subsequent assessment exercise has a lower complexity than a previous assessment exercise;
wherein the complexity of the subsequent assessment exercise is determined automatically;
changing the support associated with the subsequent assessment exercise;
wherein support comprises auditory feedback, visual feedback or tactile feedback during the assessment exercise;
preparing an assessor data report comprising the performance score, the support, the behaviors, or the complexity;
wherein data of the assessor data report is correlated with another standardized measure for assessing the user capability;
wherein the at least one assessment exercise is associated with mathematics, engineering, circuit design, or logic algorithms;
wherein the at least one assessment exercise is designed to assess intelligence, achievement, learning capability, motor proficiency, spatial memory, or attention;
wherein the at least one assessment exercise is designed to diagnose symptoms associated with Autism Spectrum Disorders (ASD) or Attention-Deficit Hyperactivity Disorders (ADHD).

3. A geometric block for use in assessing a user capability, comprising:
a covering associated with an assessment exercise;
wherein the covering comprises 6 different geometric images, each with 1-, 2-, or 4-fold symmetry;
wherein the covering is re-attachable;
wherein the covering is reconfigurable;
at least one LED;
wherein the geometric block comprises at least one LED on each of a plurality of sides of the geometric block;
wherein the geometric block comprises at least one LED on each side of geometric block;
at least one display for displaying information to the user;
wherein the display is a screen;
wherein the display comprises at least one LED;
wherein the display is programmable;
wherein the display is programmed with different shapes for different assessment exercises;
wherein the display is programmed with different colors for different assessment exercises;
wherein the geometric block comprises a display on a plurality of sides of the geometric block;
wherein the sides are plastic;
wherein the sides are covered with a soft material, for example a silicon sheet;
wherein the geometric block comprises a display on each side of geometric block;
wherein the covering covers each side with a different color;
wherein the covering covers each side with a different geometric image;
wherein the geometric block is a six-sided cube;
wherein the covering covers each side with a different geometric pattern;
a processor;
wherein the processor is a microprocessor;
wherein the processor comprises an analog-to-digital converter;
wherein the processor includes a timer;
an integrated circuit;
at least one battery;
wherein the at least one battery is rechargeable;
wherein the at least one battery is recharged using a USB cable connected to a power source;
wherein the geometric block uses four AAA batteries;
wherein the geometric block uses Li-ion polymer batteries;
at least one motion sensor to determine motion data of the geometric block;
wherein the at least one motion sensor is an inertial measurement unit;
wherein the inertial measurement unit comprises a plurality of axes;
wherein the at least one motion sensor is a gyroscope;
wherein the at least one motion sensor is an accelerometer;
wherein the accelerometer is a tri-axial accelerometer;
wherein the accelerometer comprises signal conditioning, a low-pass filter, temperature compensation, and sensitivity selection;
wherein the geometric block comprises a plurality of accelerometers;
wherein the plurality of accelerometers are oriented orthogonally to each other;
wherein the at least one motion sensor is a tilt sensor;
wherein the geometric block comprises a plurality of tilt sensors;
wherein the plurality of tilt sensors are oriented orthogonally to each other;
at least one position sensor to determine position data of the geometric block;
wherein the at least one position sensor is an optical sensor;
wherein the optical sensor comprises an infrared emitting diode and an infrared phototransistor to detect the reflected signal;
wherein the at least one position sensor is an proximity sensor;
wherein the at least one position sensor is an infrared (IR) sensor;
wherein the at least one position sensor is an contact sensor;
wherein the contact sensor is an electrical circuit;
wherein the electrical circuit is open or closed based on position;
wherein the at least one position sensor is a magnet and magnetic switch;
wherein the at least one position sensor is a magnet and Hall-effect sensor;
wherein the at least one position sensor is inductive coil or LED and photo-detector to transfer information to and from the geometric block;
wherein the geometric block comprises a position sensor associated with a plurality of sides of the geometric block;
wherein the geometric block comprises a position sensor associated with each side of the geometric block;
at least one grip sensor to determine a gripping of the geometric block;
wherein the at least one grip sensor is a tactile sensor, a temperature sensor, an optical proximity sensor, or a resistive sensor;
wherein the geometric block comprises a grip sensor associated with a plurality of sides of the geometric block;

wherein the geometric block comprises a grip sensor associated with each side of the geometric block;
wherein the geometric block comprises a MEMS sensor;
wherein the MEMS sensor is a mote;
a transmitter for transmitting data;
wherein the transmitted data comprises orientation of the geometric block, assembly detection among adjacent geometric blocks, time at assembly phases, or total game completion;
wherein the motion data or position data is transmitted wirelessly;
wherein the motion data or position data is transmitted using a TinyOS or Zigbee protocol;
wherein the motion data or position data is transmitted to a receiving device;
wherein the receiving device is an intermediate device;
wherein the receiving device is an assessor device;
wherein the receiving device is another geometric block;
a receiver for receiving data;
wherein the data is received using a TinyOS or Zigbee protocol;
wherein a communication module comprises the transmitter and the receiver;
wherein the communication module is an XBee device;
wherein a core module comprises the processor, the communication module, the integrated circuit, the at least one motion sensor, the at least one position sensor, and the at least one battery;
wherein the geometric block comprises a unique identifier;
wherein the unique identifier is an RFID;
an audio device for producing auditory feedback;
wherein the auditory feedback is indicative of correct and incorrect positioning;
a vibration device for producing vibratory feedback;
wherein the vibration device is a vibrating motor;
wherein the geometric block is configured as an insertion block for insertion into an opening;
wherein the geometric block is configured as an assembly block for assembly with other geometric blocks;
wherein the geometric block is configured as a reconfiguration block for changing the shape of the reconfiguration block;
wherein the reconfiguration block comprises rotational or translational joints.

4. A system for assessing a user capability, comprising:
at least one geometric block comprising:
a user interface to display information to a user, wherein the information includes a goal of the assessment exercise, wherein the goal of the assessment exercise includes a target orientation of the geometric block;
an assessor interface to display assessment information to an assessor;
wherein the assessment information comprises:
a current state of the assessment exercise;
wherein the current state comprises incremental completion time;
wherein the current state comprises total completion time;
wherein the current state comprises acceleration data;
wherein the current state comprises a graphical representation of the current configuration;
wherein the graphical representation is a three-dimensional model;
wherein the current state comprises a real-time animation of the assembly configurations of the at least one geometric block;
a summary of assessment exercise milestones;
wherein the assessor interface includes a receiver for receiving data associated with the geometric block, comprising the motion data or position data of the geometric block;
wherein the motion data or position data is received wirelessly;
wherein the motion data or position data is received using the Zigbee protocol;
wherein the motion data or position data is received automatically;
wherein the motion data or position data is received as the user attempts to achieve the goal of the assessment exercise;
wherein the motion data or position data is received after the user attempts to achieve the goal of the assessment exercise;
wherein the motion data or position data is received from an intermediate device;
wherein the assessor interface is located in a remote location;
an external measurement device attached to the user to detect activity directly from motions of the user;
wherein the external measurement device comprises user motion sensors;
wherein the user motion sensors comprise user accelerometers;
wherein the at least one geometric block, user interface, assessor interface or other device includes an audio device for producing auditory feedback during the at least one assessment exercise;
wherein the at least one geometric block, user interface, assessor interface, or other device includes a feedback display for producing visual feedback during the at least one assessment exercise;
wherein the feedback display comprises at least one LED.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A method of assessing cognitive capacity of a user, the method comprising:
providing a system having an assessor device including a microprocessor configured to include a graphical user interface, said assessor device being at least one selected from a mobile or smart device, a smart phone, a tablet computer, and a portable, WiFi device, a first assessment block having: (i) an integrated positional or motion sensor producing acceleration data based upon movements of the first assessment block, said positional or motion sensor being at least one selected from a tilt switch, a gyroscopic sensor, and a tri-axial accelerometer, (ii) a bi-directional communication module, (iii) a power source, and (iv) a microprocessor configured to filter noise from the acceleration data; a number of additional assessment blocks, each of the additional assessment blocks at least having: (a) an integrated positional or motion sensor producing acceleration data based upon movements of each additional assessment block, said positional or motion sensor being at least one selected from a tilt switch, a gyroscopic sensor, and a tri-axial accelerometer, (b) a bi-directional communication module, (c) a power source, and (d) a microprocessor configured to filter noise from the acceleration data, wherein the number of additional assessment blocks in the system is selected to conform the assessing of cognitive capacity to a desired level of play complexity; wherein each of the bi-directional communication modules in each of the first and additional assessment blocks are in operative communication and synchronize acceleration data to facilitate peer-to-peer pattern and assembly recognition of the first and additional assessment blocks and, thereby, provide feedback to the assessor device; wherein the assessor device is configured to receive the feedback from the bi-directional communications modules and, based upon the feedback, to display information relating to accuracy of manipulations, goals, and/or performance during the assessing of cognitive capacity via the graphical user interface, and wherein each of the first and additional assessment blocks have a cover with dynamically reprogrammable display which changes in real time in response to goals or performance during the assessing of cognitive capacity to a user;

presenting the user with a series of assessment exercises via the one or more reprogrammable displays, each assessment exercise requesting the user to manipulate the first and/or additional assessment blocks to achieve different movements and/or configurations;

determining by the assessor device while the user performs one or more exercises in the series of assessment exercises by manipulating the first and/or additional assessment blocks a relative orientation of at least one of the first and/or additional assessment blocks based upon the filtered acceleration data received from the bi-directional communication modules of the first and/or additional assessment blocks in order to identify performance characteristics that are representative of cognitive capacity of the user; and reconfiguring the reprogrammable display of the cover of at least one of the first and/or additional assessment blocks so as to adjust the desired level of play complexity of subsequent assessment exercises in the series of assessment exercises based on the identified performance characteristics during a previous assessment exercise and wherein the desired level of play complexity is defined at least in part by different movements or configurations of the first and/or additional assessment blocks during each assessment exercise.

2. The method of claim 1 further comprising displaying the performance characteristics via the graphical user interface during the series of assessment exercises.

3. The method of claim 2 further comprising, subsequent to displaying the performance characteristics prompting or allowing intervention by an assessor, via the assessor device, to adjust the desired level of play complexity.

\* \* \* \* \*